US012372458B2

United States Patent
Takahashi et al.

(10) Patent No.: US 12,372,458 B2
(45) Date of Patent: Jul. 29, 2025

(54) OPTICAL PROPERTY MEASUREMENT APPARATUS AND OPTICAL PROPERTY MEASUREMENT METHOD

(71) Applicant: HAMAMATSU PHOTONICS K.K., Hamamatsu (JP)

(72) Inventors: Hisanari Takahashi, Hamamatsu (JP); Koyo Watanabe, Hamamatsu (JP); Hiroshi Satozono, Hamamatsu (JP); Kyohei Shigematsu, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 146 days.

(21) Appl. No.: 18/120,551

(22) Filed: Mar. 13, 2023

(65) Prior Publication Data
US 2023/0304923 A1    Sep. 28, 2023

(30) Foreign Application Priority Data

Mar. 23, 2022    (JP) .................................. 2022-046443

(51) Int. Cl.
*G01N 21/31*    (2006.01)
*G01J 3/02*    (2006.01)
(Continued)

(52) U.S. Cl.
CPC .............. *G01N 21/31* (2013.01); *G01J 3/0213* (2013.01); *G01J 3/08* (2013.01); *G01J 11/00* (2013.01);
(Continued)

(58) Field of Classification Search
CPC .... G01N 21/31; G01N 21/255; G01N 21/636; G02F 1/31; G02F 2203/055;
(Continued)

(56) References Cited

U.S. PATENT DOCUMENTS

| 4,799,789 A | * | 1/1989 | Tsukamoto | .......... G01M 11/338 |
| | | | | 356/73.1 |
| 2002/0003621 A1 | * | 1/2002 | Kimura | ................ G01M 11/338 |
| | | | | 356/73.1 |

(Continued)

FOREIGN PATENT DOCUMENTS

| EP | 3951337 A1 | 2/2022 |
| JP | H01-000438 A | 1/1989 |

(Continued)

OTHER PUBLICATIONS

Dawlaty, Jahan M. et al., "Measurement of ultrafast carrier dynamics in epitaxial graphene," Applied Physics Letters, 92, 042116(2008).

(Continued)

*Primary Examiner* — Jennifer D Bennett
(74) *Attorney, Agent, or Firm* — Faegre Drinker Biddle & Reath LLP

(57) ABSTRACT

An optical property measurement apparatus includes a pulse formation unit, a waveform measurement unit, and an optical system. The pulse formation unit is capable of changing a temporal waveform of pulsed light in accordance with a type of optical property to be measured. The waveform measurement unit measures a temporal waveform of the pulsed light output from a measurement object after being incident on the measurement object. The optical system has an attenuation unit with an attenuation rate with respect to one wavelength component constituting the pulsed light larger than an attenuation rate with respect to another wavelength component constituting the pulsed light. The optical system is capable of switching between a first state in which the attenuation unit is arranged on an optical path (Continued)

of the pulsed light output from the measurement object and a second state in which the attenuation unit is not arranged on the optical path.

19 Claims, 47 Drawing Sheets

(51) Int. Cl.
  *G01J 3/08* (2006.01)
  *G01J 11/00* (2006.01)
  *G01N 21/63* (2006.01)
  *G02F 1/31* (2006.01)
  *H01S 3/00* (2006.01)

(52) U.S. Cl.
  CPC ............ *G01N 21/636* (2013.01); *G02F 1/31* (2013.01); *H01S 3/0014* (2013.01); *G02F 2203/055* (2013.01)

(58) Field of Classification Search
  CPC ........ G02F 2203/12; G02F 1/353; G01J 3/12; G01J 2003/1204; G01J 2003/1278; G01J 3/0213; G01J 3/08; G01J 11/00; H01S 3/0085; H01S 3/2388; H01S 3/0014; H01S 3/0057
  See application file for complete search history.

(56) References Cited

U.S. PATENT DOCUMENTS

| | | |
|---|---|---|
| 2006/0045540 A1* | 3/2006 | Sato ................. H04B 10/00 398/176 |
| 2009/0116009 A1 | 5/2009 | Nelson et al. |
| 2014/0226204 A1 | 8/2014 | Mitzkus et al. |
| 2022/0018773 A1 | 1/2022 | Prater |
| 2022/0178752 A1* | 6/2022 | Watanabe ............. H01S 3/0057 |

FOREIGN PATENT DOCUMENTS

| | | | |
|---|---|---|---|
| JP | 2008-185432 A | | 8/2008 |
| JP | 2020169946 A | * | 10/2020 .............. G01J 11/00 |

OTHER PUBLICATIONS

Kobayashi, Masataka et al., "Fast-frame single-shot pump-probe spectroscopy with chirped-fiber Bragg gratings," Optics Letters, vol. 44, Issue 1, pp. 163-166 (2019).

* cited by examiner

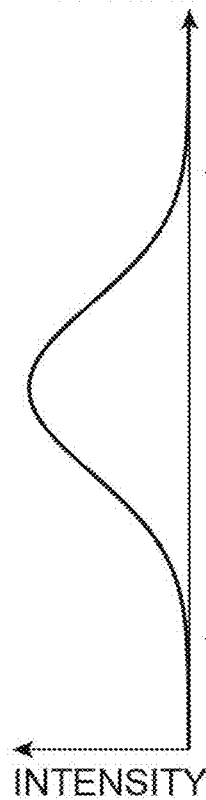
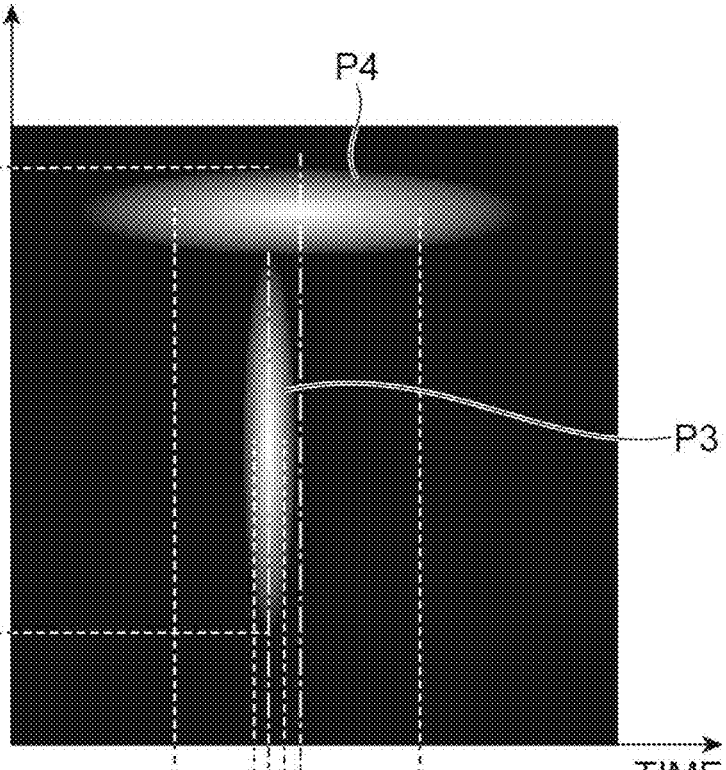
*Fig.23C*
*Fig.23A*
*Fig.23B*

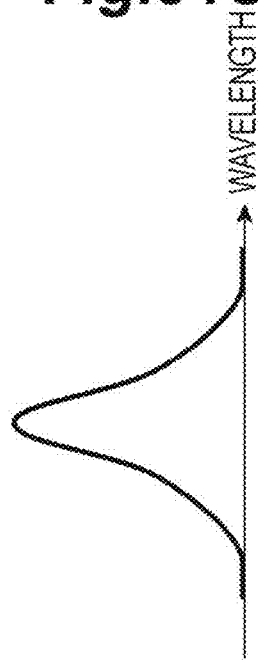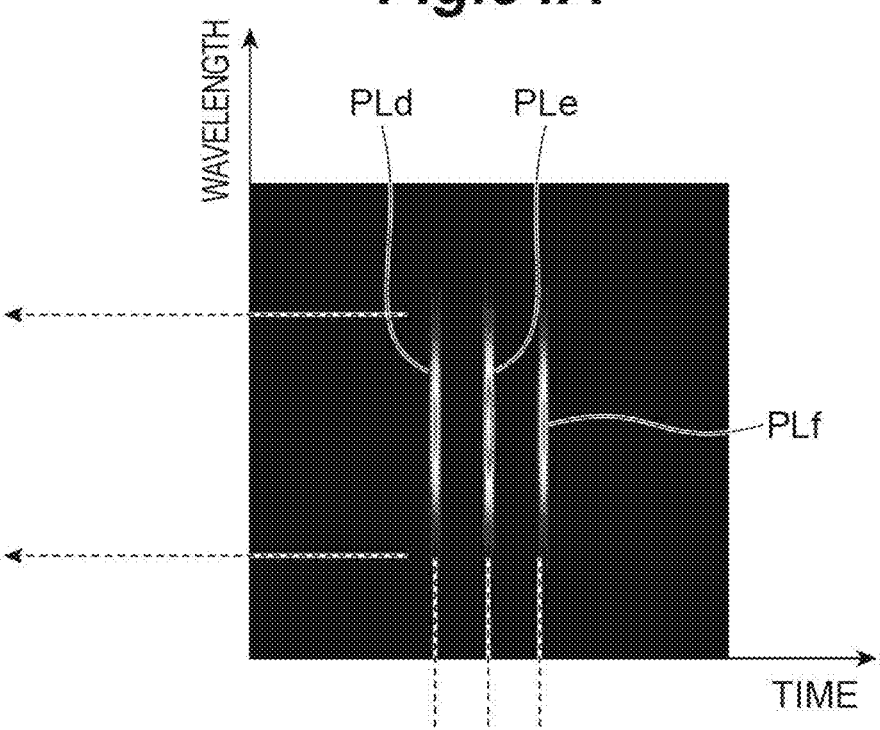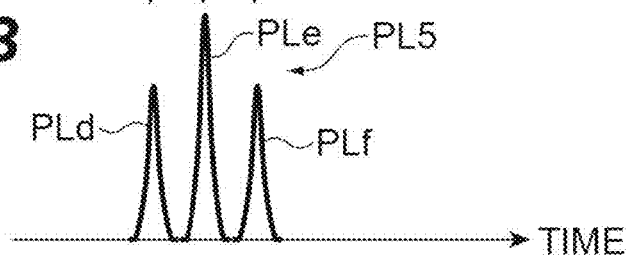

OPTICAL PROPERTY MEASUREMENT APPARATUS AND OPTICAL PROPERTY MEASUREMENT METHOD

CROSS-REFERENCE TO RELATED APPLICATION

Priority is claimed on Japanese Patent Application No. 2022-046443, filed Mar. 23, 2022, the content of which is incorporated herein by reference.

TECHNICAL FIELD

The present disclosure relates to an optical property measurement apparatus and an optical property measurement method.

BACKGROUND

Patent Literature 1 (Japanese Unexamined Patent Publication No. 2020-169946) discloses a technology relating to a dispersion measurement apparatus. This dispersion measurement apparatus includes a pulse formation unit, a correlation optical system, a light detection unit, and a computation unit. The pulse formation unit forms a light pulse train including a plurality of second light pulses having a time difference therebetween and having center wavelengths different from each other from a first light pulse output from a measurement object. The correlation optical system receives the light pulse train output from the pulse formation unit and outputs correlation light including a cross-correlation or an auto-correlation of the light pulse train. The light detection unit detects a temporal waveform of the correlation light. The computation unit estimates a wavelength dispersion amount of the measurement object based on a feature value of the temporal waveform.

Non-Patent Literature 1 (Jahan M. Dawlaty et al., "Measurement of ultrafast carrier dynamics in epitaxial graphene", Applied Physics Letters, 92, 042116, 2008) discloses time-resolved spectroscopic measurement. In the method described in this document, a time response of a sample is evaluated by changing a time difference between pump light for exciting the sample and probe light for detecting change in characteristics of the sample. Non-Patent Literature 2 (Masataka Kobayashi et al., "Fast-frame single-shot pump-probe spectroscopy with chirped-fiber Bragg gratings", Optics Letters, Volume 44, Issue 1, pp. 163-166, 2019) discloses a time-resolved measurement method using a plurality of light pulses having center wavelengths different from each other. In the method described in this document, a plurality of light pulses having wavelengths different from each other are generated by performing wavelength conversion using an optical parametric amplifier (OPA).

SUMMARY

When optical properties of a measurement object are measured by irradiating the measurement object with pulsed light, a different apparatus is used in accordance with the type of the optical property to be measured. For example, an apparatus irradiating a measurement object with pump light and probe light having wavelengths different from each other and evaluating change in characteristics inside the measurement object caused by irradiation of the pump light based on change over time in the probe light output from the measurement object (time response measurement apparatus) is known. In addition, an apparatus irradiating a measurement object with a light pulse train including a plurality of light pulses having a time difference therebetween and having center wavelengths different from each other and estimating a wavelength dispersion amount of the measurement object based on a feature value (for example, a pulse interval) of a temporal waveform of the light pulse train having passed through the measurement object is known (for example, refer to Patent Literature 1). Therefore, when it is desired to measure two or more types of optical properties, there is a need to prepare two or more apparatuses according to the respective types of the optical properties.

An object of an embodiment of the present invention is to provide an optical property measurement apparatus and an optical property measurement method capable of performing measurement of two or more types of optical properties, for example, time response measurement and wavelength dispersion measurement, using one apparatus.

An embodiment of the present invention is an optical property measurement apparatus. The optical property measurement apparatus is an apparatus for measuring optical properties of a measurement object. The optical property measurement apparatus includes a pulse formation unit, a waveform measurement unit, an optical system, and an analysis unit. The pulse formation unit generates pulsed light and is capable of changing a temporal waveform of the pulsed light in accordance with a type of optical property to be measured. The waveform measurement unit measures a temporal waveform of the pulsed light output from the measurement object after being incident on the measurement object. The optical system has an attenuation unit with an attenuation rate with respect to one wavelength component constituting the pulsed light larger than an attenuation rate with respect to another wavelength component constituting the pulsed light. The optical system is capable of switching between a first state and a second state. In the first state, the attenuation unit is arranged on an optical path of the pulsed light output from the measurement object. In the second state, the attenuation unit is not arranged on the optical path.

Another embodiment of the present invention is an optical property measurement method. The optical property measurement method is a method for measuring optical properties of a measurement object by irradiating the measurement object with pulsed light. The optical property measurement method includes selecting, irradiating, measuring, and obtaining. In the selecting, any state in an optical system capable of switching between a first state and a second state is selected. In the first state, an attenuation unit is arranged on the optical path of the pulsed light output from the measurement object. In the second state, the attenuation unit is not arranged on the optical path. An attenuation rate of the attenuation unit with respect to one wavelength component constituting the pulsed light is larger than an attenuation rate of the attenuation unit with respect to another wavelength component constituting the pulsed light. In the irradiating, the measurement object is irradiated with the pulsed light having a temporal waveform according to a type of optical property to be measured using a pulse formation unit capable of changing a temporal waveform of the pulsed light. In the measuring, a temporal waveform of the pulsed light having passed through the optical system is measured. In the obtaining, the optical property of the measurement object is obtained based on the temporal waveform.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4A illustrates a first state in which an attenuation unit is arranged on an optical path of pulsed light output from a measurement object. FIG. 4B illustrates a second state in which the attenuation unit is not arranged on the optical path of the pulsed light output from the measurement object.

FIG. 5A illustrates a first state in which an attenuation unit is arranged on an optical path of pulsed light output from a measurement object. FIG. 5B illustrates the second state in which the attenuation unit is not arranged on the optical path of the pulsed light output from the measurement object.

FIG. 6A illustrates a first state in which an attenuation unit is arranged on an optical path of pulsed light output from a measurement object. FIG. 6B illustrates the second state in which the attenuation unit is not arranged on the optical path of the pulsed light output from the measurement object.

FIGS. 23A to 23C are explanatory diagrams of a temporal waveform and a spectral waveform of third pulsed light. FIG. 23A is a spectrogram in which the horizontal axis indicates time, the vertical axis indicates wavelength, and light intensity is indicated by contrast of color. FIG. 23B illustrates temporal waveforms of two component pulses included in the third pulsed light. FIG. 23C illustrates a composite spectral waveform of two component pulses, that is, a spectral waveform of the third pulsed light.

FIG. 33A is a spectrogram in which the horizontal axis indicates time, the vertical axis indicates wavelength, and light intensity is indicated by contrast of color. FIG. 33B illustrates a temporal waveform of a light pulse train. FIG. 33C illustrates a composite spectrum of three light pulses.

FIGS. 34A to 34C are diagrams illustrating an example of multi-pulse which is not band-controlled as a comparative example. FIG. 34A is a spectrogram in which the horizontal axis indicates time, the vertical axis indicates wavelength, and light intensity is indicated by contrast of color. FIG. 34B illustrates a temporal waveform of a light pulse train. FIG. 34C illustrates a composite spectrum of three light pulses.

FIG. 36A illustrates an example of a temporal waveform of the correlation light when the light pulse train does not pass through the measurement object. FIG. 36B illustrates an example of a temporal waveform of the correlation light when the light pulse train passes through the measurement object.

DETAILED DESCRIPTION

Figure 1:
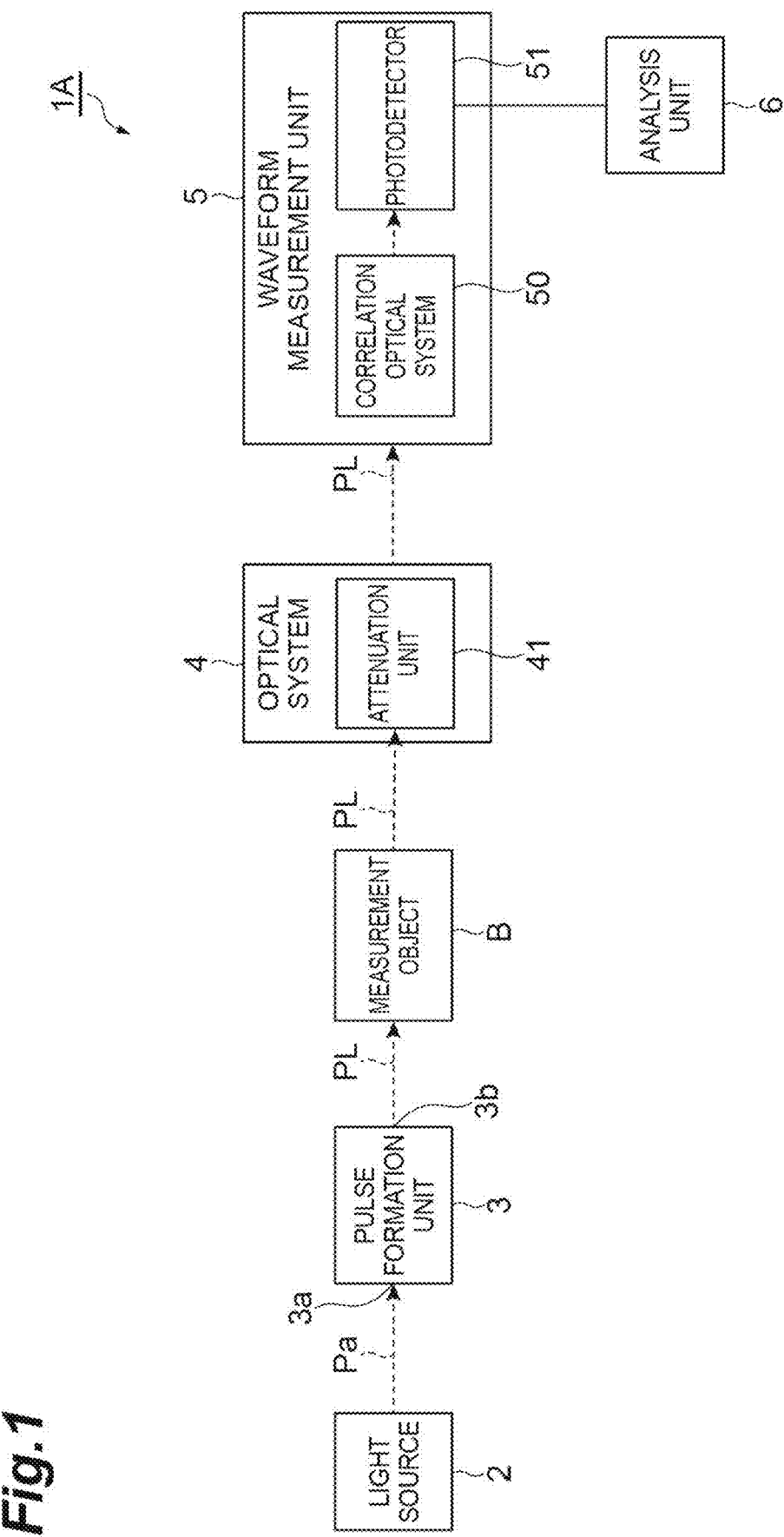
FIG. 1 is a diagram schematically illustrating a configuration of an optical property measurement apparatus according to an embodiment of the present disclosure.

Specific examples of an optical property measurement apparatus and an optical property measurement method according to an embodiment of the present disclosure will be described in detail with reference to the drawings. The present invention is not limited to the embodiments to be described below. A technical scope of the present invention is determined on the basis of description of claims. In the description of the drawings, the same elements are denoted by the same reference numerals, and repeated description will be omitted. In the present disclosure, unless otherwise described, a temporal waveform denotes a temporal waveform relating to a light intensity.

FIG. 1 is a diagram schematically illustrating a configuration of an optical property measurement apparatus 1A according to an embodiment of the present disclosure. With this optical property measurement apparatus 1A, a plurality of optical properties of a measurement object B can be measured using a single apparatus. The plurality of optical properties include both a time response inside the measurement object B caused by light incidence, and a wavelength dispersion amount of the measurement object B. The optical property measurement apparatus 1A includes a pulsed laser light source 2, a pulse formation unit 3, an optical system 4, a waveform measurement unit 5, and an analysis unit 6.

The pulse formation unit 3 has a light input end 3a and a light output end 3b. The light input end 3a is optically coupled to the pulsed laser light source 2 spatially or via an optical waveguide such as an optical fiber. The light output end 3b is optically coupled to the measurement object B spatially or via an optical waveguide such as an optical fiber. Moreover, the measurement object B is optically coupled to the waveform measurement unit 5 spatially or via an optical waveguide such as an optical fiber. The optical system 4 is arranged on an optical path between the measurement object B and the waveform measurement unit 5. The analysis unit 6 is electrically connected to the waveform measurement unit 5.

The pulsed laser light source 2 outputs coherent initial pulsed light Pa. For example, the pulsed laser light source 2 is a femtosecond laser, and in one example, it is a solid laser light source such as an LD direct pumped type Yb:YAG pulse laser. For example, the temporal waveform of the initial pulsed light Pa has a shape of a Gaussian function. For example, the full width at half maximum (FWHM) of the initial pulsed light Pa is within a range of 10 fs to 10,000 fs and is 100 fs as an example. The initial pulsed light Pa is a light pulse having a certain bandwidth and includes a plurality of consecutive wavelength components. In one example, a bandwidth of the initial pulsed light Pa is 10 nm, and a center wavelength of the initial pulsed light Pa is 1,030 nm.

The pulse formation unit 3 generates pulsed light PL from the initial pulsed light Pa. The pulsed light PL has a temporal waveform according to the type of the optical property to be measured. The pulsed light PL may further have the number of pulses and a spectrum according to the type of the optical property to be measured. In the pulse formation unit 3, the temporal waveform of the pulsed light PL can be changed in accordance with the type of the optical property to be measured. The pulse formation unit 3 may further be able to change the number of pulses and the spectrum of the pulsed light PL in accordance with the type of the optical property to be measured. A spectrum of pulsed light includes a phase spectrum of pulsed light, an intensity spectrum of pulsed light, or both the phase spectrum and the intensity spectrum of pulsed light.

Figure 2:
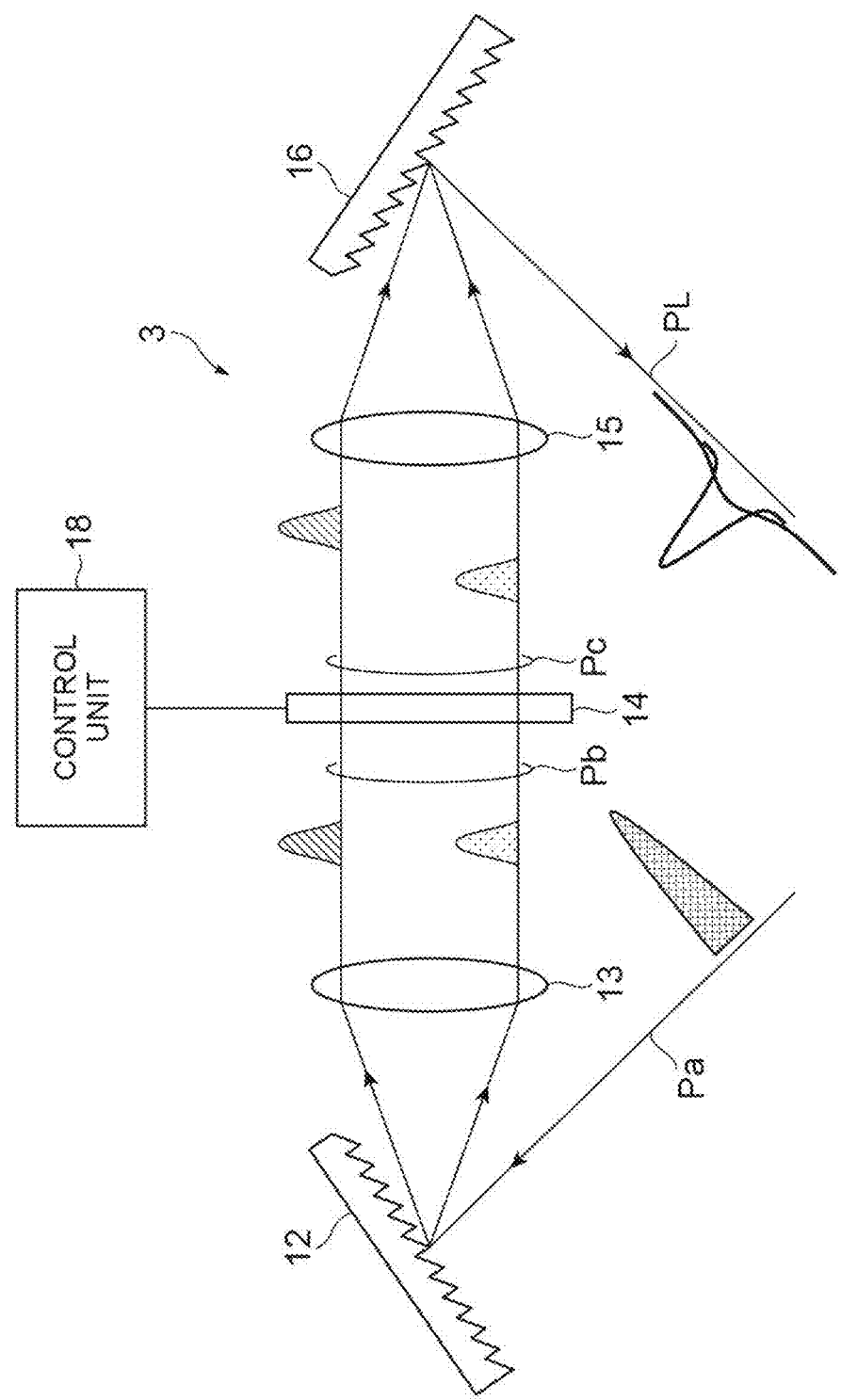
FIG. 2 is a diagram illustrating an example of a configuration of a pulse formation unit.

FIG. 2 is a diagram illustrating an example of a configuration of the pulse formation unit 3. The pulse formation unit 3 has a diffraction grating 12, a lens 13, a spatial light modulator (SLM) 14, a lens 15, and a diffraction grating 16. The diffraction grating 12 is a spectroscopic element and is optically coupled to the pulsed laser light source 2. The SLM 14 is optically coupled to the diffraction grating 12 via the lens 13. The diffraction grating 12 spatially separates a plurality of wavelength components included in the initial pulsed light Pa for each wavelength. Regarding a spectroscopic element, a different optical component such as a prism may also be used in place of the diffraction grating 12. The initial pulsed light Pa is obliquely incident on the diffraction grating 12 and is spectrally dispersed into a plurality of wavelength components. Light Pb including the plurality of wavelength components is focused by the lens 13 for each wavelength component and is image-formed on a modulation plane of the SLM 14. The lens 13 may be a convex lens constituted of a light transmitting member or a concave mirror having a concave-shaped light reflection surface.

The SLM 14 applies a phase shift for each wavelength to the initial pulsed light Pa in order to convert the initial pulsed light Pa into the pulsed light PL. Specifically, in order to apply a phase shift to the initial pulsed light Pa and generate the pulsed light PL, the SLM 14 receives a control signal from a control unit 18. The SLM 14 presents a phase pattern by receiving a control signal output from the control unit 18. For example, the control unit 18 may be constituted of a computer. The SLM 14 performs at least any modulation of phase modulation and intensity modulation of the light Pb using the presented phase pattern. The SLM 14 may perform phase modulation and intensity modulation of the light Pb at the same time using the presented phase pattern. In this manner, the SLM 14 mutually shifts the phases of a plurality of wavelength components output from the diffraction grating 12. For example, the SLM 14 is a phase modulation type. In one Example, the SLM 14 is a liquid crystal on silicon (LCOS) type. Although the diagram illustrates a transmission-type SLM 14, the SLM 14 may be a reflection type.

Figure 3:
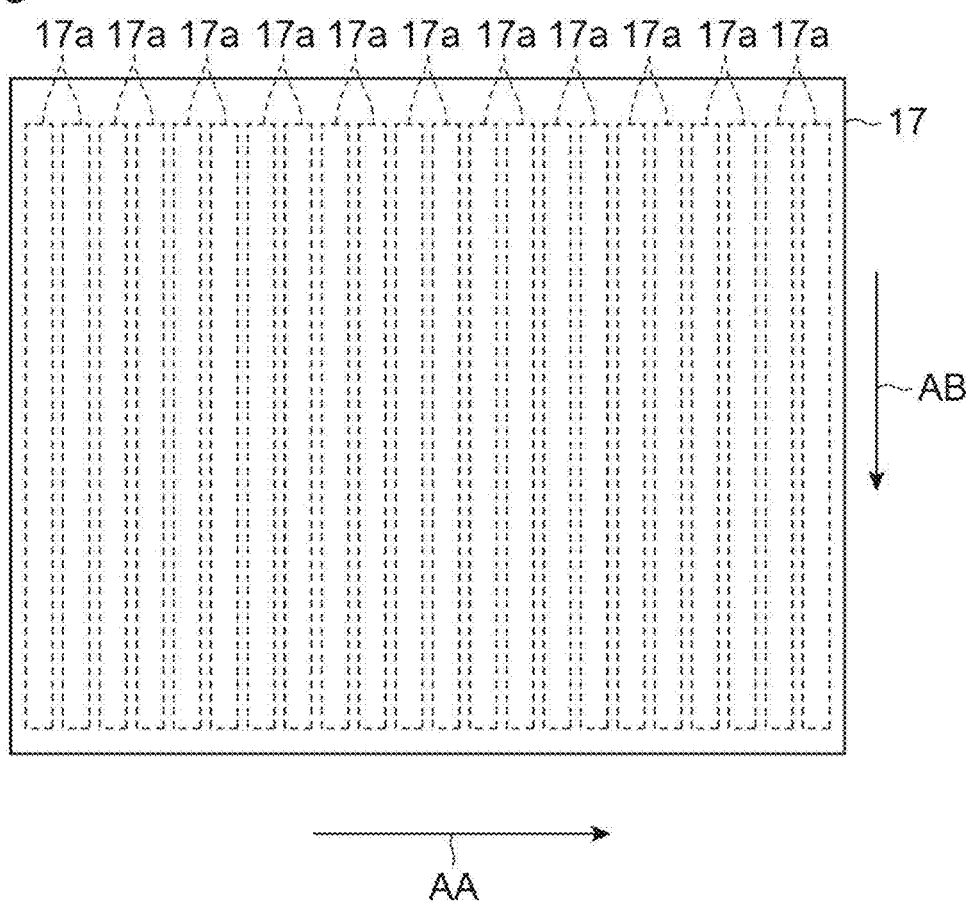
FIG. 3 is a diagram illustrating a modulation plane of a spatial light modulator.

FIG. 3 is a diagram illustrating a modulation plane 17 of the SLM 14. In the modulation plane 17, a plurality of modulation regions 17a are arranged along a certain direction AA, and each of the modulation regions 17a extends in a direction AB intersecting with the direction AA. The direction AA is a dispersing direction by the diffraction grating 12. This modulation plane 17 functions as a Fourier transform plane, and each of corresponding wavelength components after the dispersion is incident on each of the plurality of modulation regions 17a. The SLM 14 modulates a phase and an intensity of each of the incident wavelength components, independently from the other wavelength components, in each of the modulation regions 17a. When the SLM 14 is a phase modulation type, the intensity modulation is realized by a phase pattern (phase image) presented on the modulation plane 17.

The wavelength components of modulated light Pc modulated by the SLM 14 are focused by the lens 15 at one point on the diffraction grating 16. The lens 15 at this time functions as a focusing optical system for focusing the modulation light Pc. The lens 15 may be a convex lens constituted of a light transmitting member or a concave mirror having a concave-shaped light reflection surface. The diffraction grating 16 functions as a combining optical system, and combines the modulated wavelength components. That is, by the lens 15 and the diffraction grating 16, the plurality of wavelength components of the modulated light Pc are focused and combined to form the pulsed light PL.

In order to generate the pulsed light PL having at least one of the number of pulses, the spectrum, and the temporal waveform according to the type of the optical property to be measured, the control unit 18 stores a plurality of phase patterns in advance. The control unit 18 selectively outputs these phase patterns to the SLM 14.

FIG. 1 will be referred to again. The measurement object B is arranged on an optical axis of the pulsed light PL output from the pulse formation unit 3. The pulsed light PL output from the pulse formation unit 3 is incident on the measurement object B. The pulsed light PL which has been transmitted through the measurement object B is output from the measurement object B. Alternatively, the pulsed light PL which has been reflected or scattered in the measurement object B may be output from the measurement object B. The temporal waveform of the pulsed light PL changes in accordance with optical property of the measurement object B.

The optical system 4 is arranged on an optical path of the pulsed light PL output from the measurement object B. The optical system 4 has an attenuation unit 41. An attenuation rate of the attenuation unit 41 with respect to one wavelength component constituting the pulsed light PL is larger than an attenuation rate of the attenuation unit 41 with respect to another wavelength component constituting the pulsed light PL. In an example, the attenuation unit 41 has a wavelength filter. The wavelength filter has a cutoff band including a wavelength of the one wavelength component constituting the pulsed light PL and has a transmission band including a wavelength of the another wavelength component constituting the pulsed light PL. The wavelength filter may be any filter of a band-pass filter, a high-pass filter, and a low-pass filter. In the present embodiment, the one wavelength component constituting the pulsed light PL is pump light incident on the measurement object B when the time response inside the measurement object B caused by light incidence is measured. The another wavelength component constituting the pulsed light PL is probe light incident on the measurement object B when the time response inside the measurement object B caused by light incidence is measured.

The optical system 4 is configured to be able to switch between a first state in which the attenuation unit 41 is arranged on the optical path of the pulsed light PL output from the measurement object B and a second state in which the attenuation unit 41 is not arranged on the optical path. The optical system 4 is set in the first state when the time response inside the measurement object B caused by light incidence is measured and is set in the second state when the wavelength dispersion amount of the measurement object B is measured.

Figure 4A:
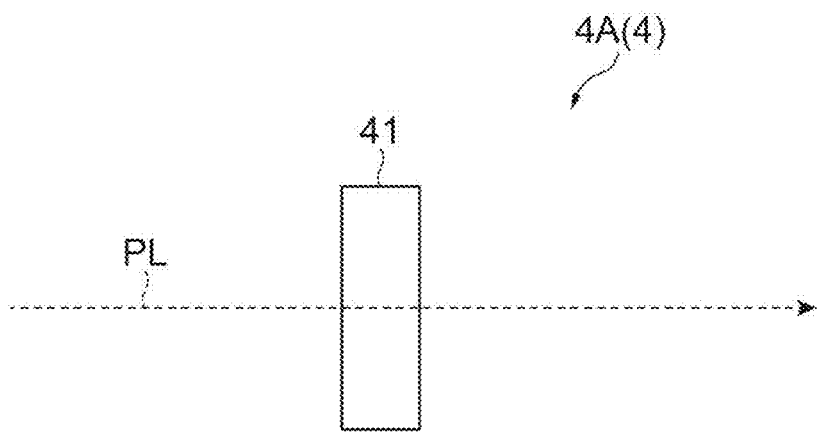
FIGS. 4A and 4B are diagrams schematically illustrating an example of an optical system.
Figure 4B:
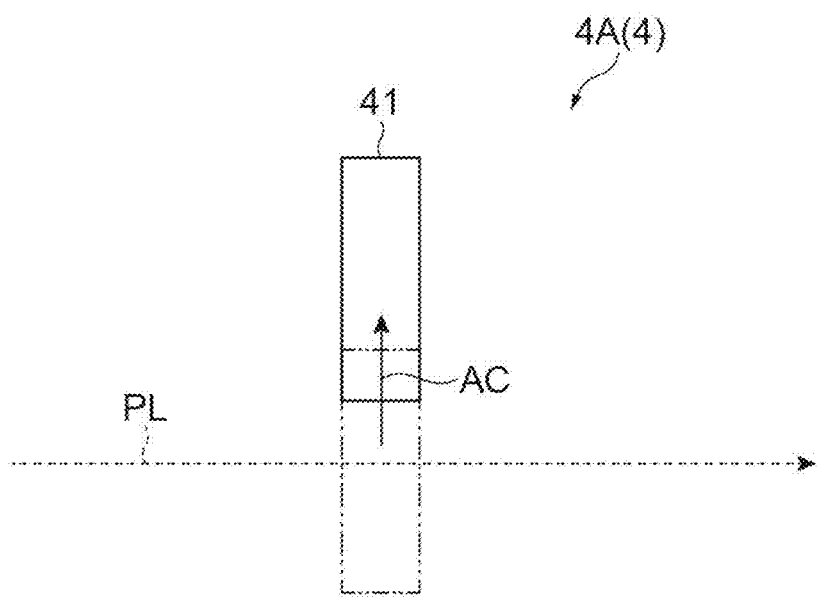

FIGS. 4A and 4B are diagrams schematically illustrating an optical system 4A as an example of the optical system 4. In the optical system 4A, the attenuation unit 41 is supported by an actuator (not illustrated) so that it can move (arrow AC in FIG. 4B) in a direction intersecting the optical axis of the pulsed light PL (for example, a direction orthogonal to the optical axis of the pulsed light PL). For example, a position of the actuator in the direction is controlled by the control unit 18. FIG. 4A illustrates the first state in which the attenuation unit 41 is arranged on the optical path of the pulsed light PL output from the measurement object B. FIG. 4B illustrates the second state in which the attenuation unit 41 is not arranged on the optical path of the pulsed light PL output from the measurement object B. In the second state, the pulsed light PL passes through a lateral side of the attenuation unit 41.

Figure 5A:
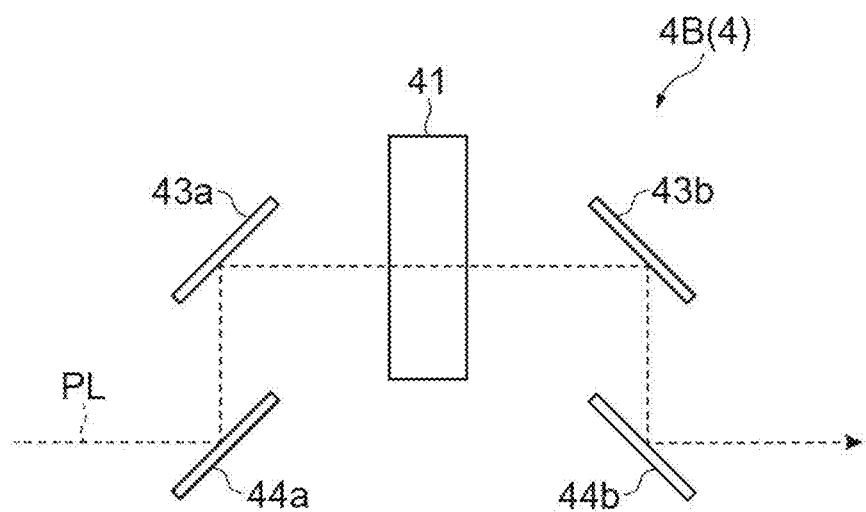
FIGS. 5A and 5B are diagrams schematically illustrating another example of an optical system.
Figure 5B:
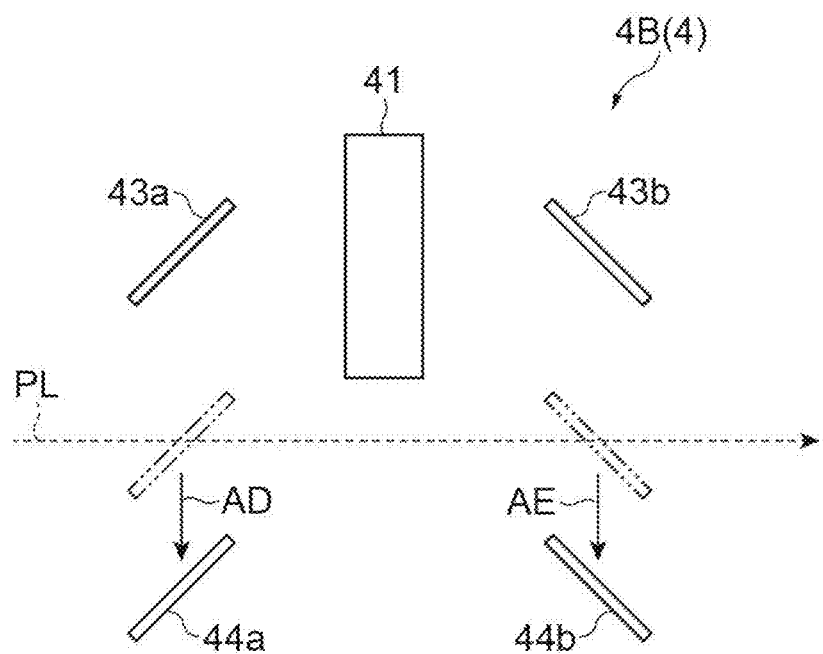

FIGS. 5A and 5B are diagrams schematically illustrating an optical system 4B as another example of the optical system 4. In addition to the attenuation unit 41, the optical system 4B has a configuration for switching between two optical paths for the pulsed light PL. The attenuation unit 41 is arranged on either optical path of the two optical paths. Specifically, the optical system 4B has a pair of fixed mirrors 43a and 43b and a pair of movable mirrors 44a and 44b. The movable mirrors 44a and 44b are arranged side by side along the optical axis of the pulsed light PL when being incident on the optical system 4B. The movable mirrors 44a and 44b are supported by an actuator (not illustrated) so that it can move (arrows AD and AE in FIG. 5B). The fixed mirror 43a optically couples the movable mirror 44a with the attenuation unit 41. The fixed mirror 43b optically couples the attenuation unit 41 with the movable mirror 44b.

FIG. 5A illustrates the first state in which the attenuation unit 41 is arranged on the optical path of the pulsed light PL output from the measurement object B. In the first state, the movable mirrors 44a and 44b are arranged on the optical axis of the pulsed light PL. The pulsed light PL is input to the optical system 4B, is consecutively reflected by the movable mirror 44a and the fixed mirror 43a, and reaches the attenuation unit 41. After having passed through the attenuation unit 41, the pulsed light PL is consecutively reflected by the fixed mirror 43b and the movable mirror 44b and is output from the optical system 4B. FIG. 5B illustrates the second state in which the attenuation unit 41 is not arranged on the optical path of the pulsed light PL output from the measurement object B. In the second state, the movable mirrors 44a and 44b are not arranged on the optical axis of the pulsed light PL, and the pulsed light PL is output from the optical system 4B as it is without going through the movable mirrors 44a and 44b.

In this example, the attenuation unit 41 is arranged on one optical path including the fixed mirrors 43a and 43b, but the attenuation unit 41 may be arranged on the optical path between the movable mirror 44a and the movable mirror 44b in the state illustrated in FIG. 5A, that is, the other optical path not including the fixed mirrors 43a and 43b. In that case, the positions of the movable mirrors 44a and 44b illustrated in FIG. 5A form the second state, and the positions of the movable mirrors 44a and 44b illustrated in FIG. 5B form the first state.

Figure 6A:
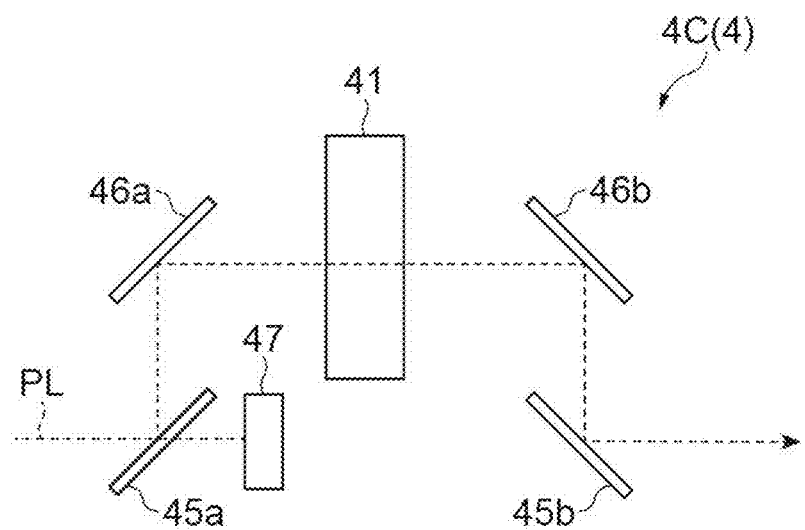
FIGS. 6A and 6B are diagrams schematically illustrating still another example of an optical system.
Figure 6B:
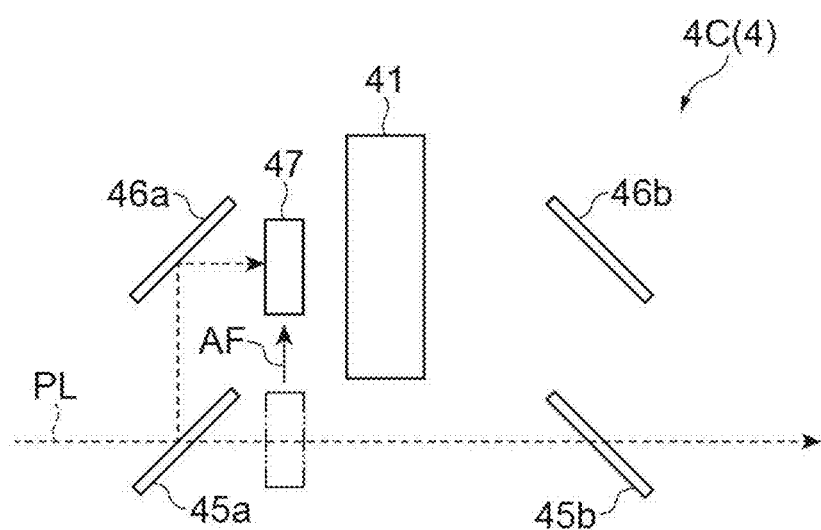

FIGS. 6A and 6B are diagrams schematically illustrating an optical system 4C as still another example of the optical system 4. In addition to the attenuation unit 41, the optical system 4C also has a configuration for switching between two optical paths for the pulsed light PL. The attenuation unit 41 is arranged on either optical path of the two optical paths. Specifically, the optical system 4C has a pair of half mirrors 45a and 45b, a pair of fixed mirrors 46a and 46b, and a light absorption member 47. The pulsed light PL input to the optical system 4C first reaches the half mirror 45a and branches into two by the half mirror 45a. One surface of the half mirror 45a is optically coupled to the attenuation unit 41 by the fixed mirror 46a. The other surface of the half mirror 45a is optically coupled to one surface of the half mirror 45b. The other surface of the half mirror 45b is optically coupled to the attenuation unit 41 by the fixed mirror 46b. The light absorption member 47 is supported by an actuator (not illustrated) so that the light absorption member 47 can move (arrow AF in FIG. 6B).

FIG. 6A illustrates the first state in which the attenuation unit 41 is arranged on the optical path of the pulsed light PL output from the measurement object B. In the first state, the light absorption member 47 is arranged on an optical path between the half mirror 45a and the half mirror 45b. The optical path does not pass through the attenuation unit 41. At this time, a part of the pulsed light PL which has branched by the half mirror 45a is reflected by the fixed mirror 46a and reaches the attenuation unit 41. After passing through the attenuation unit 41, the pulsed light PL is consecutively reflected by the fixed mirror 46b and the half mirror 45b and is output from the optical system 4C. The remaining part of the pulsed light PL which has branched by the half mirror 45a is incident on the light absorption member 47 and disappears. FIG. 6B illustrates the second state in which the attenuation unit 41 is not arranged on the optical path of the pulsed light PL output from the measurement object B. In the second state, the light absorption member 47 is arranged on any optical path between the half mirror 45a and the attenuation unit 41 or between the attenuation unit 41 and the half mirror 45b. At this time, a part of the pulsed light PL which has branched by the half mirror 45a is incident on the light absorption member 47 and disappears. The remaining part of the pulsed light PL which has branched by the half mirror 45a passes through the optical path between the half mirror 45a and the half mirror 45b, in which the attenuation unit 41 is not provided, and is output from the optical system 4C. In the optical system 4C, in place of the light absorption member 47, a light reflection member or a light diffusion member may also be used.

FIG. 1 will be referred to again. The waveform measurement unit 5 measures the temporal waveform of the pulsed light PL having passed through the optical system 4. The waveform measurement unit 5 of the present embodiment has a correlation optical system 50 and a photodetector 51.

The correlation optical system 50 is optically coupled to the optical system 4 and receives the pulsed light PL having passed through the optical system 4. The correlation optical system 50 converts the pulsed light PL into correlation light including a cross-correlation or an auto-correlation. The pulsed light PL converted into correlation light is output from the correlation optical system 50.

Figure 7:
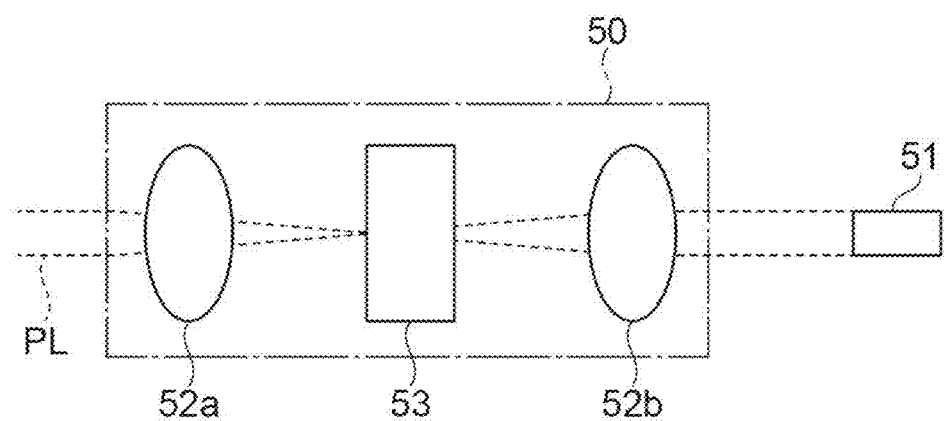
FIG. 7 is a diagram illustrating an example of a configuration of a correlation optical system.

FIG. 7 is a diagram illustrating an example of a configuration of the correlation optical system 50. The correlation optical system 50 may be constituted to include a lens 52a, an optical element 53, and a lens 52b. The lens 52a is provided on an optical path between the optical system 4 and the optical element 53 and focuses the pulsed light PL having passed through the optical system 4 on the optical element 53. For example, the optical element 53 is a luminous body including either one or both of a nonlinear optical crystal generating second-harmonic wave (SHG), and a fluorescent body. Examples of the nonlinear optical crystal include a KTP ($KTiOPO_4$) crystal, an LBO ($LiB_3O_5$) crystal, and a BBO ($\beta$-$BaB_2O_4$) crystal. Examples of the fluorescent body include coumarin, stilbene, and rhodamine. The optical element 53 inputs the pulsed light PL and transforms the pulsed light PL into correlation light including a cross-correlation or an auto-correlation. The lens 52b causes the pulsed light PL, which has been transformed into correlation light and output from the optical element 53, to be collimated or focused. The pulsed light PL is transformed into correlation light in order to more accurately detect a temporal waveform of the pulsed light PL.

Figure 8:
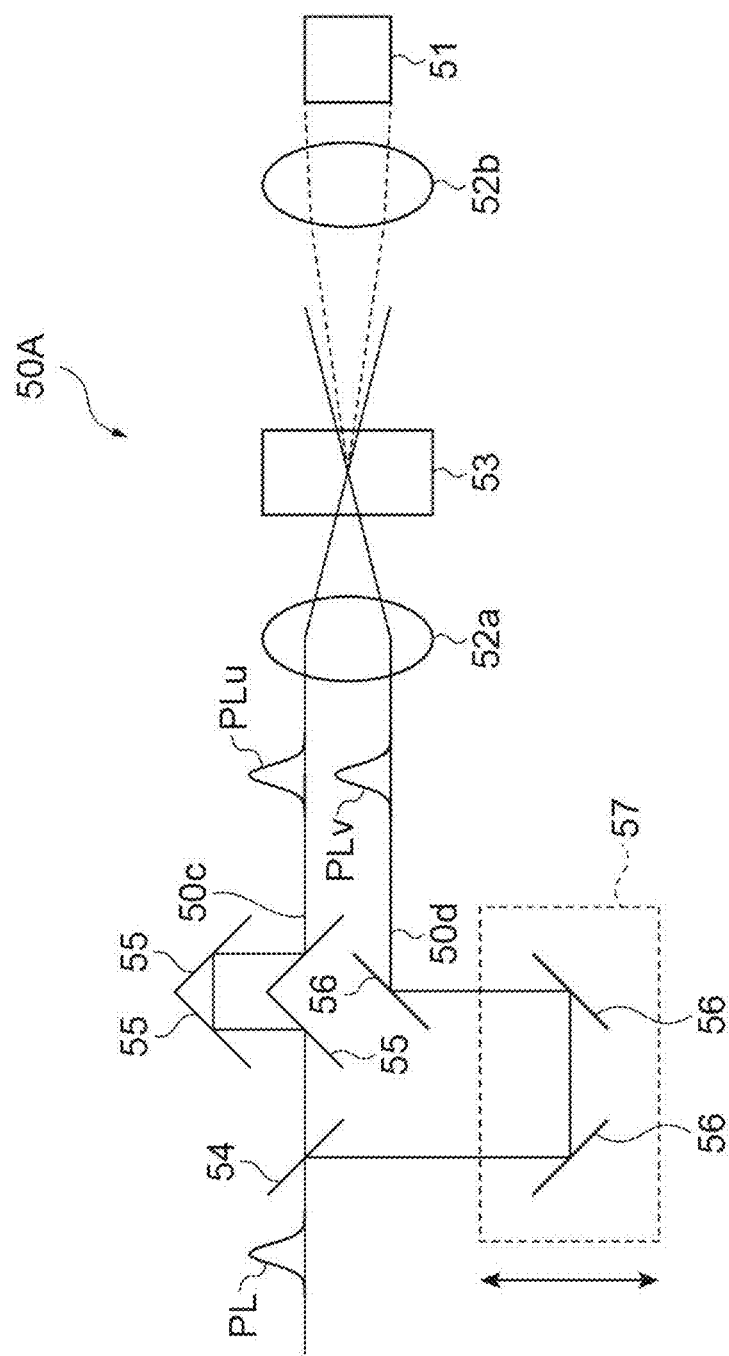
FIG. 8 is a diagram schematically illustrating a correlation optical system for converting incident pulsed light into correlation light including an auto-correlation.

Here, an example of a configuration of the correlation optical system 50 will be described in detail. FIG. 8 is a diagram schematically illustrating a correlation optical system 50A, as an example of a configuration of the correlation optical system 50, for converting the incident pulsed light PL into correlation light including an auto-correlation. The correlation optical system 50A has a beam splitter 54 as an optical branching component for branching the pulsed light PL into two beams. The beam splitter 54 is optically coupled to the optical system 4, allows a part of the pulsed light PL which has been input from the optical system 4 to be transmitted therethrough, and reflects the remaining part of the pulsed light PL. For example, a branching ratio of the beam splitter 54 is 1:1. Pulsed light PLu which is one pulsed light branched by the beam splitter 54 reaches the lens 52a through an optical path 50c including a plurality of mirrors 55. Pulsed light PLv which is the other pulsed light branched by the beam splitter 54 reaches the lens 52a through an optical path 50d including a plurality of mirrors 56. An optical length of the optical path 50c is different from an optical length of the optical path 50d. Therefore, the plurality of mirrors 55 and the plurality of mirrors 56 constitute a delay optical system for providing a time difference between the pulsed light PLu and the pulsed light PLv which have branched by the beam splitter 54. Moreover, at least some of the plurality of mirrors 56 are mounted on a movable stage 57, and the optical length of the optical path 50d is variable. Hence, in this configuration, a time difference between the pulsed light PLu and the pulsed light PLv can be made variable.

In this example, the optical element 53 includes a nonlinear optical crystal. The lens 52a focuses each of the pulsed light PLu and the pulsed light PLv toward the optical element 53 and causes optical axes of the pulsed light PLu and the pulsed light PLv to intersect with each other at a predetermined angle in the optical element 53. As a result, in the optical element 53 that is a nonlinear optical crystal, second-harmonic wave is generated from the intersection of the pulsed light PLu and the pulsed light PLv as a starting point. The second-harmonic wave is correlation light and includes the auto-correlation of the pulsed light PL. The correlation light is collimated or focused by the lens 52b and then input to the photodetector 51.

Figure 9:
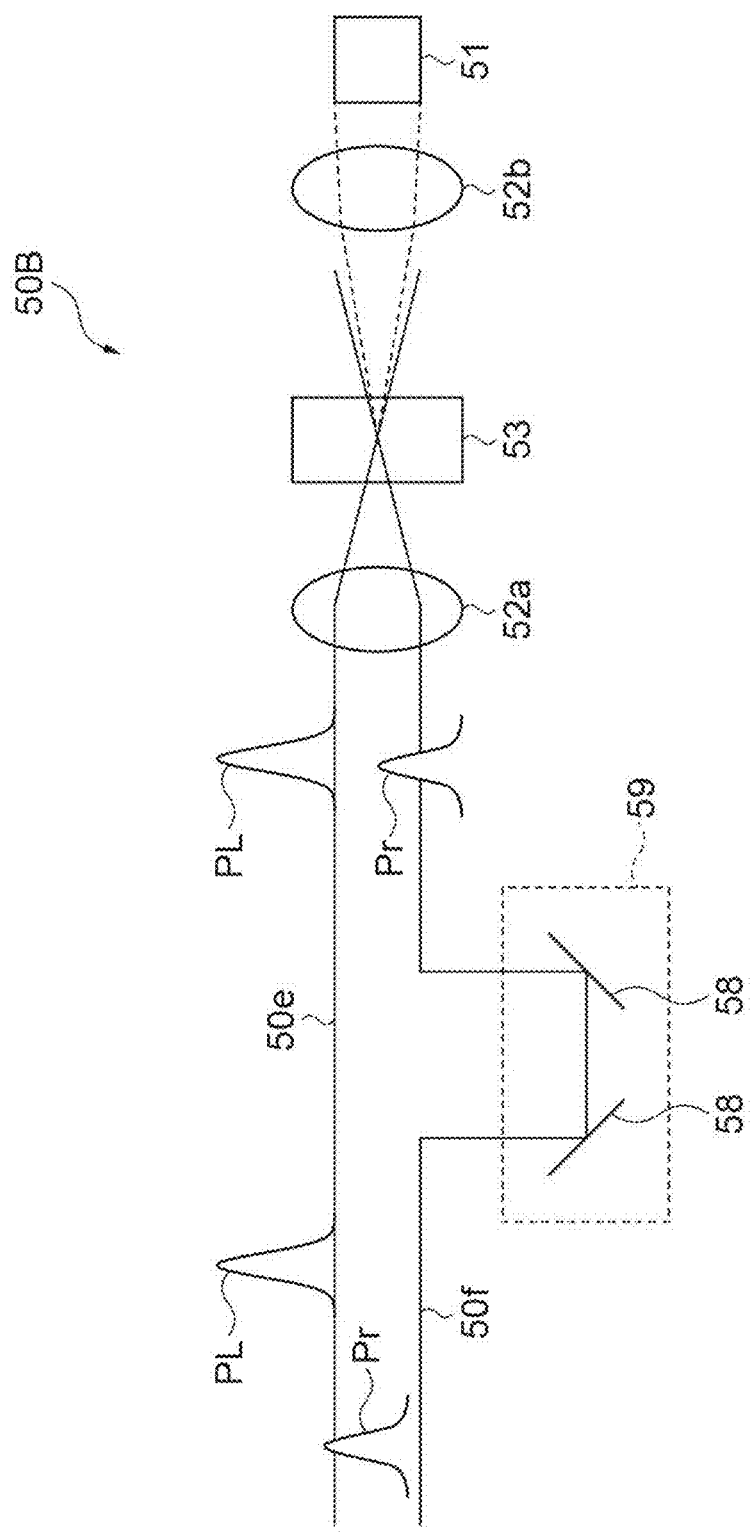
FIG. 9 is a diagram schematically illustrating a correlation optical system for converting pulsed light into correlation light including a cross-correlation.

FIG. 9 is a diagram schematically illustrating a correlation optical system 50B, as another example of a configuration of the correlation optical system 50, for transforming the pulsed light PL into correlation light including a cross-correlation. In the correlation optical system 50B, the pulsed light PL reaches the lens 52a through an optical path 50e, and reference pulsed light Pr reaches the lens 52a through an optical path 50f. The optical path 50f includes a plurality of mirrors 58 and is curved in a U-shape. Moreover, at least some of the plurality of mirrors 58 are mounted on a movable stage 59, and an optical length of the optical path 50f is variable. Hence, in this configuration, a time difference (a difference in timing of arrival at the lens 52a) between the pulsed light PL and the reference pulsed light Pr can be made variable.

In this example also, the optical element 53 includes a nonlinear optical crystal. The lens 52a focuses the pulsed light PL and the reference pulsed light Pr toward the optical element 53, and causes the optical axis of the pulsed light PL and the optical axis of the reference pulsed light Pr to intersect with each other at a predetermined angle in the optical element 53. As a result, in the optical element 53 that is a nonlinear optical crystal, second-harmonic wave is generated from the intersection of the pulsed light PL and the reference pulsed light Pr as a starting point. The second-harmonic wave is correlation light and includes the cross-correlation of the pulsed light PL. The correlation light is collimated or focused by the lens 52b and then input to the photodetector 51.

Figure 10:
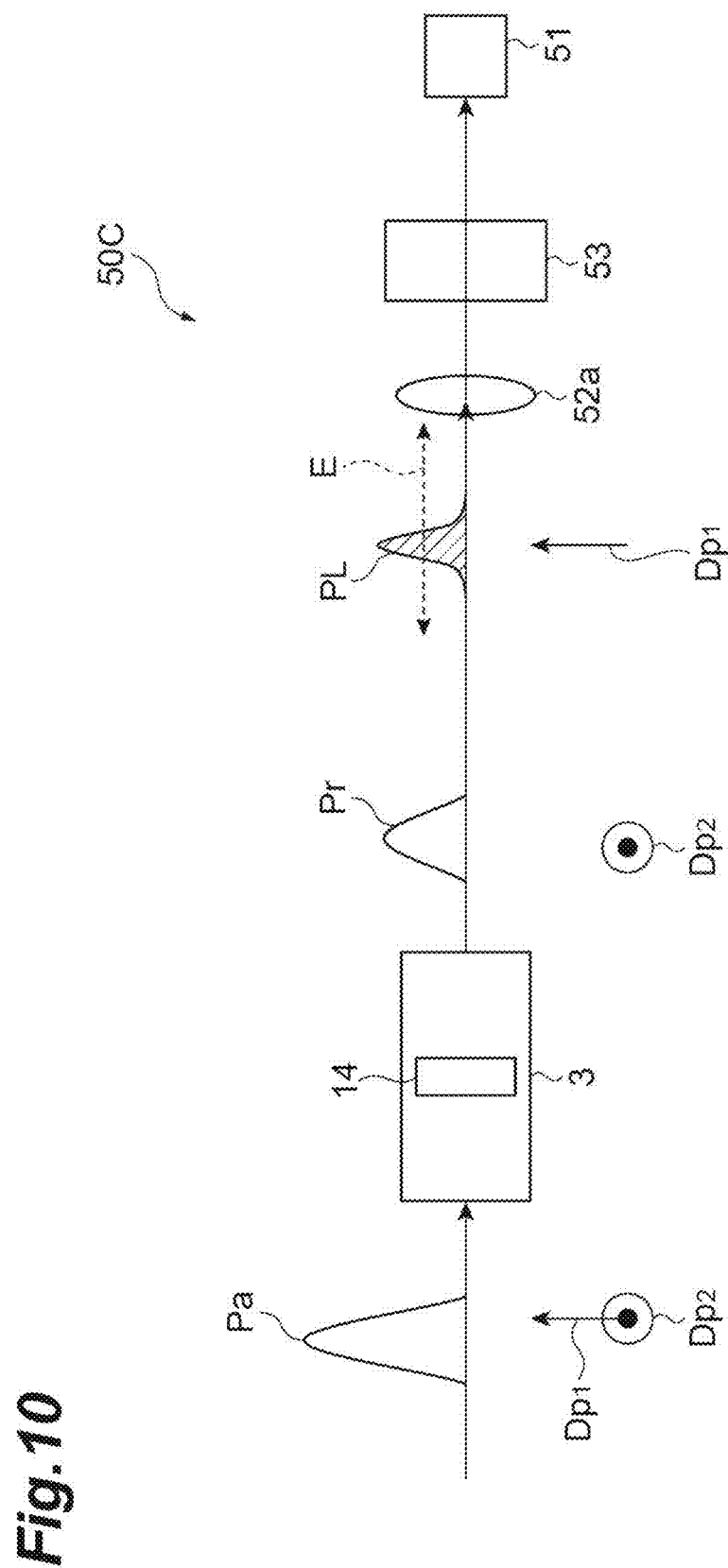
FIG. 10 is a diagram schematically illustrating a correlation optical system for converting pulsed light into correlation light including a cross-correlation.

FIG. 10 is a diagram schematically illustrating a correlation optical system 50C, as still another example of a configuration of the correlation optical system 50, for transforming the pulsed light PL into correlation light including a cross-correlation. In this example, the SLM 14 of the pulse formation unit 3 is a polarization dependent type spatial light modulator having modulation function in a first polarization direction. In addition, a polarization plane of the initial pulsed light Pa input to the pulse formation unit 3 is inclined with respect to the polarization direction in which the SLM 14 has the modulation function, and the initial pulsed light Pa includes a polarization component (arrow $Dp_1$ in the drawing) in the first polarization direction and a polarization component (symbol $Dp_2$ in the drawing) in a second polarization direction orthogonal to the first polarization direction. The polarization of the initial pulsed light Pa is not limited to the foregoing polarization (inclined linear polarization) and may be elliptical polarization.

The polarization component of the first polarization direction in the initial pulsed light Pa is modulated by the SLM 14 and is output from the pulse formation unit 3 as the pulsed light PL. Meanwhile, the polarization component of the second polarization direction in the initial pulsed light Pa is not modulated by the SLM 14, and is output from the pulse formation unit 3 without change. The polarization component which has not been modulated is provided to the correlation optical system 50C coaxially with the pulsed light PL as the reference pulsed light Pr. The correlation optical system 50C generates correlation light including the cross-correlation of the pulsed light PL from the pulsed light PL and the reference pulsed light Pr. In this example of a configuration, the time difference (a difference in timing of arrival at the lens 52a) between the pulsed light PL and the reference pulsed light Pr can be made variable by providing a delay to the pulsed light PL by the SLM 14 and making the delay time variable (arrow E in the drawing), and the correlation light including the cross-correlation of the pulsed light PL can be generated in the correlation optical system 50C.

As illustrated in FIGS. 8 to 10, the correlation optical system 50 is an optical system in which the pulsed light PL is superimposed spatially and temporally on the pulsed light PL itself or different pulsed light. Specifically, a correlation waveform in proportion to the shape of the temporal waveform of the pulsed light PL is detected by temporally sweeping one of these pulsed light. Here, generally, since sweeping of the pulsed light is performed by spatially changing the optical path length using a driving stage or the like, a movement length of the stage corresponds to a time delay of the correlation waveform. At this time, the time delay is extremely smaller than the stage movement length. Therefore, since a pulse shape is observed with a high time-resolved scale reaching a femtosecond order in the photodetector 51 by employing the correlation optical system 50, the temporal waveform of the pulsed light PL is more accurately detected.

FIG. 1 will be referred to again. The photodetector 51 receives the pulsed light PL which has been converted into correlation light and output from the correlation optical system 50. The photodetector 51 detects the temporal waveform of this pulsed light PL. For example, the photodetector 51 is constituted to include a photodetector such as a photodiode. The photodetector 51 detects the temporal waveform of the pulsed light PL by converting the intensity of the pulsed light PL into an electrical signal. The electrical signal which is a detection result is provided to the analysis unit 6.

Figure 11:
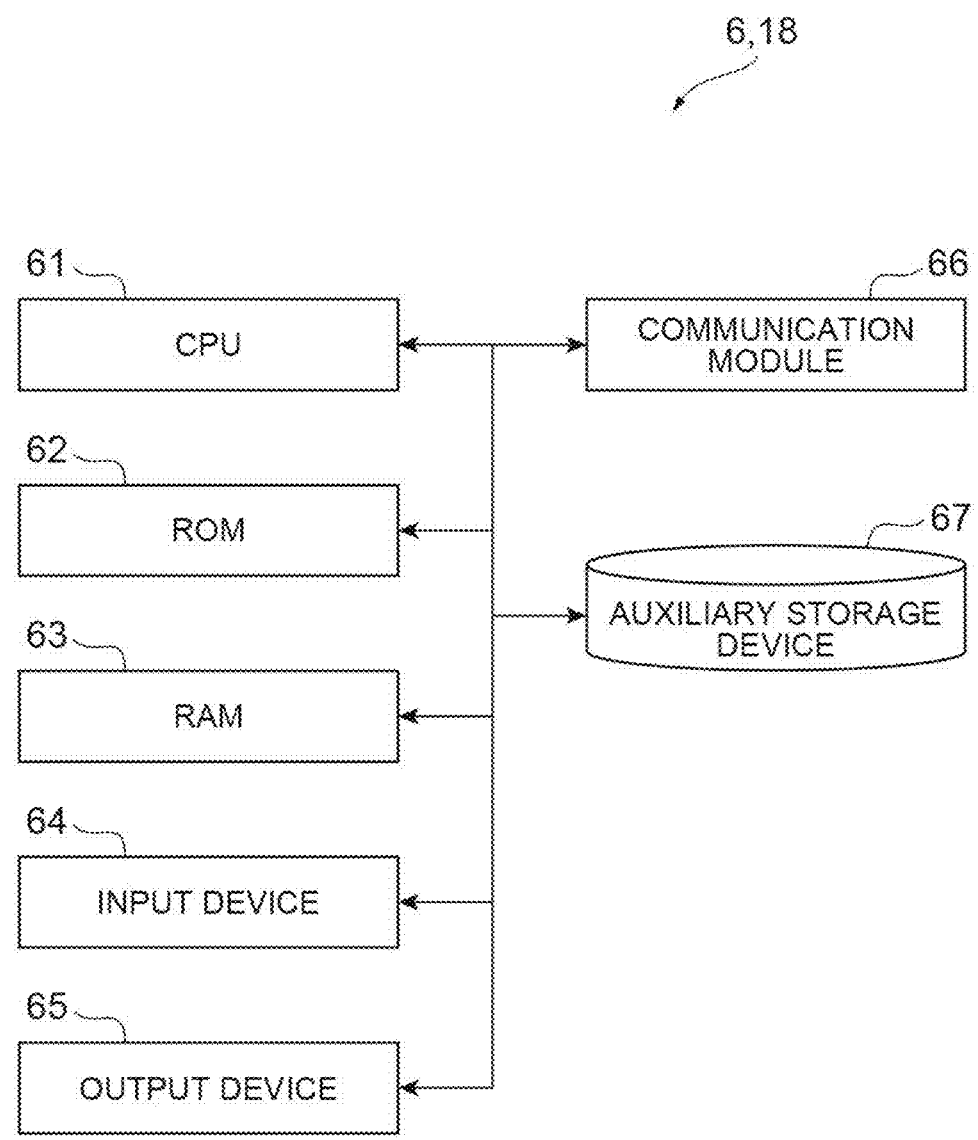
FIG. 11 is a diagram schematically illustrating an example of a configuration of hardware of an analysis unit and a control unit.

The analysis unit 6 is electrically connected to the photodetector 51. The analysis unit 6 obtains optical property of the measurement object B based on the temporal waveform of the pulsed light PL converted into correlation light. FIG. 11 is a diagram schematically illustrating an example of a configuration of hardware of the analysis unit 6 and the control unit 18. As illustrated in FIG. 11, the analysis unit 6 and the control unit 18 may be constituted as an ordinary computer physically including a processor (CPU) 61; a main storage device such as a ROM 62 or a RANI 63; an input device 64 such as a keyboard, a mouse, or a touch screen; an output device 65 such as a display (including a touch screen); a communication module 66 such as a network card for transmitting and receiving data with respect to other devices; an auxiliary storage device 67 such as a hard disk; and the like.

The auxiliary storage device 67 of the control unit 18 stores a plurality of pieces of data relating to a plurality of phase modulation patterns for generating the pulsed light PL. The processor 61 reads one of the pieces of data as necessary and controls the phase modulation patterns presented to the SLM 14 based on the data.

The auxiliary storage device 67 of the analysis unit 6 stores a program for obtaining optical property of the measurement object B based on the temporal waveform of the pulsed light PL converted into correlation light. In other words, the program for obtaining optical property of the measurement object B causes the processor 61 of the computer to operate as the analysis unit 6. The processor 61 obtains optical property of the measurement object B by executing this program. A storage device storing a program for obtaining optical property of the measurement object B may be a non-transitory recording medium. Examples of the recording medium include a recording medium such as a flexible disk, a CD, or a DVD; a recording medium such as a ROM; a semiconductor memory; a cloud server, and the like. Information relating to obtained optical property of the measurement object B is output to the output device 65 or output to an external device via the communication module 66.

Figure 12:
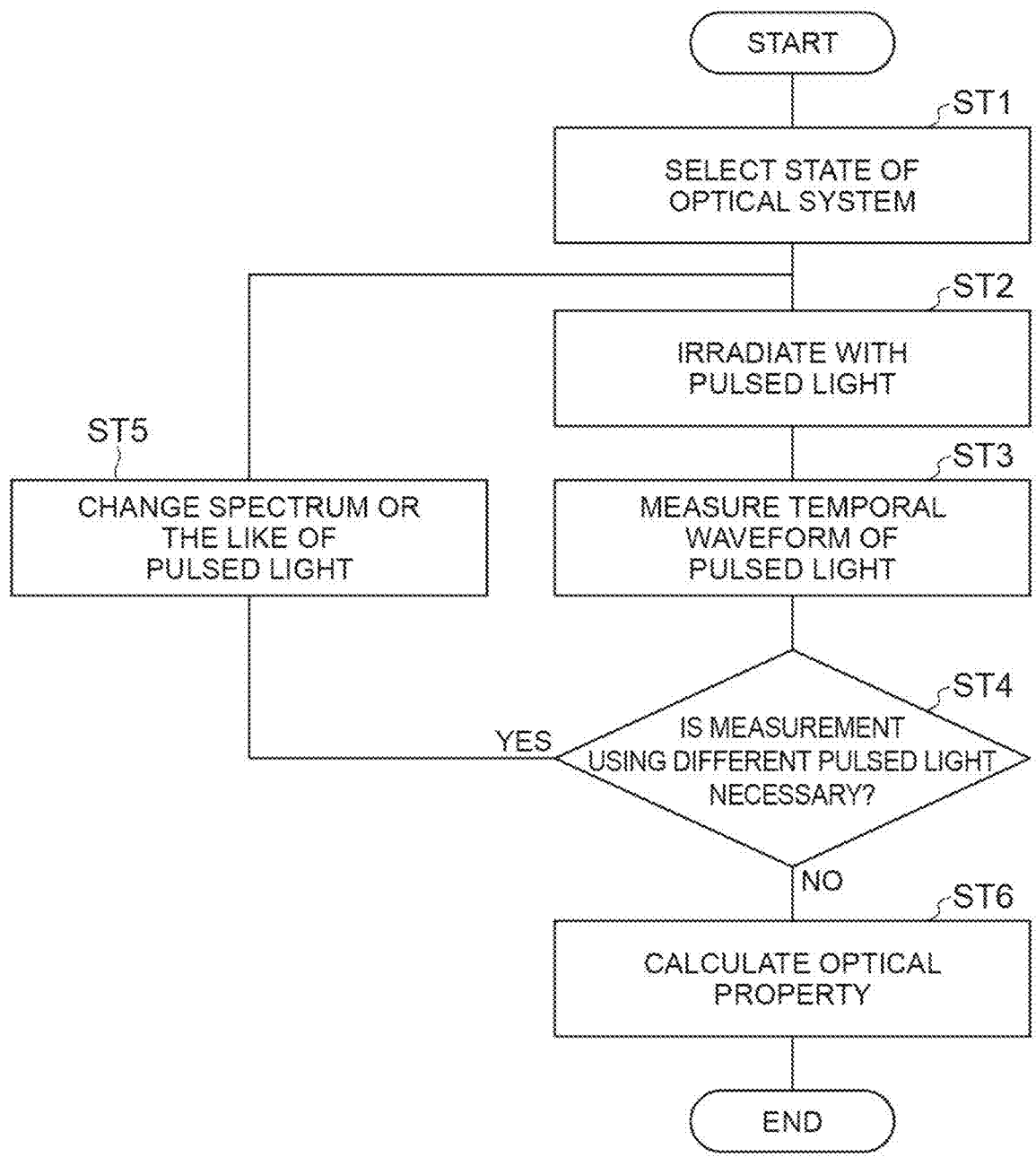
FIG. 12 is a flowchart showing an optical property measurement method according to one embodiment.

The optical property measurement method of the present embodiment will be described. FIG. 12 is a flowchart showing an optical property measurement method of the present embodiment. For example, this optical property measurement method is performed using the optical property measurement apparatus 1A described above.

First, in the optical system 4, any state of the first state (a state in which the attenuation unit 41 is arranged on the optical path of the pulsed light PL output from the measurement object B) and the second state (a state in which the attenuation unit 41 is not arranged on the optical path of the pulsed light PL output from the measurement object B) is selected (Step ST1). Next, the measurement object B is irradiated using the pulse formation unit 3 with the pulsed light PL having at least one of the number of pulses, the spectrum, and the temporal waveform, according to the type of the optical property to be measured (Step ST2). In Step ST2, the pulsed light PL is generated using the SLM 14 performing at least any modulation of phase modulation and intensity modulation of the input initial pulsed light Pa. In Step ST2, the pulsed light PL may be generated using the SLM 14 performing phase modulation and intensity modulation of the input initial pulsed light Pa at the same time. The types of the optical properties to be measured include the time response inside the measurement object B caused by light incidence and the wavelength dispersion amount of the measurement object B. In Step ST1, the first state is selected when the time response is measured, and the second state is selected when the wavelength dispersion amount is measured. Subsequently, the temporal waveform of the pulsed light PL having passed through the optical system 4 after being output from the measurement object B is measured (Step ST3). Steps ST2 and ST3 may be repeated as many times as necessary while changing at least one of the number of pulses, the spectrum, and the temporal waveform of the pulsed light PL in accordance with the type of the optical property to be measured (Steps ST4 and ST5). Thereafter, optical property of the measurement object B is obtained based on the measured temporal waveform (Step ST6).

Here, phase modulation for generating the pulsed light PL in the SLM 14 of the pulse formation unit 3 illustrated in FIG. 2 will be described in detail. A domain in front of the lens 15 (spectrum domain) and a domain behind the diffraction grating 16 (time domain) have a relationship of Fourier transform therebetween, and the phase modulation in the spectrum domain affects a temporal intensity waveform in the time domain. Therefore, light output from the pulse formation unit 3 can have various temporal intensity waveforms different from the initial pulsed light Pa according to the modulation pattern of the SLM 14.

Figure 13:
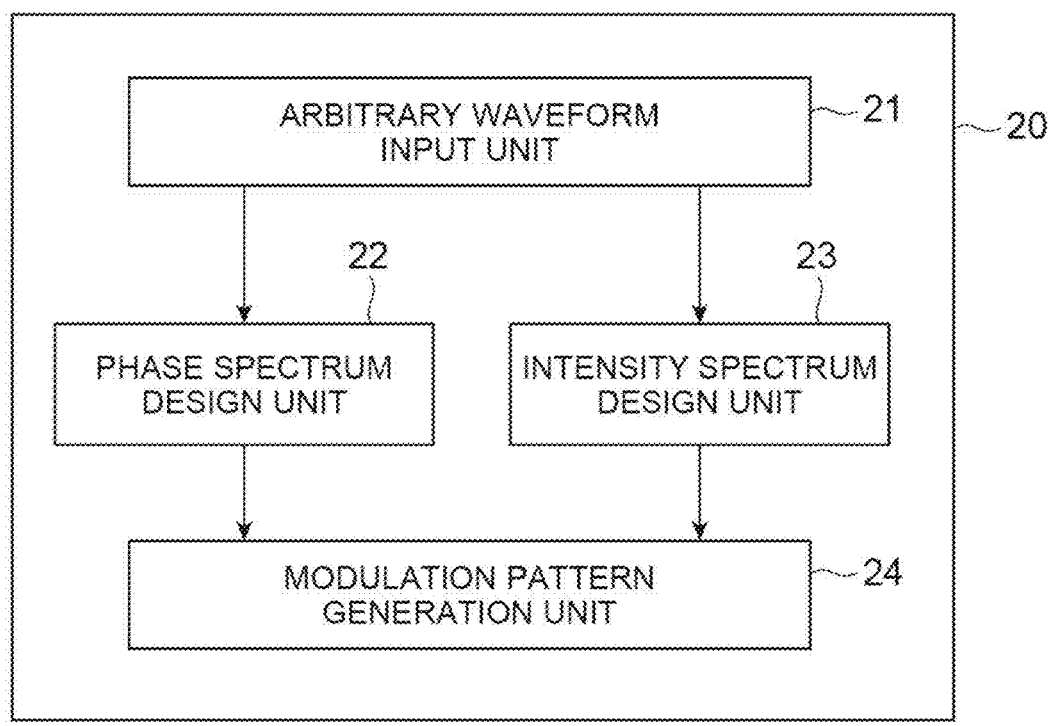
FIG. 13 is a diagram illustrating a configuration of a modulation pattern calculation apparatus for computing a modulation pattern of the spatial light modulator.

FIG. 13 is a diagram illustrating a configuration of a modulation pattern calculation apparatus 20 for computing a modulation pattern of the SLM 14. For example, the modulation pattern calculation apparatus 20 is a personal computer; a smart device such as a smartphone or a tablet terminal; or a computer having a processor such as a cloud server. The control unit 18 illustrated in FIG. 2 may also serve as the modulation pattern calculation apparatus 20. The modulation pattern calculation apparatus 20 calculates a phase modulation pattern for approximating a temporal intensity waveform of the output light of the pulse formation unit 3 to a desired waveform, and provides the phase modulation pattern to the control unit 18. The modulation pattern is data for controlling the SLM 14, and includes a table of intensity of a complex amplitude distribution or intensity of a phase distribution. For example, the modulation pattern is a computer-generated hologram (CGH).

The modulation pattern calculation apparatus 20 of the present embodiment causes the control unit 18 to store a phase pattern including a first phase pattern and a second phase pattern. The first phase pattern is a phase pattern for phase modulation applying a phase spectrum for obtaining a desired waveform to the output light. The second phase pattern is a phase pattern for intensity modulation applying an intensity spectrum for obtaining a desired waveform to the output light. For this reason, as illustrated in FIG. 13, the modulation pattern calculation apparatus 20 has an arbitrary waveform input unit 21, a phase spectrum design unit 22, an intensity spectrum design unit 23, and a modulation pattern generation unit 24. That is, the processor of the computer provided in the modulation pattern calculation apparatus 20 implements a function of the arbitrary waveform input unit 21, a function of the phase spectrum design unit 22, a function of the intensity spectrum design unit 23, and a function of the modulation pattern generation unit 24. The respective functions may be realized by the same processor or may be realized by different processors.

The processor of the computer can implement the above respective functions using a modulation pattern calculation program. Hence, the modulation pattern calculation program causes the processor of the computer to operate as the arbitrary waveform input unit 21, the phase spectrum design unit 22, the intensity spectrum design unit 23, and the modulation pattern generation unit 24 in the modulation pattern calculation apparatus 20. The modulation pattern calculation program is stored inside the computer or in an external storage device (storage medium). The storage device may be a non-transitory recording medium. Examples of the recording medium include a recording medium such as a flexible disk, a CD, or a DVD; a recording medium such as a ROM; a semiconductor memory; a cloud server, and the like.

The arbitrary waveform input unit 21 receives an input of a desired temporal intensity waveform from an operator. An operator inputs information relating to desired number of pulses, spectrum, and temporal waveform (which will hereinafter be referred to as desired number of pulses and the like) of the pulsed light PL to the arbitrary waveform input unit 21. Desired number of pulses and the like are determined by an operator in accordance with the type of the optical property to be measured. Information relating to desired number of pulses and the like is applied from the arbitrary waveform input unit 21 to the phase spectrum design unit 22 and the intensity spectrum design unit 23. The phase spectrum design unit 22 calculates the phase spectrum of the output light of the pulse formation unit 3 suitable for realizing desired number of pulses and the like which have been applied. The intensity spectrum design unit 23 calculates the intensity spectrum of the output light of the pulse formation unit 3 suitable for realizing desired number of pulses and the like which have been applied. The modulation pattern generation unit 24 calculates a phase modulation pattern (for example, a computer-generated hologram) for applying the phase spectrum obtained by the phase spectrum design unit 22 and the intensity spectrum obtained by the intensity spectrum design unit 23 to the output light of the pulse formation unit 3.

Figure 14:
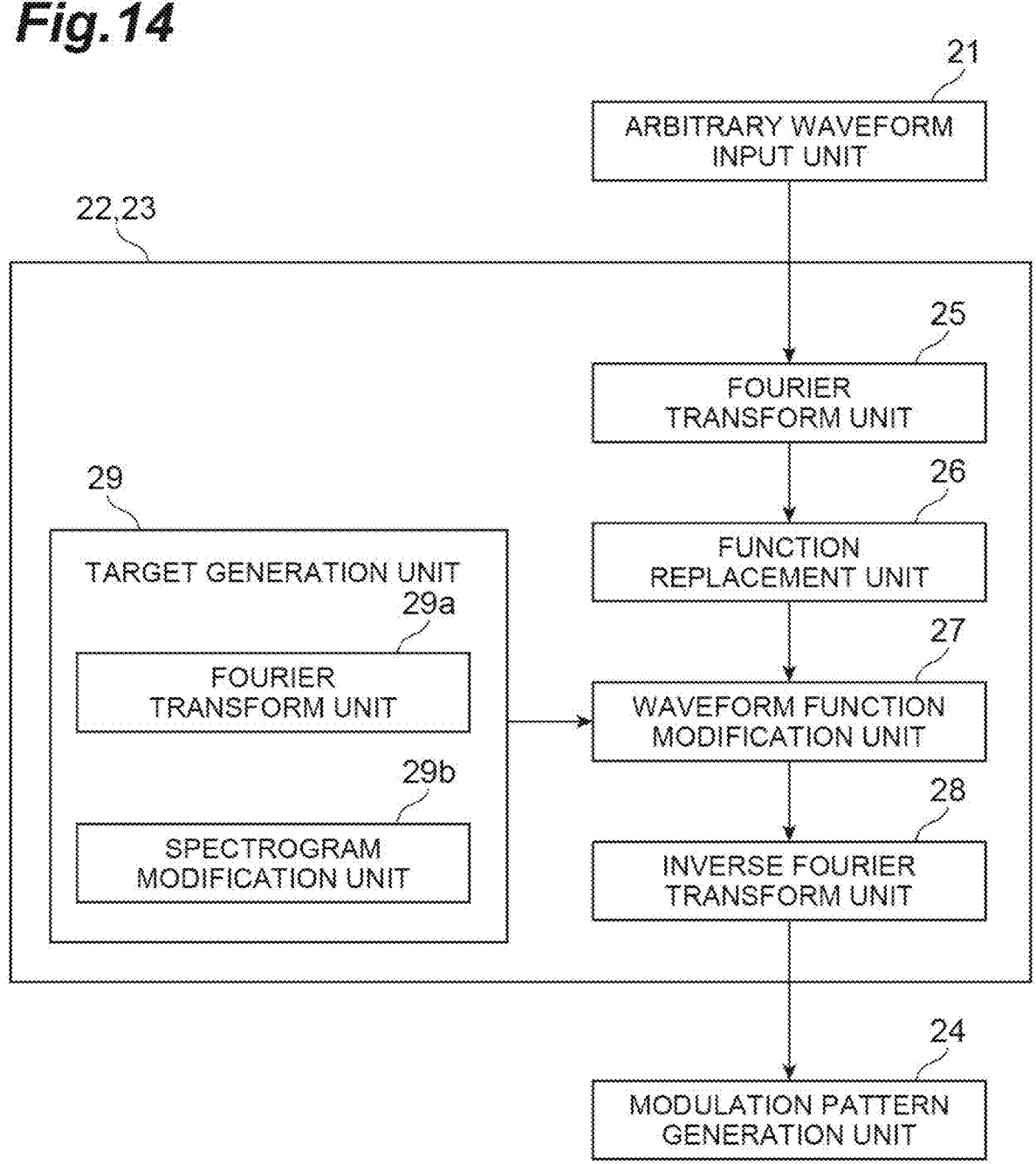
FIG. 14 is a block diagram illustrating internal configurations of a phase spectrum design unit and an intensity spectrum design unit.

FIG. 14 is a block diagram illustrating an internal configuration of the phase spectrum design unit 22 and the intensity spectrum design unit 23. As illustrated in FIG. 14, each of the phase spectrum design unit 22 and the intensity spectrum design unit 23 has a Fourier transform unit 25, a function replacement unit 26, a waveform function correction unit 27, an inverse Fourier transform unit 28, and a target generation unit 29. The target generation unit 29 includes a Fourier transform unit 29a and a spectrogram correction unit 29b. The functions of these components will be described below in detail later.

Figure 15:
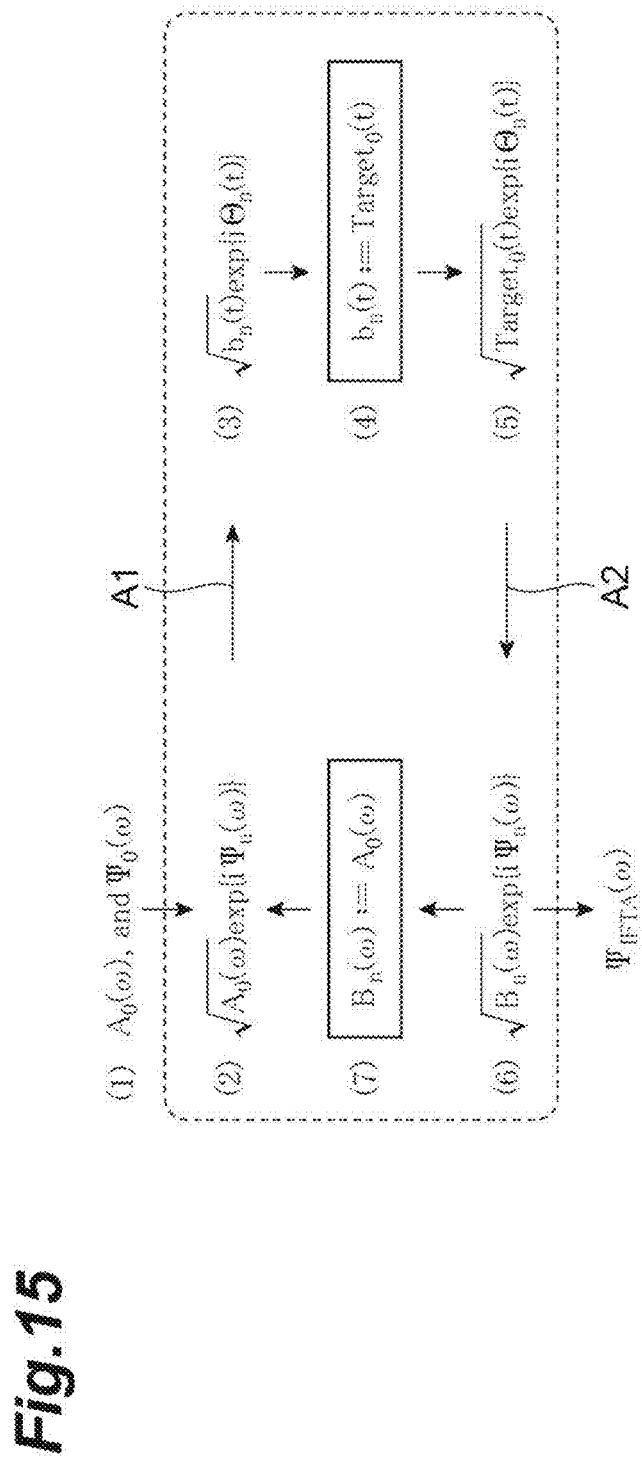
FIG. 15 is a diagram illustrating a procedure of calculation of a phase spectrum by an iterative Fourier transform method.

Here, the desired temporal intensity waveform is expressed as a function in the time domain, and the phase spectrum is expressed as a function in the frequency domain. Therefore, the phase spectrum corresponding to the desired temporal intensity waveform is obtained by iterative Fourier transform based on the desired temporal intensity waveform, for example. FIG. 15 is a diagram illustrating a procedure of calculation of the phase spectrum using the iterative Fourier transform method. First, an initial intensity spectrum function $A_0(\omega)$ and an initial phase spectrum function $\Psi_0(\omega)$ which are functions of a frequency co are prepared (process number (1) in the drawing). In an example, the intensity spectrum function $A_0(\omega)$ and the phase spectrum function $\Psi_0(\omega)$ represent the spectrum intensity and the spectrum phase of input light, respectively. Next, a waveform function (a) in the frequency domain including the intensity spectrum function $A_0(\omega)$ and a phase spectrum function $\Psi_n(\omega)$ is prepared (process number (2) in the drawing).

[Formula 1]

$$\sqrt{A_0(\omega)}\exp\{i\Psi_n(\omega)\} \qquad (a)$$

A subscript n represents after an n-th Fourier transform process. Before an initial (first) Fourier transform process, the initial phase spectrum function $\Psi_0(\omega)$ described above is used as the phase spectrum function $\Psi_n(\omega)$. The factor i is an imaginary number.

Next, a Fourier transform from the frequency domain to the time domain is performed on the function (a) (arrow A1 in the drawing). As a result, a waveform function (b) in the time domain including a temporal intensity waveform function $b_n(t)$ and a temporal phase waveform function $\Theta_n(t)$ is obtained (process number (3) in the drawing).

[Formula 2]

$$\sqrt{b_n(t)}\exp\{i\Theta_n(t)\} \qquad (b)$$

Next, the temporal intensity waveform function 1340 included in the function (b) is replaced by a temporal intensity waveform function $\text{Target}_0(t)$ based on the desired waveform (process numbers (4) and (5) in the drawing).

[Formula 3]

$$b_n(t):=\text{Target}_0(t) \qquad (c)$$

[Formula 4]

$$\text{Target}_0(t)\exp\{i\Theta_n(t)\} \qquad (d)$$

Next, an inverse Fourier transform from the time domain to the frequency domain is performed on the function (d) (arrow A2 in the drawing). As a result, a waveform function (e) in the frequency domain including an intensity spectrum function $B_n(\omega)$ and the phase spectrum function $\Psi_n(\omega)$ is obtained (process number (6) in the drawing).

[Formula 5]

$$\sqrt{B_n(\omega)}\exp\{i\Psi_n(\omega)\} \qquad (e)$$

Next, in order to constrain the intensity spectrum function $B_n(\omega)$ included in the function (e), the intensity spectrum function $B_n(\omega)$ is replaced by the initial intensity spectrum function $A_0(\omega)$ (process number (7) in the drawing).

[Formula 6]

$$B_n(\omega):=A_0(\omega) \qquad (f)$$

Subsequently, the process (2) to (7) are repeatedly performed a plurality of times, so that the shape of the phase spectrum represented by the phase spectrum function $\Psi_n(\omega)$ in the waveform function can be brought close to the shape of the phase spectrum corresponding to a desired temporal intensity waveform. An ultimately obtained phase spectrum function $\Psi_{IFTA}(\omega)$ becomes a basis of a modulation pattern for obtaining the desired temporal intensity waveform.

Figure 16:
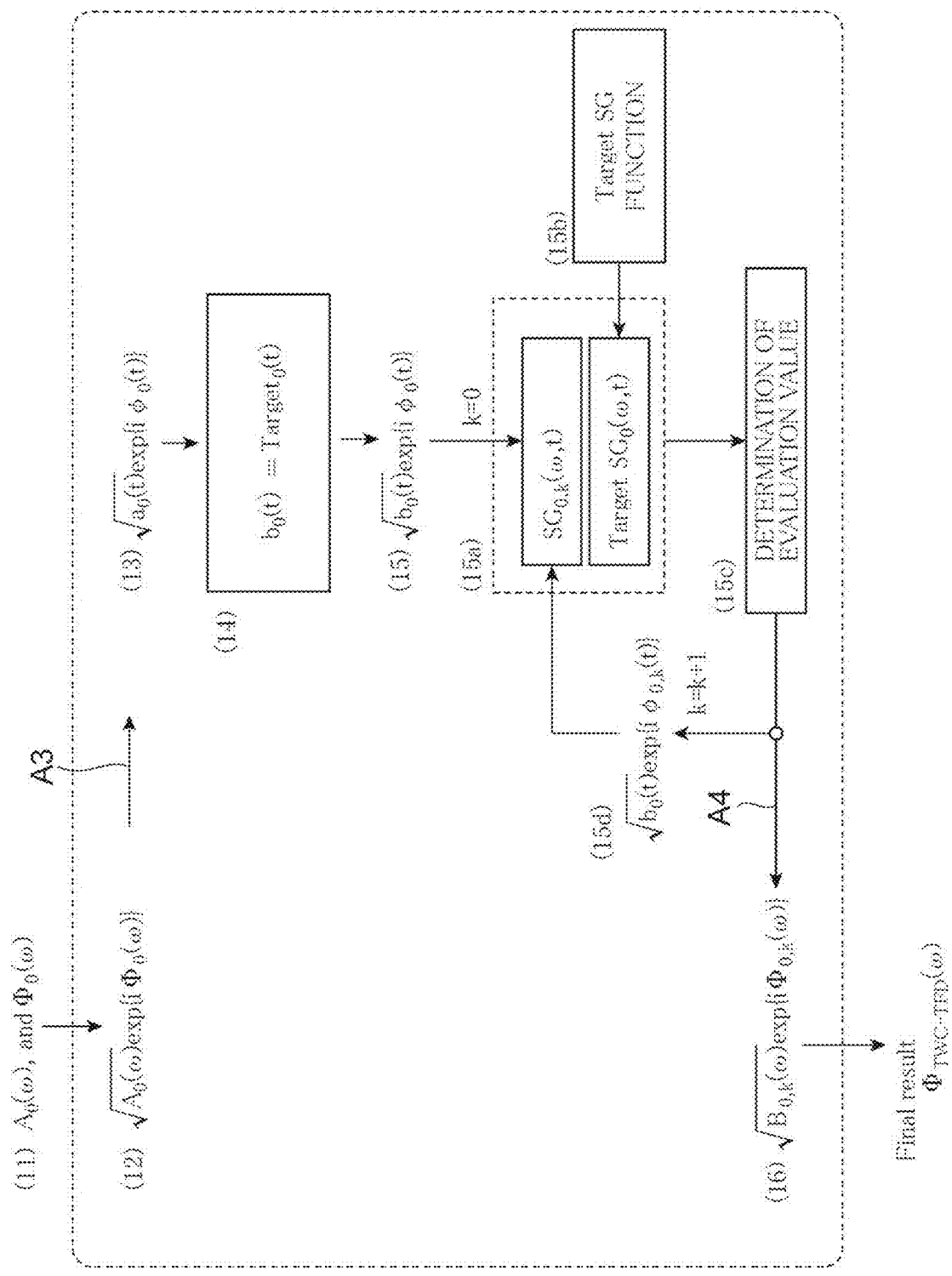
FIG. 16 is a diagram illustrating a procedure of calculation of a phase spectrum function in the phase spectrum design unit.

However, in the iterative Fourier method described above, although it is possible to control the temporal intensity waveform, there is a problem in that it is not possible to control a frequency component (spectrum) constituting the temporal intensity waveform. Therefore, the modulation pattern calculation apparatus 20 according to the present embodiment calculates the phase spectrum function and the intensity spectrum function on which the modulation pattern is based, using a calculation method described below. FIG. 16 is a diagram illustrating a procedure of calculation of the phase spectrum function in the phase spectrum design unit 22. First, the initial intensity spectrum function $A_0(\omega)$ and an initial phase spectrum function $\Phi_0(\omega)$ which are functions of the frequency co are prepared (process number (11) in the drawing). In an example, the intensity spectrum function $A_0(\omega)$ and the phase spectrum function $\Phi_0(\omega)$ represent the spectrum intensity and the spectrum phase of input light, respectively. Next, a first waveform function (g) in the frequency domain including the intensity spectrum function $A_0(\omega)$ and the phase spectrum function $\Phi_0(\omega)$ is prepared (process number (12)). Here, the factor i is an imaginary number.

[Formula 7]

$$\sqrt{A_0(\omega)}\exp\{i\Phi_0(\omega)\} \quad (g)$$

Next, the Fourier transform unit 25 of the phase spectrum design unit 22 performs Fourier transform from the frequency domain to the time domain on the function (g) (arrow A3 in the drawing). As a result, a second waveform function (h) in the time domain including a temporal intensity waveform function $a_0(t)$ and a temporal phase waveform function $\varphi_0(t)$ is obtained (process number (13) in the drawing).

[Formula 8]

$$\sqrt{a_0(t)}\exp\{i\varphi_0\} \quad (h)$$

Next, as shown in the following Formula (i), the function replacement unit 26 of the phase spectrum design unit 22 replaces a temporal intensity waveform function $b_0(t)$ by the temporal intensity waveform function $Target_0(t)$ based on the desired waveform input in the arbitrary waveform input unit 21 (process number (14) in the drawing).

[Formula 9]

$$b_0(t)=Target_0(t) \quad (i)$$

Next, as shown in the following Formula (j), the function replacement unit 26 of the phase spectrum design unit 22 replaces the temporal intensity waveform function $a_0(t)$ by the temporal intensity waveform function $b_0(t)$. That is, the temporal intensity waveform function $a_0(t)$ included in the function (h) is replaced by the temporal intensity waveform function $Target_0(t)$ based on the desired waveform (process number (15) in the drawing).

[Formula 10]

$$\sqrt{b_0(t)}\exp\{i\varphi_0(t)\} \quad (j)$$

Next, the waveform function correction unit 27 of the phase spectrum design unit 22 modifies the second waveform function so as to bring a spectrogram of the second waveform function (j) after the replacement close to a target spectrogram generated in advance in accordance with a desired wavelength band. First, the second waveform function (j) is transformed into a spectrogram $SG_{0,k}(\omega,t)$ by performing a time-frequency transform on the second waveform function (j) after the replacement (process number (15a) in the drawing). The subscript k represents k-th transform processing.

Here, time-frequency transform refers to performing frequency filter processing or numerical calculation processing (processing of deriving a spectrum for each time by multiplying a window function while shifting the window function) on a composite signal such as a temporal waveform, and transforming it into three-dimensional information including a time, a frequency, and an intensity (spectrum intensity) of a signal component. In the present embodiment, the transform result (time, frequency, and spectrum intensity) is defined as a "spectrogram".

Examples of time-frequency transform include a short-time Fourier transform (STFT), a wavelet transform (Haar wavelet transform, Gabor wavelet transform, Mexican-hat wavelet transform, or Morlet wavelet transform), and the like.

A target spectrogram $TargetSG_0(\omega,t)$ generated in advance in accordance with the desired wavelength band is read from the target generation unit 29. The target spectrogram $TargetSG_0(\omega,t)$ is roughly equivalent to a target temporal waveform (a temporal intensity waveform and its constituent frequency component) and is generated by the target spectrogram function of the process number (15b).

Next, the waveform function correction unit 27 of the phase spectrum design unit 22 performs pattern matching between the spectrogram $SG_{0,k}(\omega,t)$ and the target spectrogram $TargetSG_0(\omega,t)$ to check a degree of similarity (how well they are aligned with each other). In the present embodiment, an evaluation value is calculated as an index presenting the degree of similarity. Further, in a subsequent process number (15c), it is determined whether or not the obtained evaluation value satisfies a predetermined end condition. When the condition is satisfied, the process proceeds to a process number (16), and when the condition is not satisfied, the process proceeds to a process number (15d). In the process number (15d), the temporal phase waveform function $\varphi_0(t)$ included in the second waveform function is changed to an arbitrary temporal phase waveform function $\varphi_{0,k}(t)$. The second waveform function after the temporal phase waveform function is changed is transformed into a spectrogram again by the time-frequency transform such as STFT. Subsequently, the process numbers (15a) to (15d) described above are repeatedly performed. In this way, the second waveform function is modified so as to bring the spectrogram $SG_{0,k}(\omega,t)$ gradually close to the target spectrogram $TargetSG_0(\omega,t)$.

Thereafter, the inverse Fourier transform unit 28 of the phase spectrum design unit 22 performs inverse Fourier transform on the modified second waveform function (arrow A4 in the drawing) to generate a third waveform function (k) in the frequency domain (process number (16)).

[Formula 11]

$$\sqrt{B_{0,k}(\omega)}\exp\{i\Phi_{0,k}(\omega)\} \quad (k)$$

A phase spectrum function $\Phi_{0,k}(\omega)$ included in the third waveform function (k) becomes an ultimately obtained desired phase spectrum function $\Phi_{TWC\text{-}TFD}(\omega)$. This phase spectrum function $\Phi_{TWC\text{-}TFD}(\omega)$ is provided to the modulation pattern generation unit 24.

Figure 17:
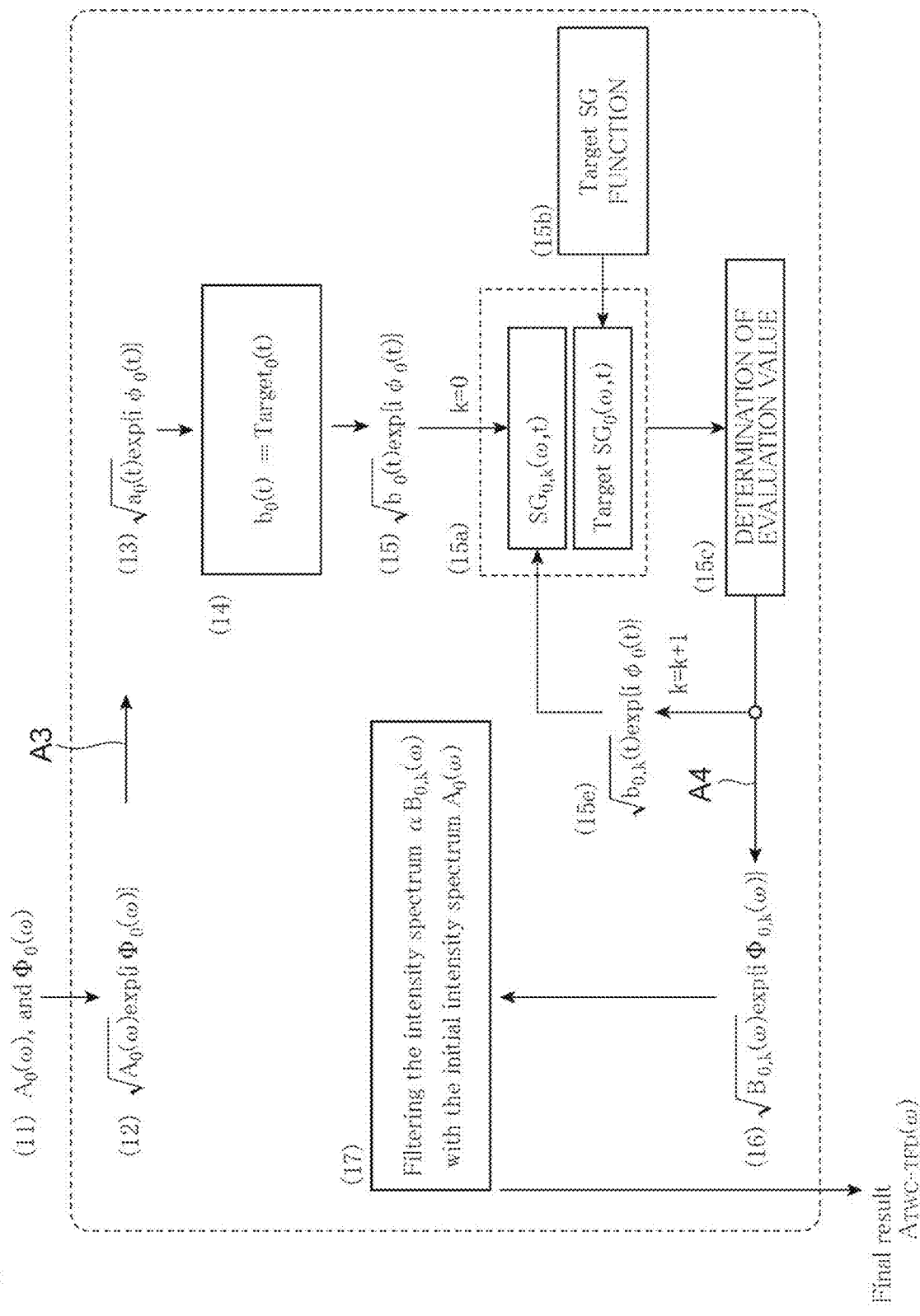
FIG. 17 is a diagram illustrating a procedure of calculation of an intensity spectrum function in the intensity spectrum design unit.

FIG. 17 is a diagram illustrating a procedure of calculation of an intensity spectrum function in the intensity spectrum design unit 23. Since the processes from the process number (11) to the process number (15c) are the same as the procedure of calculation of the spectrum phase in the phase spectrum design unit 22 described above, description thereof will be omitted. When an evaluation value indicating the degree of similarity between the spectrogram $SG_{0,k}(\omega,t)$ and the target spectrogram $TargetSG_0(\omega,t)$ does not satisfy the predetermined end condition, the waveform function correction unit 27 of the intensity spectrum design unit 23 changes the temporal intensity waveform function $b_0(t)$ to the arbitrary temporal intensity waveform function $b_{0,k}(t)$ while constraining the temporal phase waveform function $\varphi_0(t)$ included in the second waveform function by the initial value (process number (15e)). The second waveform function after changing the temporal intensity waveform function is transformed into a spectrogram again by time-frequency conversion such as STFT. Subsequently, the process numbers (15a) to (15c) and (15e) are repeatedly performed. In this way, the second waveform function is modified so as to bring the spectrogram $SG_{0,k}(\omega,t)$ gradually close to the target spectrogram $TargetSG_0(\omega,t)$.

Thereafter, the inverse Fourier transform unit 28 of the intensity spectrum design unit 23 performs inverse Fourier transform on the modified second waveform function (arrow A4 in the drawing) to generate a third waveform function (in) in the frequency domain (process number (16)).

[Formula 12]

$$\sqrt{B_{0,k}(\omega)}\exp\{i\Phi_{0,k}(\omega)\} \qquad (m)$$

Next, in the process number (17), a filter processing unit of the intensity spectrum design unit 23 performs filter processing based on the intensity spectrum of input light on the intensity spectrum function $B_{0,k}(\omega)$ included in the third waveform function (m). Specifically, a portion exceeding a cutoff intensity for each wavelength, which is determined on the basis of the intensity spectrum of the input light, is cut from the intensity spectrum obtained by multiplying the intensity spectrum function $B_{0,k}(\omega)$ by a coefficient $\alpha$. This is performed to prevent an intensity spectrum function $\alpha B_{0,k}(\omega)$ from exceeding the spectrum intensity of the input light in all wavelength regions. In an example, the cutoff intensity for each wavelength is set to be matched with the intensity spectrum of the input light (the initial intensity spectrum function $A_0(\omega)$ in the present embodiment). In that case, as shown in the following Formula (n), at a frequency where the intensity spectrum function $\alpha B_{0,k}(\omega)$ is larger than the intensity spectrum function $A_0(\omega)$, a value of the intensity spectrum function $A_0(\omega)$ is taken as the value of an intensity spectrum function $A_{TWC-TFD}(\omega)$. At a frequency where the intensity spectrum function $\alpha B_{0,k}(\omega)$ is equal to or smaller than the intensity spectrum function $A_0(\omega)$, a value of the intensity spectrum function $\alpha B_{0,k}(\omega)$ is taken as a value of the intensity spectrum function $A_{TWC-TFD}(\omega)$ (process number (17) in the drawing).

[Formula 13]

$$A_{TWC-TFD}(\omega) = \begin{cases} A_0(\omega) & A_0(\omega) < \alpha B_{0,k}(\omega) \\ \alpha B_{0,k}(\omega) & A_0(\omega) \geq \alpha B_{0,k}(\omega) \end{cases} \qquad (n)$$

This intensity spectrum function $A_{TWC-TFD}(\omega)$ is provided to the modulation pattern generation unit 24 as an ultimately obtained desired spectrum intensity.

The modulation pattern generation unit 24 calculates a phase modulation pattern (for example, a computer-generated hologram) for applying a spectrum phase indicated by the phase spectrum function $\Phi_{TWC-TFD}(\omega)$ calculated in the phase spectrum design unit 22, and the spectrum intensity indicated by the intensity spectrum function $A_{TWC-TFD}(\varphi)$ calculated in the intensity spectrum design unit 23 to the output light.

Figure 18:
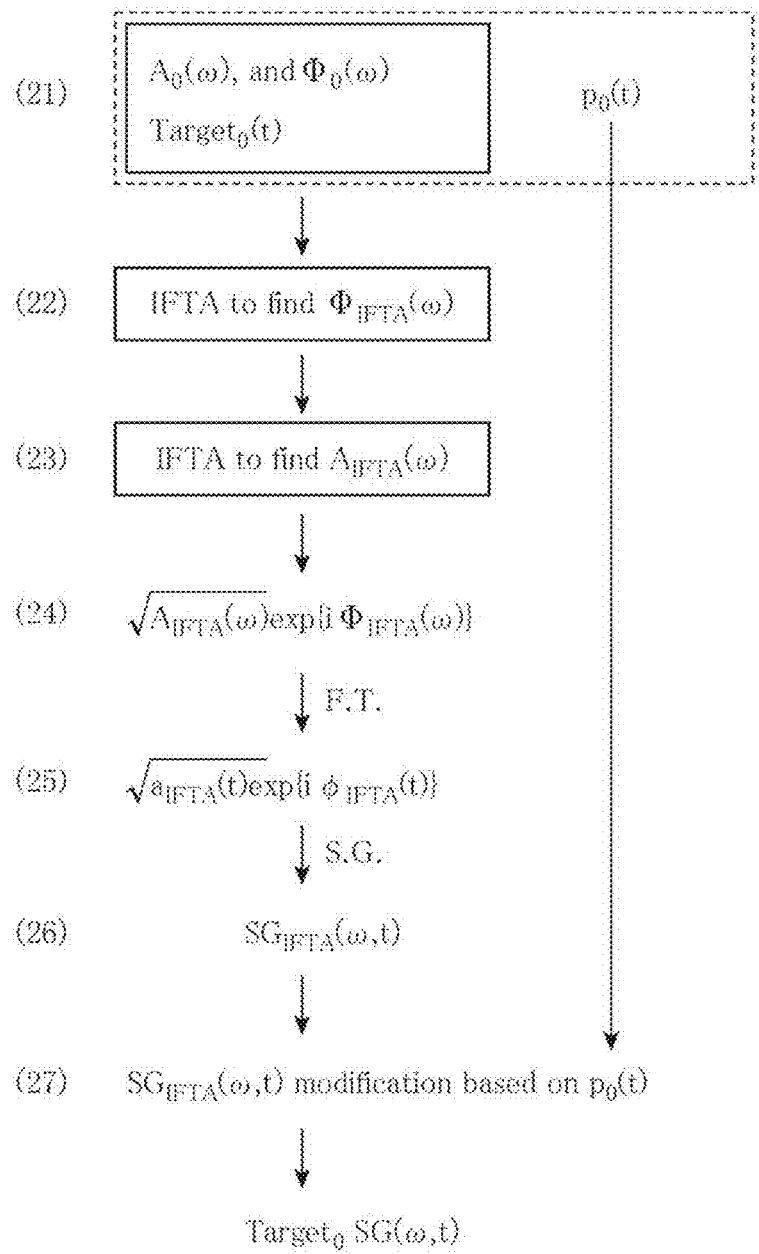
FIG. 18 is a diagram illustrating an example of a procedure of generation of a target spectrogram in a target generation unit.

FIG. 18 is a diagram illustrating an example of a procedure of generation of the target spectrogram $TargetSG_0(\omega,t)$ in the target generation unit 29. The target spectrogram $TargetSG_0(\omega,t)$ indicates a target temporal waveform. A temporal waveform includes a temporal intensity waveform and its constituent frequency component (wavelength band component). Therefore, the creation of a target spectrogram is a very important process for controlling the frequency component (wavelength band component). As illustrated in FIG. 18, the target generation unit 29 first inputs the spectral waveform (the initial intensity spectrum function $A_0(\omega)$ and the initial phase spectrum function $\Phi_0(\omega)$) and the desired temporal intensity waveform function $Target_0(t)$. Furthermore, the target generation unit 29 inputs a temporal function $p_0(t)$ including a desired frequency (wavelength) band information (process number (21)).

Next, the target generation unit 29 calculates a phase spectrum function $\Phi_{IFTA}(\omega)$ for realizing the temporal intensity waveform function $Target_0(t)$ by using, for example, the iterative Fourier transform method illustrated in FIG. 15 (process number (22)).

Figure 19:
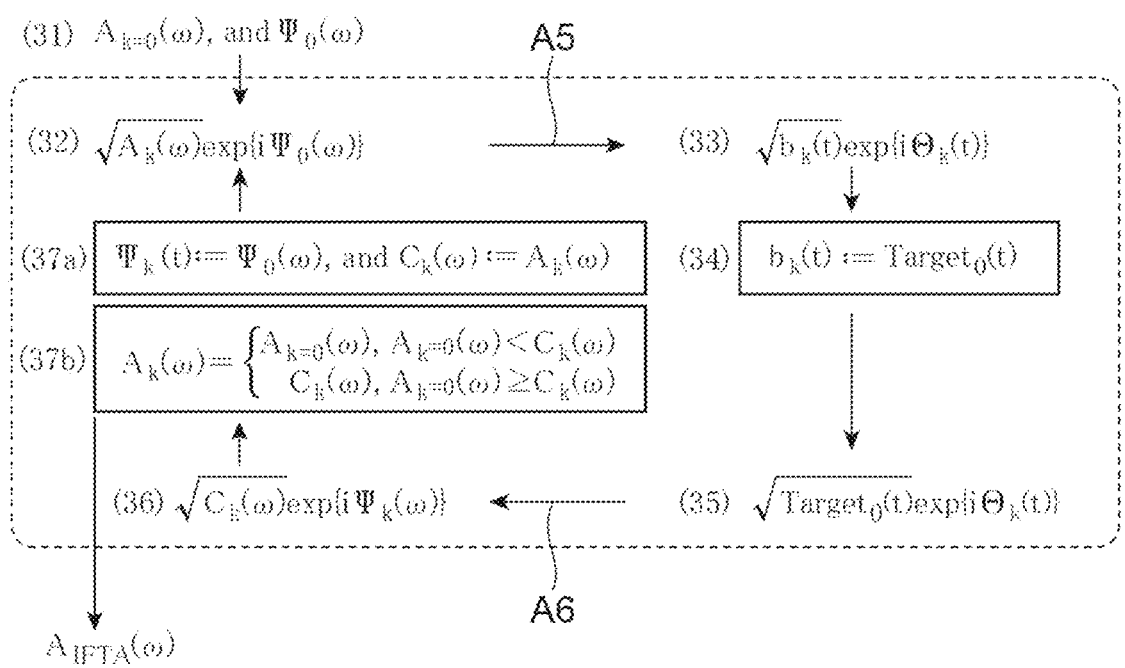
FIG. 19 is a diagram illustrating an example of a procedure of calculation of an intensity spectrum function.

Next, the target generation unit 29 calculates an intensity spectrum function $A_{IFTA}(\omega)$ for realizing the temporal intensity waveform function $Target_0(t)$ by the iterative Fourier transform method using the above obtained phase spectrum function $\Phi_{IFTA}(\omega)$ (process number (23)). FIG. 19 is a diagram illustrating an example of a procedure of calculation of the intensity spectrum function $A_{IFTA}(\omega)$.

With reference to FIG. 19, first, the initial intensity spectrum function $A_{k=0}(\omega)$ and the phase spectrum function $\Psi_0(\omega)$ are prepared (process number (31) in the drawing). Next, a waveform function (o) of the frequency domain including an intensity spectrum function $A_k(\omega)$ and the phase spectrum function $\Psi_0(\omega)$ is prepared (process number (32) in the drawing).

[Formula 14]

$$\sqrt{A_k(\omega)}\exp\{i\Psi_0(\omega)\} \qquad (o)$$

A subscript k represents after a k-th Fourier transform process. Before an initial (first) Fourier transform process, the initial intensity spectrum function $A_{k=0}(\omega)$ described above is used as the intensity spectrum function $A_k(\omega)$. The factor i is an imaginary number.

Next, a Fourier transform from the frequency domain to the time domain is performed on the function (o) (arrow A5 in the drawing). As a result, a waveform function (p) of the frequency domain including a temporal intensity waveform function $b_k(t)$ is obtained (process number (33) in the drawing).

[Formula 15]

$$\sqrt{b_k(t)}\exp\{i\Theta_k\} \qquad (p)$$

Next, the temporal intensity waveform function $b_k(t)$ included in the function (p) is replaced by the temporal intensity waveform function $Target_0(t)$ based on the desired waveform (process numbers (34) and (35) in the drawing).

[Formula 16]

$$b_k(t) := Target_0(t) \qquad (q)$$

[Formula 17]

$$\sqrt{\text{Target}_0(t)}\exp\{i\Theta_k(t)\} \quad (r)$$

Next, an inverse Fourier transform from the time domain to the frequency domain is performed on the function (r) (arrow A6 in the drawing). As a result, a waveform function (s) in the frequency domain including an intensity spectrum function $C_k(\omega)$ and a phase spectrum function $\Psi_k(\omega)$ is obtained (process number (36) in the drawing).

[Formula 18]

$$\sqrt{C_k(\omega)}\exp\{i\Psi_k(\omega)\} \quad (s)$$

Next, in order to constrain the phase spectrum function $\Psi_k(\omega)$ included in the foregoing function (s), it is replaced by the initial phase spectrum function $\Psi_0(\omega)$ (process number (37a) in the drawing).

[Formula 19]

$$\Psi_k(\omega):=\Psi_k(\omega) \quad (t)$$

Furthermore, filter processing based on the intensity spectrum of input light is performed on the intensity spectrum function $C_k(\omega)$ in the frequency domain after the inverse Fourier transform. Specifically, in the intensity spectrums represented by the intensity spectrum function $C_k(\omega)$, a portion exceeding a cutoff intensity for each wavelength set based on the intensity spectrum of the input light is cut off. In an example, the cutoff intensity for each wavelength is set to be matched with the intensity spectrum of input light (for example, the initial intensity spectrum function $A_{k=0}(\omega)$). In that case, as shown in the following Formula (u), at a frequency where the intensity spectrum function $C_k(\omega)$ is larger than the intensity spectrum function $A_{k=0}(\omega)$, a value of the intensity spectrum function $A_{k=0}(\omega)$ is taken as a value of the intensity spectrum function $A_k(\omega)$. At a frequency where the intensity spectrum function $C_k(\omega)$ is equal to or smaller than the intensity spectrum function $A_{k=0}(\omega)$, a value of the intensity spectrum function $C_k(\omega)$ is taken as the value of the intensity spectrum function $A_k(\omega)$ (process number (37b) in the drawing).

[Formula 20]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \quad (u)$$

The intensity spectrum function $C_k(\omega)$ included in the function (s) is replaced by the intensity spectrum function $A_k(\omega)$ after filter processing by the above Formula (u).

Subsequently, the above process (32) to (37b) are repeatedly performed, so that the shape of the intensity spectrum represented by the intensity spectrum function $A_k(\omega)$ in the waveform function can be brought close to the shape of the intensity spectrum corresponding to the desired temporal intensity waveform. Finally, an intensity spectrum function $A_{IFTA}(\omega)$ is obtained.

FIG. 18 will be referred again. A third waveform function (v) in the frequency domain including these functions is obtained by calculating the phase spectrum function $\Phi_{IFTA}(\omega)$ and the intensity spectrum function $A_{IFTA}(\omega)$ in the process numbers (22) and (23) described above (process number (24)).

[Formula 21]

$$\sqrt{A_{IFTA}(\omega)}\exp\{i\Phi_{IFTA}(\omega)\} \quad (v)$$

The Fourier transform unit 29a of the target generation unit 29 performs the Fourier transform on the above waveform function (v). As a result, a fourth waveform function (w) in the time domain is obtained (process number (25)).

[Formula 22]

$$\sqrt{a_{IFTA}(t)}\exp\{i\phi_{IFTA}(t)\} \quad (w)$$

The spectrogram correction unit 29b of the target generation unit 29 transforms the fourth waveform function (w) into a spectrogram $SG_{IFTA}(\omega,t)$ by the time-frequency transform (process number (26)). Then, in a process number (27), the target spectrogram $TargetSG_0(\omega,t)$ is generated by modifying the spectrogram $SG_{IFTA}(\omega,t)$ based on the temporal function $p_0(t)$ including the desired frequency (wavelength) band information. For example, a characteristic pattern appearing in the spectrogram $SG_{IFTA}(\omega,t)$ constituted of two-dimensional data is partially cut out, and the frequency component of the corresponding part is operated based on the temporal function $p_0(t)$. The specific example thereof will be described in detail.

Figure 20A:
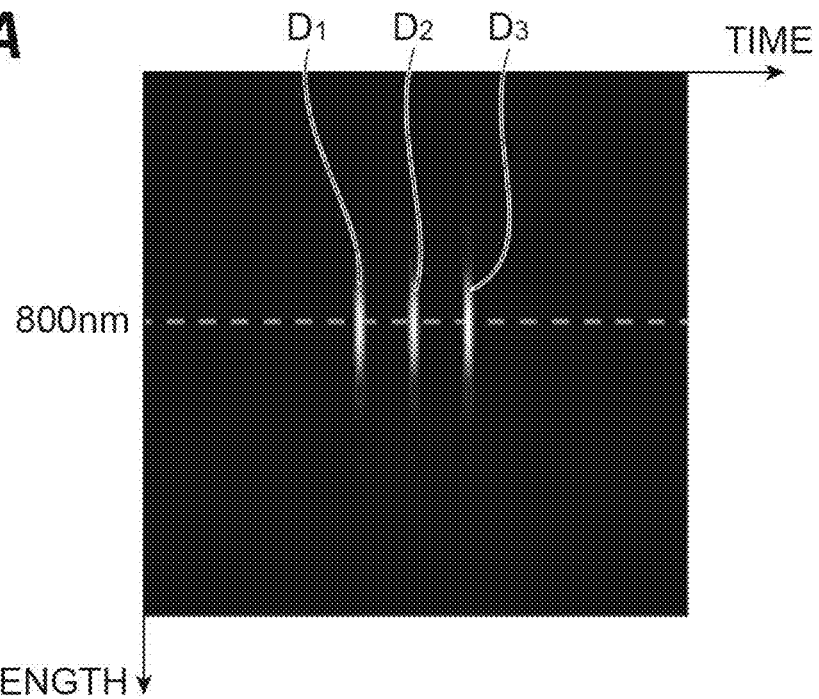
FIGS. 20A and 20B are diagrams illustrating spectrograms.

For example, the case in which triple pulses having time intervals of 2 picoseconds are set as the desired temporal intensity waveform function $Target_0(t)$ is considered. At this time, the spectrogram $SG_{IFTA}(\omega,t)$ has a result as shown in FIG. 20A. In FIG. 20A, the horizontal axis indicates the time (unit: femtosecond), and the vertical axis indicates the wavelength (unit: nm). A value of the spectrogram is indicated by light and dark in the drawing, and the brighter the part, the larger the value of the spectrogram. In this spectrogram $SG_{IFTA}(\omega,t)$, the triple pulses appear as domains $D_1$, $D_2$, and $D_3$ separated on the time axis at intervals of 2 picoseconds. A center (peak) wavelength of the domains $D_1$, $D_2$, and $D_3$ is 800 nm.

Figure 20B:
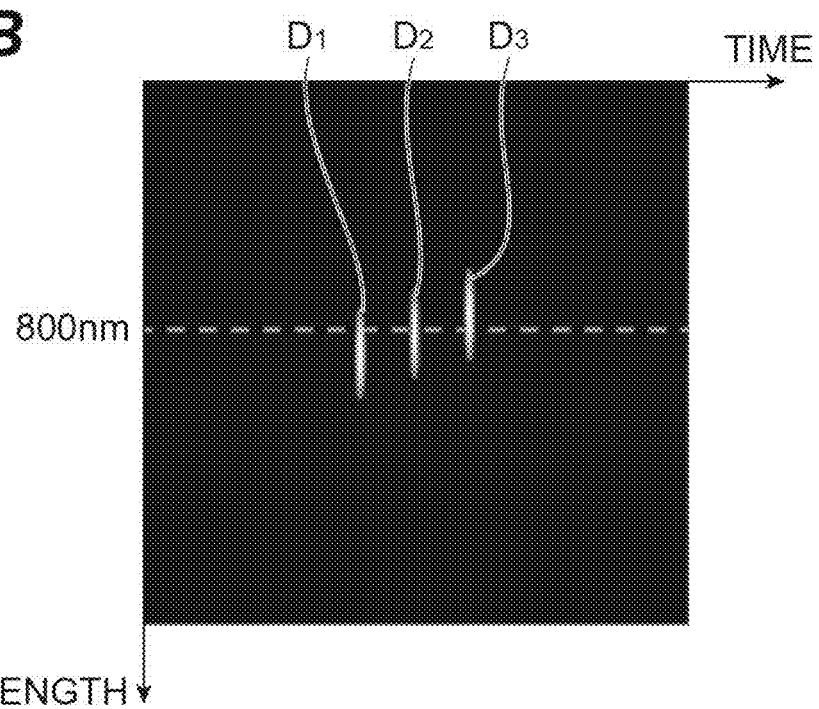

For instance, when it is desired to control only the temporal intensity waveform of the output light (it is simply desired to obtain triple pulses), it is not necessary to operate these domains $D_1$, $D_2$, and $D_3$. However, when it is desired to control the frequency (wavelength) band of each pulse, it is necessary to operate these domains $D_1$, $D_2$, and $D_3$. That is, as shown in FIG. 20B, moving the respective domains $D_1$, $D_2$, and $D_3$ independently in a direction along the wavelength axis (vertical axis) means changing the constituent frequency (wavelength band) of each pulse. The change of the constituent frequency (wavelength band) of each pulse is performed based on the temporal function $p_0(t)$.

For example, when the temporal function $p_0(t)$ is described so that the peak wavelength of the domain $D_2$ is fixed at 800 nm and the peak wavelengths of the domains $D_1$ and $D_3$ are moved in parallel by −2 nm and +2 nm, respectively, the spectrogram $SG_{IFTA}(\omega,t)$ changes to the target spectrogram $TargetSG_0(\omega,t)$ shown in FIG. 20B. For example, by performing such processing on the spectrogram, a target spectrogram in which the constituent frequency (wavelength band) of each pulse is arbitrarily controlled without changing the shape of the temporal intensity waveform.

[Time Response Measurement]

Figure 21:
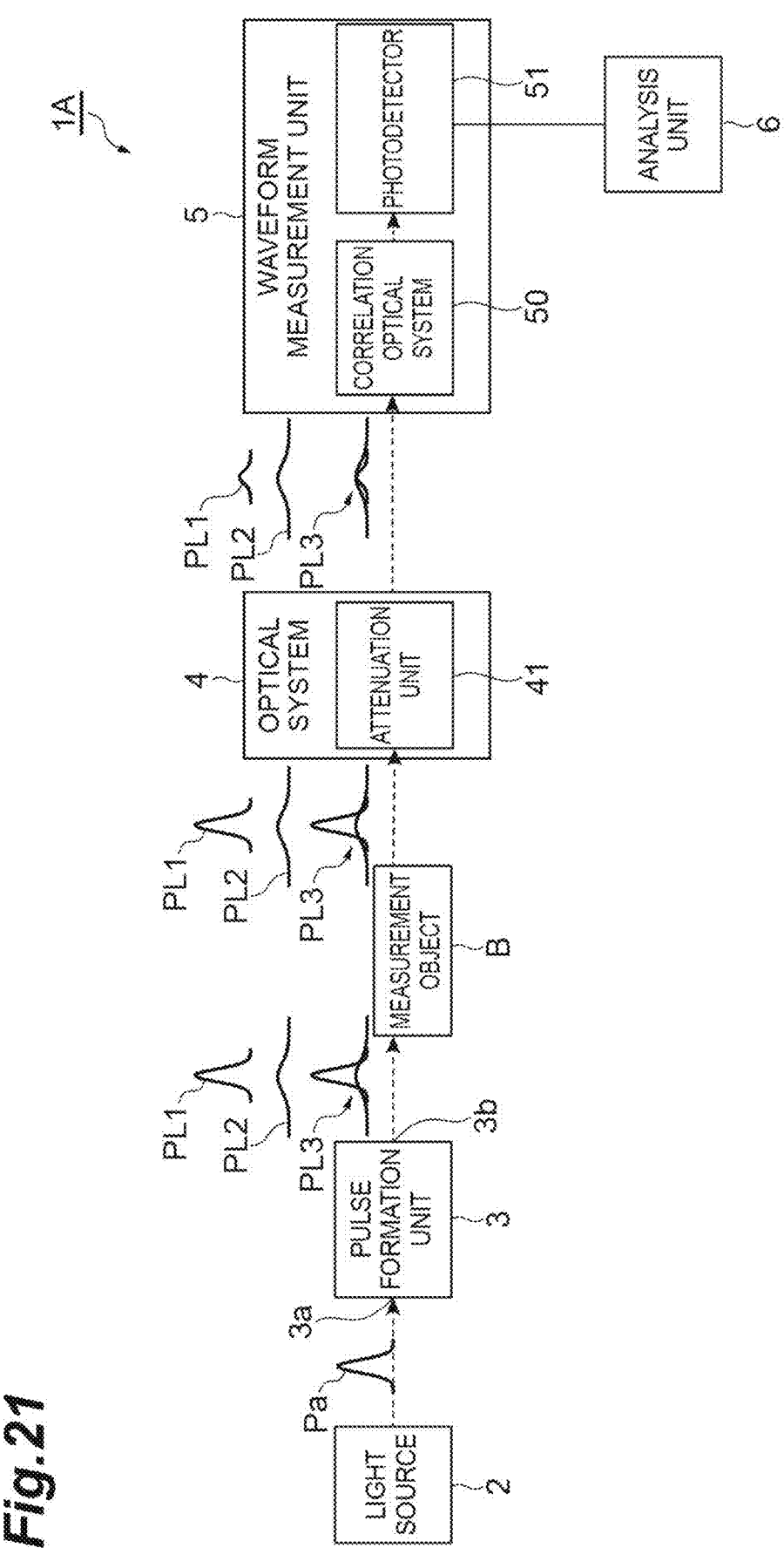
FIG. 21 is a diagram illustrating an example of a procedure of generation of a target spectrogram in the target generation unit.

A time response measurement of the measurement object B using the optical property measurement apparatus 1A of the present embodiment will be described. FIG. 21 is a diagram illustrating operation of the optical property measurement apparatus 1A when it is used as a time response measurement apparatus. In the time response measurement, the optical system 4 is set in the first state, that is, a state in which the attenuation unit 41 is arranged on the optical path of the pulsed light PL output from the measurement object B. Further, the pulse formation unit 3 generates first pulsed light PL1, second pulsed light PL2, and third pulsed light PL3, as the pulsed light PL from the initial pulsed light Pa on a common optical axis leading to the measurement object B. The pulse formation unit 3 can output the first pulsed light PL1, the second pulsed light PL2, and the third pulsed light PL3, individually at arbitrary timings with time intervals therebetween. The output order of the first pulsed light PL1, the second pulsed light PL2, and the third pulsed light PL3 is also arbitrary. In an example, the third pulsed light PL3 is output after the first pulsed light PL1 and the second pulsed light PL2 are output.

Figure 22A:
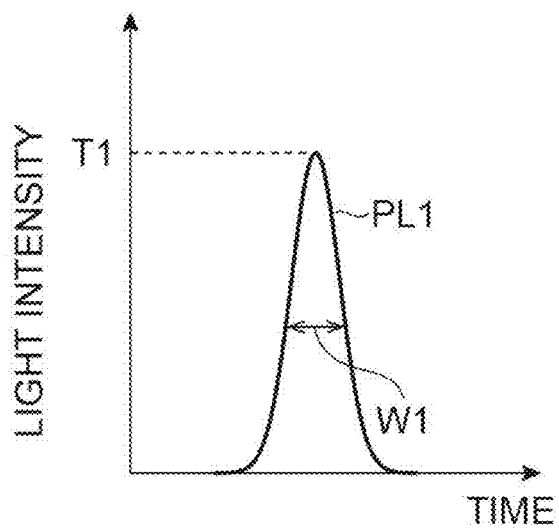
FIG. 22A schematically illustrates a temporal waveform of first pulsed light.

FIG. 22A schematically illustrates a temporal waveform of the first pulsed light PL1. A wavelength band of the first pulsed light PL1 includes a wavelength of the pump light. The wavelength of the pump light is included in a plurality of wavelength components constituting the initial pulsed light Pa. For example, the wavelength of the pump light is within a range of 770 nm to 820 nm. The first pulsed light PL1 may be constituted of only light having a wavelength of the pump light. For example, the temporal waveform of the first pulsed light PL1 has a shape of a Gaussian function.

Figure 22B:
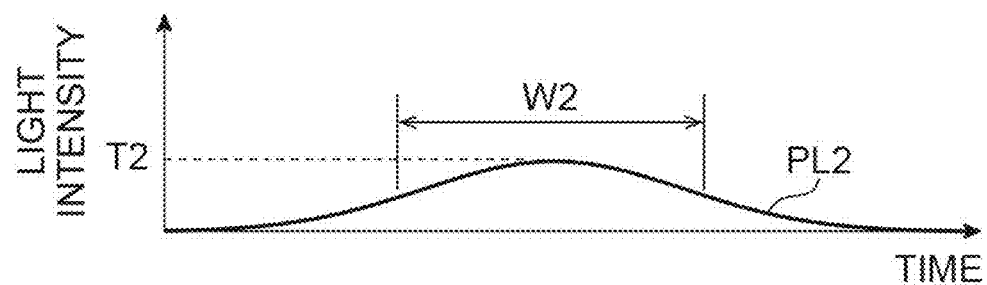
FIG. 22B schematically illustrates a temporal waveform of second pulsed light.

FIG. 22B schematically illustrates a temporal waveform of the second pulsed light PL2. A wavelength band of the second pulsed light PL2 includes a wavelength of the probe light. In the plurality of wavelength components included in the initial pulsed light Pa, the wavelength of the probe light is included in the wavelength component longer than the wavelength of the pump light. The wavelength of the probe light is included in the wavelength component on the long-wavelength side in the plurality of wavelength components included in the initial pulsed light Pa. The wavelength of the probe light is, for example, within a range of 820 nm to 840 nm. The second pulsed light PL2 may be constituted of only light having a wavelength of the probe light. Apart of the wavelength band of the second pulsed light PL2 may be superimposed on a part of the wavelength band of the first pulsed light PL1. For example, the temporal waveform of the second pulsed light PL2 has a shape of a Gaussian function. A peak intensity T2 of the second pulsed light PL2 is lower than a peak intensity T1 of the first pulsed light PL1. For example, the peak intensity T2 of the second pulsed light PL2 is equal to or lower than one tenth of the peak intensity T1 of the first pulsed light PL1. A pulse width W2 that is a full width at half maximum of the second pulsed light PL2 is larger than a pulse width W1 that is a full width at half maximum of the first pulsed light PL1. For example, the pulse width W2 of the second pulsed light PL2 is one time to 100 times the pulse width W1 of the first pulsed light PL1.

FIGS. 23A to 23C are explanatory diagrams of a temporal waveform and a spectral waveform of the third pulsed light PL3. FIG. 23A is a spectrogram showing the time on the horizontal axis, the wavelength on the vertical axis, and the light intensity is represented by contrast of color. FIG. 23B shows temporal waveforms of a component pulse P3 and a component pulse P4 included in the third pulsed light PL3. FIG. 23C shows a spectral waveform obtained by combining the component pulse P3 and the component pulse P4, that is, a spectral waveform of the third pulsed light PL3.

A spectrum of the third pulsed light PL3 includes both a wavelength of the pump light and a wavelength of the probe light. The wavelength component of the pump light included in the third pulsed light PL3 forms the component pulse P3. In an example, a peak intensity T3, a pulse width W3, and a wavelength component of the component pulse P3 are respectively the same as the peak intensity T1, the pulse width W1, and the wavelength component of the first pulsed light PL1. The wavelength component of the probe light included in the third pulsed light PL3 forms the component pulse P4. In an example, a peak intensity T4, a pulse width W4, and a wavelength component of the component pulse P4 are respectively the same as the peak intensity T2, the pulse width W2, and the wavelength component of the second pulsed light PL2. The pulse width W3 of a component of the wavelength of the pump light, that is the component pulse P3, included in the third pulsed light PL3 is smaller than the pulse width W4 of a component of the wavelength of the probe light, that is the component pulse P4, included in the third pulsed light PL3. The third pulsed light PL3 is obtained by superimposing the component pulse P4 on the component pulse P3. The third pulsed light PL3 may not include any other components except for the component pulse P3 and the component pulse P4.

As shown in FIG. 23C, a spectrum obtained by combining the component pulses P3 and P4 has a single peak. However, with reference to FIG. 23A, the center wavelengths of the component pulses P3 and P4 are different from each other. The single peak illustrated in FIG. 23C substantially corresponds to the spectrum of the initial pulsed light Pa. An interval between the peak wavelengths of the component pulses P3 and P4 is determined by the spectral bandwidth of the initial pulsed light Pa. In an example, the interval is within a range of substantially two times a full width at half maximum of the spectral bandwidth of the initial pulsed light Pa.

The pulse formation unit 3 makes it possible to change a time interval $D_1$ between an intensity peak of the component of the wavelength of the pump light included in the third pulsed light PL3 (component pulse P3) and an intensity peak of the component of the wavelength of the probe light (component pulse P4). The time interval may be suitably changed in accordance with type or characteristics of the measurement object B. The time interval $D_1$ may be zero. The pulse formation unit 3 makes it possible to change a ratio (W3/W4) of the pulse width W3 of the component of the wavelength of the pump light included in the third pulsed light PL3 (component pulse P3) to the pulse width W4 of the component of the wavelength of the probe light (component pulse P4). The ratio (W3/W4) may be suitably changed in accordance with type or characteristics of the measurement object B. In this case, a ratio (W1/W2) between the pulse width W1 of the first pulsed light PL1 and the pulse width W2 of the second pulsed light PL2 is also changed in accordance with the ratio (W3/W4).

The control unit 18 (refer to FIG. 2) stores a first phase pattern for generating the first pulsed light PL1, a second phase pattern for generating the second pulsed light PL2, and a third phase pattern for generating the third pulsed light PL3, in advance. The control unit 18 selectively outputs the first phase pattern, the second phase pattern, or the third phase pattern to the SLM 14.

Figure 24:
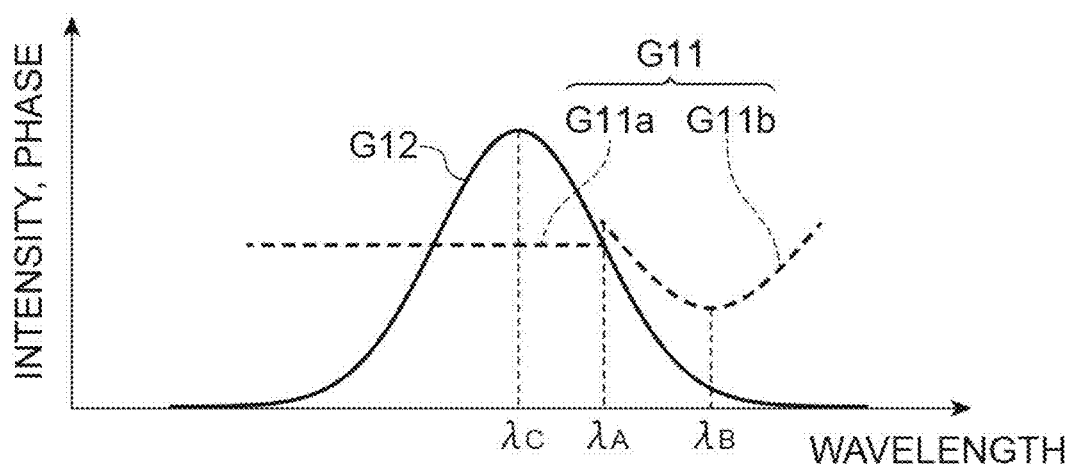
FIG. 24 schematically illustrates an example of a spectral waveform applied to initial pulsed light using a third phase pattern.

FIG. 24 schematically illustrates an example of a spectral waveform (a spectrum phase G11 and a spectrum intensity G12) applied to the initial pulsed light Pa using the third phase pattern. FIG. 24 shows the wavelength on the horizontal axis, each value of the spectrum intensity and the spectrum phase on the vertical axis. FIG. 24 is an example when the wavelength of the probe light is longer than the wavelength of the pump light. In the spectral waveform shown in FIG. 24, the wavelength property of the spectrum phase G11 include a part G11a which is constant in a band smaller than a certain wavelength $\lambda_A$, and a part G11b which has a curving shape projecting downward in a band larger than the wavelength $\lambda_A$. The part G11b is represented by the following Formula using a phase $\varphi(\lambda)$.

$$\varphi(\lambda)=\varphi_2(\omega(\lambda)-\omega B)^2/2$$

The factor $\varphi_2$ is a constant. The factors $\omega(\lambda)$ and $\omega_B$ are angular frequencies, and $\omega(\lambda)=2\pi c/\lambda$, and $\omega_B=\lambda\alpha c/\lambda_B$ (the factor c is a velocity of light). The wavelength AB in which the part G11b has a local minimum value is larger than the wavelength $\lambda_A$. The wavelength $\lambda_A$ is larger than the peak wavelength 2c of the spectrum intensity. The part G11a forms the component pulse P3 that is a component of the wavelength of the pump light in the third pulsed light PL3, and the part G11b forms the component pulse P4 that is a component of the wavelength of the probe light in the third pulsed light PL3. In this manner, in the spectrum phase G11, a boundary between the part forming the component pulse P3 and the part forming the component pulse P4 is discontinuous.

The measurement object B is arranged on the optical axes of the first pulsed light PL1, the second pulsed light PL2, and the third pulsed light PL3, output from the pulse formation unit 3. The first pulsed light PL1, the second pulsed light PL2, and the third pulsed light PL3 which are output from the pulse formation unit 3 are incident on the measurement object B. The first pulsed light PL1, the second pulsed light PL2, and the third pulsed light PL3 which have been transmitted through the measurement object B are output from the measurement object B. Alternatively, the first pulsed light PL1, the second pulsed light PL2, and the third pulsed light PL3 which have been reflected or scattered in the measurement object B may be output from the measurement object B. The measurement object B is activated by the pump light, and the optical property thereof is changed. Therefore, compared to the temporal waveform of the probe light when the pump light is not incident at the same time, that is the temporal waveform of the second pulsed light PL2, the temporal waveform of the probe light when the pump light is incident at the same time, that is the temporal waveform of the component pulse P4 of the third pulsed light PL3, significantly changes immediately after incidence of the component pulse P3.

Figure 25A:
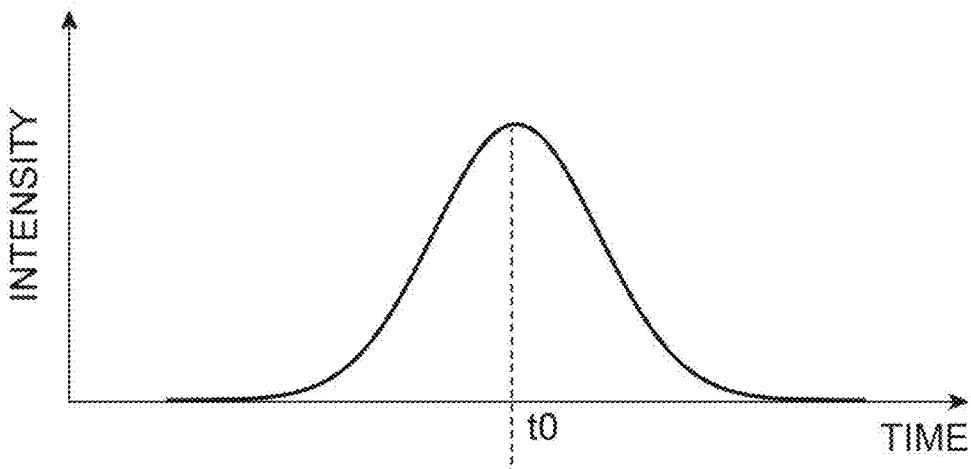
FIG. 25A is a graph schematically illustrating an example of a temporal waveform of probe light having passed through the measurement object when pump light is not incident on the measurement object.
Figure 25B:
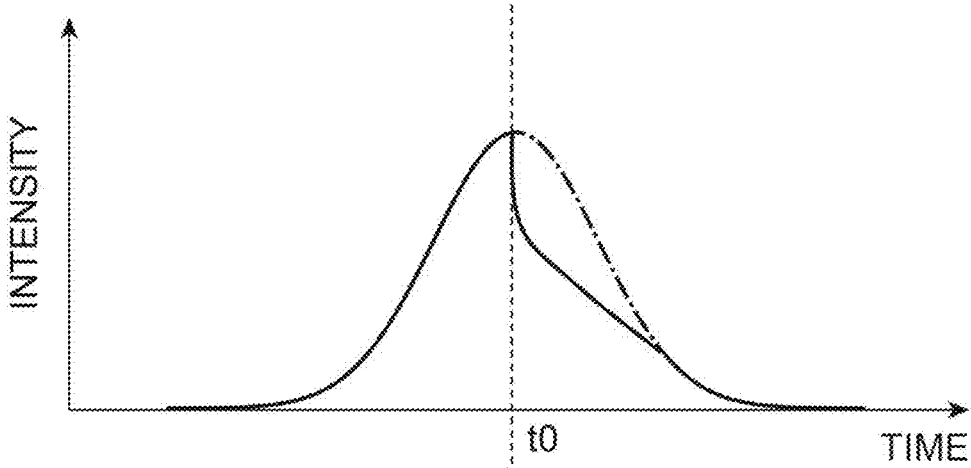
FIG. 25B is a graph schematically illustrating an example of a temporal waveform of the probe light having passed through the measurement object when the pump light is incident on the measurement object.
Figure 25C:
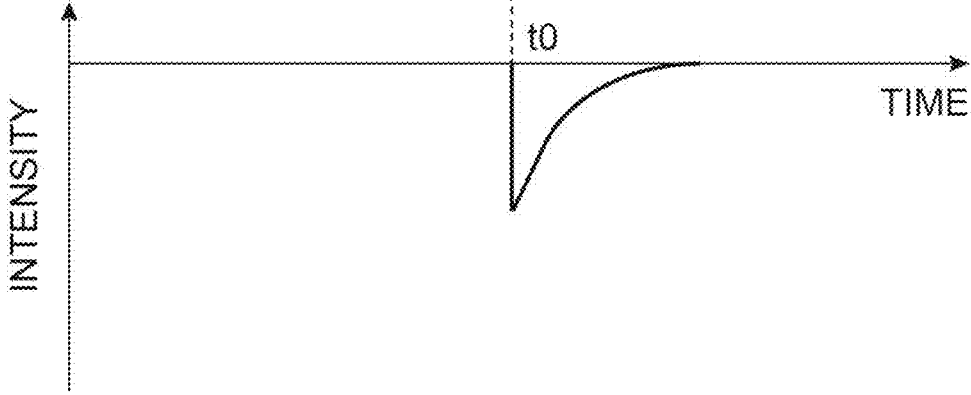
FIG. 25C is a graph obtained by subtracting the temporal waveform illustrated in FIG. 25A from the temporal waveform illustrated in FIG. 25B.

FIG. 25A is a graph schematically illustrating an example of the temporal waveform of the probe light having passed through the measurement object B when the pump light is not incident on the measurement object B. FIG. 25B is a graph schematically illustrating an example of the temporal waveform of the probe light having passed through the measurement object B when the pump light is incident on the measurement object B at a time to. In FIG. 25B, the graph illustrated in FIG. 25A is shown by a one-dot dashed line. In this example, as the optical property of the measurement object B changes at the time to when the pump light is incident, a light transmittance of the measurement object B at the wavelength of the probe light sharply drops. Thereafter, the light transmittance of the measurement object B returns to the original level over time. By the temporal waveform shown in FIG. 25A is subtracted from the temporal waveform shown in FIG. 25B, the time response of the measurement object B on the incidence of the pump light can be obtained as illustrated in FIG. 25C.

The attenuation unit 41 passes the first pulsed light PL1, the second pulsed light PL2, and the third pulsed light PL3 output from the measurement object B. At this time, the attenuation unit 41 passes the component of the wavelength of the probe light included in the second pulsed light PL2 and the third pulsed light PL3, typically, the second pulsed light PL2 and the component pulse P4 to be transmitted therethrough substantially without being attenuated. Further, the attenuation unit 41 attenuates the component of the wavelength of the pump light included in the first pulsed light PL1 and the third pulsed light PL3, typically, the first pulsed light PL1 and the component pulse P3. In other words, the attenuation rate in the attenuation unit 41 at the wavelength of the pump light is larger than the attenuation rate in the attenuation unit 41 at the wavelength of the probe light. When the attenuation unit 41 has a wavelength filter, the cutoff band of the wavelength filter includes the wavelength of the pump light, and the transmission band of the wavelength filter includes the wavelength of the probe light. The transmittance of the wavelength filter at the wavelength of the pump light is, for example, within a range of 0% to 50%. The transmittance of the wavelength filter at the wavelength of the probe light is, for example, within a range of 50% to 99%.

Figure 26:
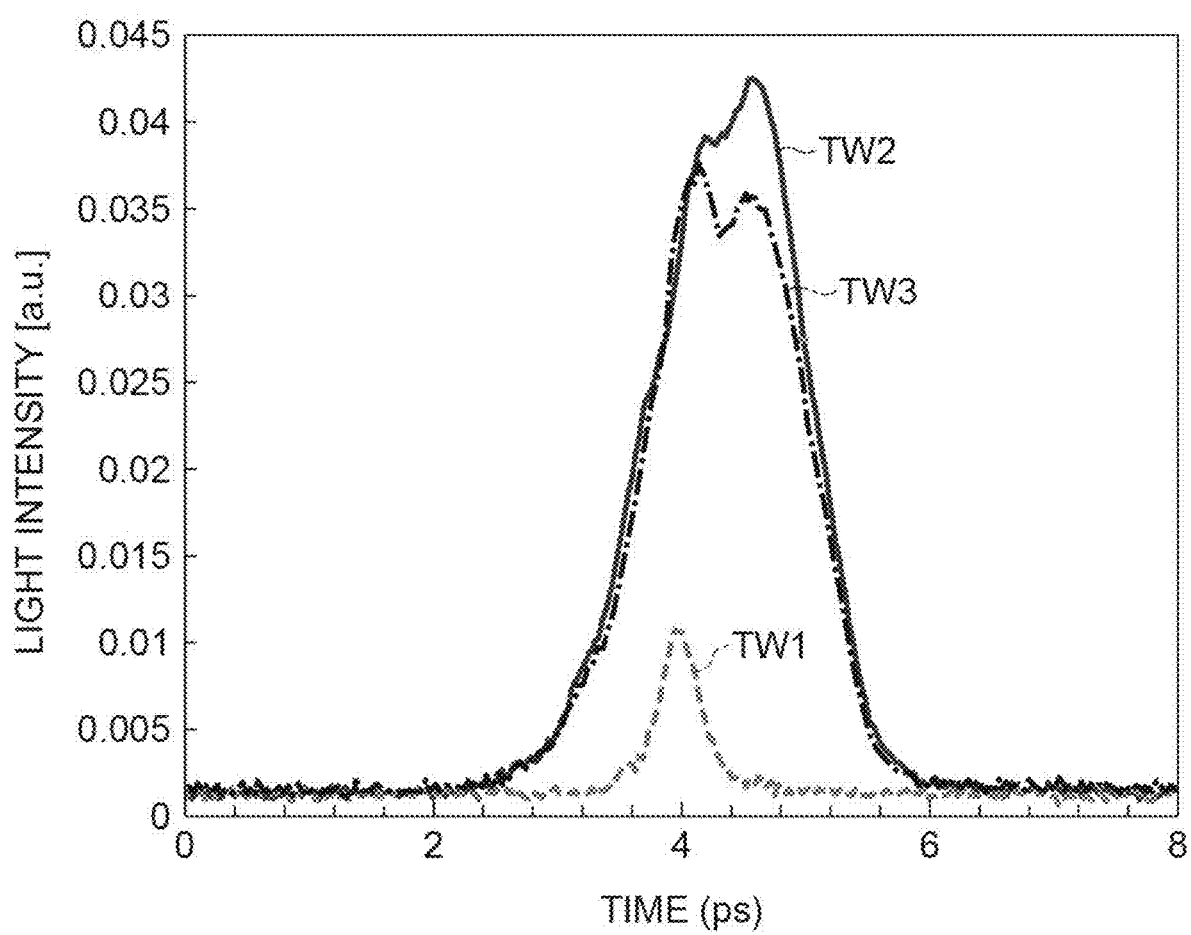
FIG. 26 is a graph illustrating an example of each of a first temporal waveform that is a temporal waveform of the first pulsed light having passed through the attenuation unit, a second temporal waveform that is a temporal waveform of the second pulsed light having passed through the attenuation unit, and a third temporal waveform that is a temporal waveform of the third pulsed light having passed through the attenuation unit, in a superimposed manner.

FIG. 26 is a graph illustrating examples of a first temporal waveform TW1 that is a temporal waveform of the first pulsed light PL1 having passed through the attenuation unit 41, a second temporal waveform TW2 that is a temporal waveform of the second pulsed light PL2 having passed through the attenuation unit 41, and a third temporal waveform TW3 that is a temporal waveform of the third pulsed light PL3 having passed through the attenuation unit 41, in a superimposed manner. FIG. 26 shows the time (picosecond (ps)) on the horizontal axis, and the light intensity (arbitrary units) on the vertical axis. The first temporal waveform TW1 includes only the temporal waveform of the pump light attenuated by the attenuation unit 41. The third temporal waveform TW3 includes a waveform in which the temporal waveform of the pump light attenuated by the attenuation unit 41 and the temporal waveform of the probe light when the pump light is incident are superimposed. Therefore, by performing correction processing such as calculation of the difference between the third temporal waveform TW3 and the first temporal waveform TW1, it is possible to obtain the temporal waveform of the probe light when the pump light is incident, while eliminating an influence of the pump light. The second temporal waveform TW2 includes only the temporal waveform of the probe light when the pump light is not incident. Therefore, by comparison between the second temporal waveform TW2 and the difference between the third temporal waveform TW3 and the first temporal waveform TW1, it is possible to compare the temporal waveform of the probe light when the pump light is incident with the temporal waveform of the probe light when the pump light is not incident to obtain the time response inside the measurement object B. The time response inside the measurement object B is evaluated on the basis of the above principle by the analysis unit 6 which will be described below.

Figure 27:
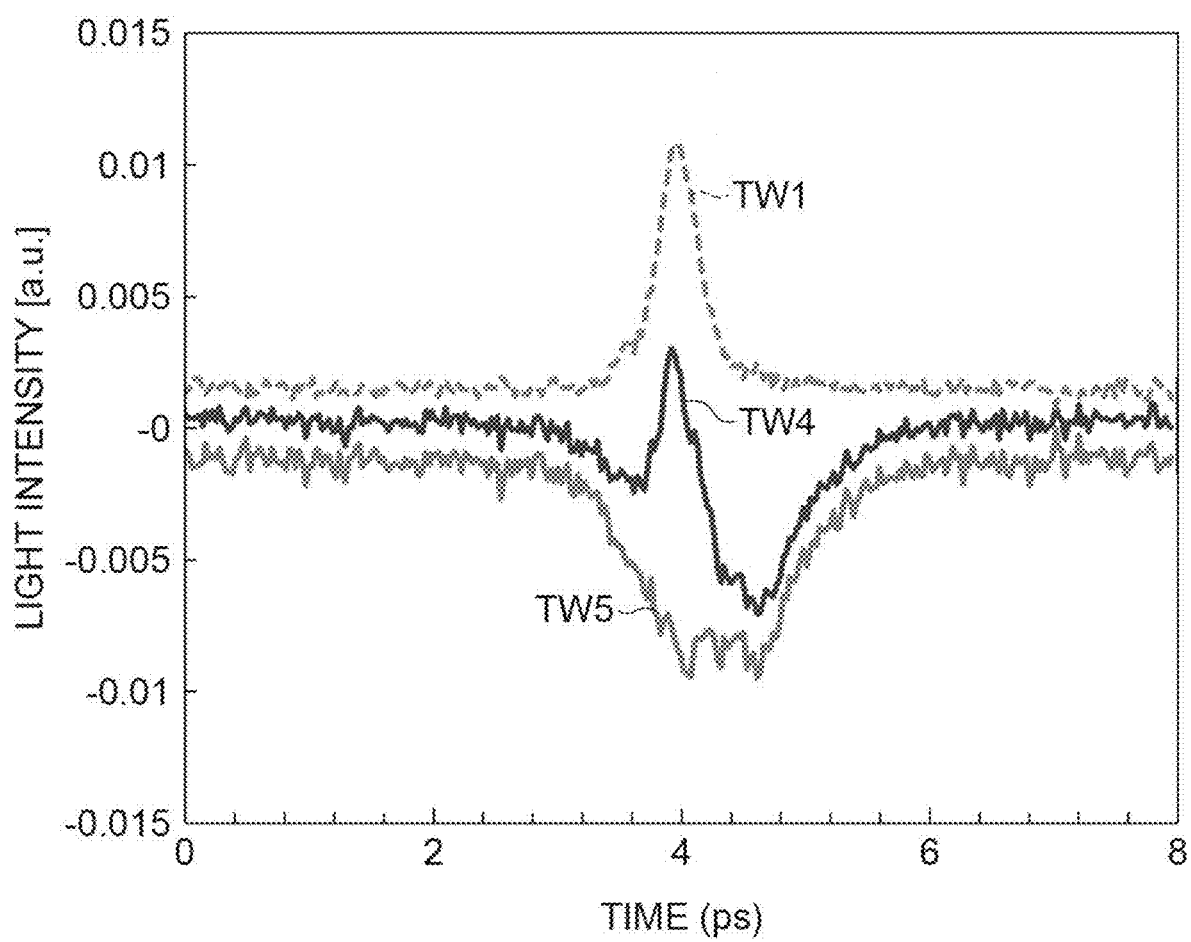
FIG. 27 is a graph illustrating the first temporal waveform, a temporal waveform obtained by subtracting the second temporal waveform from the third temporal waveform, and another temporal waveform obtained by subtracting the first temporal waveform from the temporal waveform.

For comparison between the second temporal waveform TW2 and the difference between the third temporal waveform TW3 and the first temporal waveform TW1, various methods such as evaluation of a difference therebetween, evaluation of ratios thereof, and the like can be used. The order of the above calculation based on the first temporal waveform TW1, the second temporal waveform TW2, and the third temporal waveform TW3 is arbitrary. FIG. 27 is a graph illustrating the first temporal waveform TW1, a temporal waveform TW4 that is a temporal waveform obtained by subtracting the second temporal waveform TW2 from the third temporal waveform TW3, and a temporal waveform TW5 that is a temporal waveform obtained by subtracting the first temporal waveform TW1 from the temporal waveform TW4. FIG. 27 shows the time (ps) on the horizontal axis, and the light intensity (arbitrary units) on the vertical axis. For example, as shown in FIG. 27, a first difference between the third temporal waveform TW3 and the second temporal waveform TW2 may be first calculated, and then a second difference between the first difference and the first temporal waveform TW1 may be calculated.

The correlation optical system 50 receives the first pulsed light PL1, the second pulsed light PL2, and the third pulsed light PL3 having passed through the attenuation unit 41. The correlation optical system 50 transforms the first pulsed light PL1, the second pulsed light PL2, and the third pulsed light PL3 into correlation light including a cross-correlation or an auto-correlation. The first pulsed light PL1, the second pulsed light PL2, and the third pulsed light PL3 which have been transformed into correlation light are output from the correlation optical system 50 and detected by the photodetector 51.

The auxiliary storage device 67 (refer to FIG. 11) of the analysis unit 6 stores a program for calculating the time response of the measurement object B based on each of the temporal waveforms of the first pulsed light PL1, the second pulsed light PL2, and the third pulsed light PL3 which have been individually transformed into correlation light. The analysis unit 6 calculates the time response of the measurement object B based on the temporal waveforms of the first pulsed light PL1, the second pulsed light PL2, and the third pulsed light PL3 which have been individually transformed into correlation light. Each of the temporal waveforms of the first pulsed light PL1, the second pulsed light PL2, and the third pulsed light PL3 which have been individually transformed into correlation light has a correlation with each of the first temporal waveform TW1 that is a temporal waveform of the first pulsed light PL1 having passed through the attenuation unit 41, the second temporal waveform TW2 that is a temporal waveform of the second pulsed light PL2 having passed through the attenuation unit 41, and the third temporal waveform TW3 that is a temporal waveform of the third pulsed light PL3 having passed through the attenuation unit 41. Therefore, the above principle for obtaining the time response inside the measurement object B based on the first temporal waveform TW1, the second temporal waveform TW2, and the third temporal waveform TW3 can also be applied as it is even when the first pulsed light PL1, the second pulsed light PL2, and the third pulsed light PL3 are transformed into correlation light.

Figure 28:
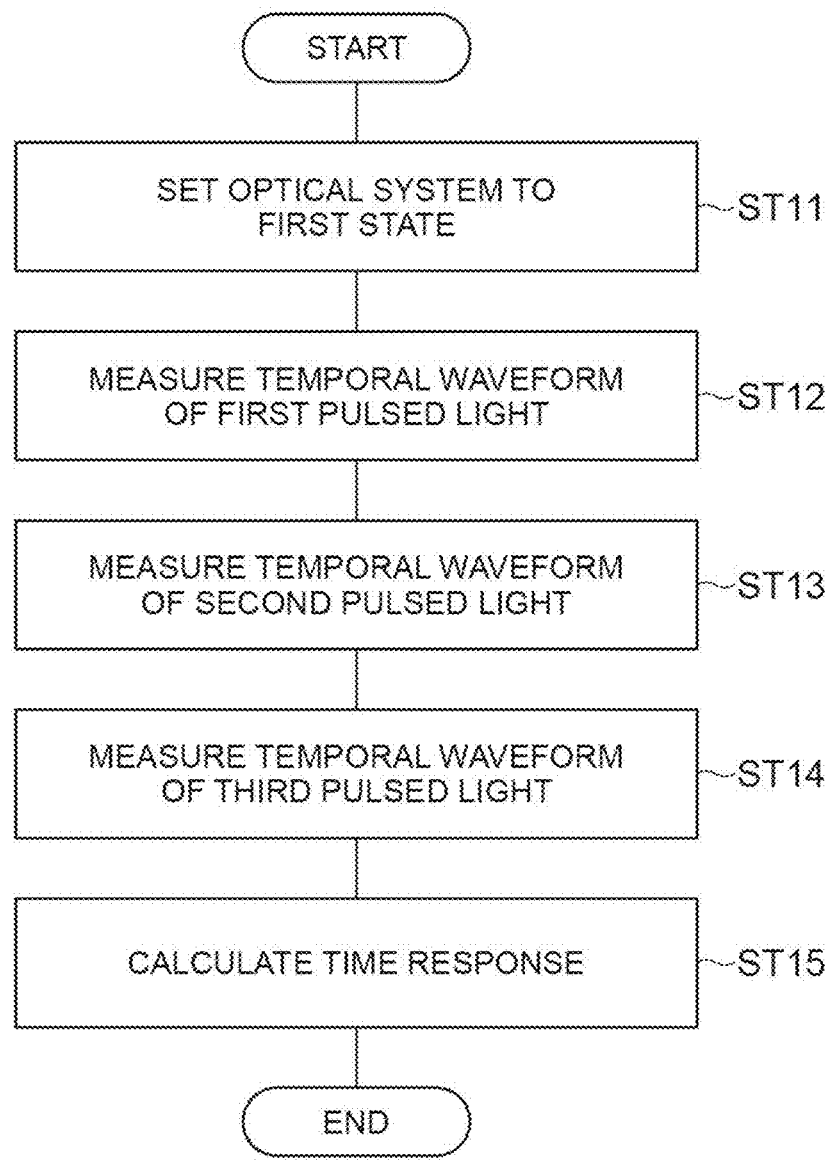
FIG. 28 is a flowchart showing a time response measurement method of an embodiment.

Here, a time response measurement method of the present embodiment will be described. FIG. 28 is a flowchart showing the time response measurement method of the present embodiment. The time response measurement method is a method for measuring a time response inside the measurement object B caused by light incidence and is performed using the optical property measurement apparatus 1A described above, for example.

First, the first state (a state in which the attenuation unit 41 is arranged on the optical path of the pulsed light PL output from the measurement object B) is selected in the optical system 4 (Step ST11). The Step ST11 corresponds to Step ST1 shown in FIG. 12. Next, Steps ST2 and ST3 shown in FIG. 12 are repeated. Specifically, in Step ST12, the first pulsed light PL1 is incident on the measurement object B along a predetermined optical axis, and the first temporal waveform TW1 that is a temporal waveform of the first pulsed light PL1 having passed through the attenuation unit 41 after being output from the measurement object B is measured. Next, in Step ST13, the second pulsed light PL2 is incident on the measurement object B along the predetermined optical axis, and the second temporal waveform TW2 that is a temporal waveform of the second pulsed light PL2 having passed through the attenuation unit 41 after being output from the measurement object B is measured. Next, in Step ST14, the third pulsed light PL3 is incident on the measurement object B along the predetermined optical axis, and the third temporal waveform TW3 that is a temporal waveform of the third pulsed light PL3 having passed through the attenuation unit 41 after being output from the measurement object B is measured. In Steps ST12 to ST14, each temporal waveform of correlation light of the first pulsed light PL1, the second pulsed light PL2, and the third pulsed light PL3 may be measured as the first temporal waveform TW1, the second temporal waveform TW2, and the third temporal waveform TW3.

The order of Steps ST12 to ST14 is arbitrary. Step ST13 may be performed first, or Step ST14 may be performed first. However, the light intensity of the third pulsed light PL3 is larger than each of the light intensities of the first pulsed light PL1 and the second pulsed light PL2. Depending on the measurement object B, irreversible change in properties may occur due to incidence of light with a large light intensity. In such a case, when Step ST14 is performed prior to at least one of Steps ST12 and ST13, there is concern that the first temporal waveform TW1 and/or the second temporal waveform TW2 measured thereafter may lack accuracy. Such concern can be reduced by performing Step ST14 after Steps ST12 and ST13.

Thereafter, regarding Step ST15, the time response of the measurement object B is calculated based on the first temporal waveform TW1, the second temporal waveform TW2, and the third temporal waveform TW3. In this Step ST15, the time response of the measurement object B may be calculated based on a comparison between the second temporal waveform TW2 and the difference between the third temporal waveform TW3 and the first temporal waveform TW1, based on the principle described above. This Step ST15 corresponds to Step ST6 shown in FIG. 12.

Figure 29A:
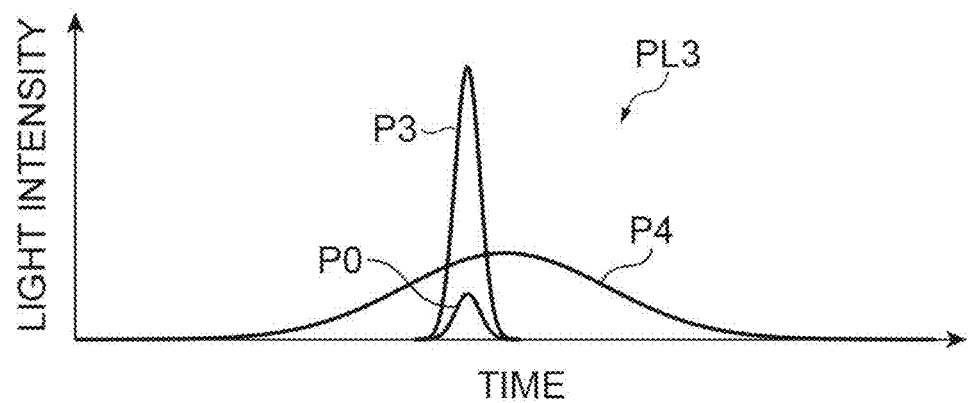
FIG. 29A illustrates a case in which a component pulse of the third pulsed light is superimposed on the pulsed light constituted of 0th-order light.

Points to note when the first pulsed light PL1, the second pulsed light PL2, and the third pulsed light PL3 are generated by the SLM 14 will be described. The SLM 14 outputs unmodulated 0th-order light in addition to 1st-order light, −1st-order light, and the like that are generated by phase modulation. Unlike the 1st-order light and the −1st-order light, the 0th-order light does not contribute to formation of the desired temporal waveform. Therefore, if pulsed light P0 constituted of the 0th-order light is temporally superimposed on the first pulsed light PL1, the second pulsed light PL2, and the third pulsed light PL3, the 0th-order light is detected together with the pump light and/or the probe light at the same time. For example, FIG. 29A illustrates a case in which the component pulse P3 of the third pulsed light PL3 is superimposed on the pulsed light P0 constituted of the 0th-order light. In such a case, the light intensity of the pump light and/or the probe light cannot be accurately detected.

Figure 29B:
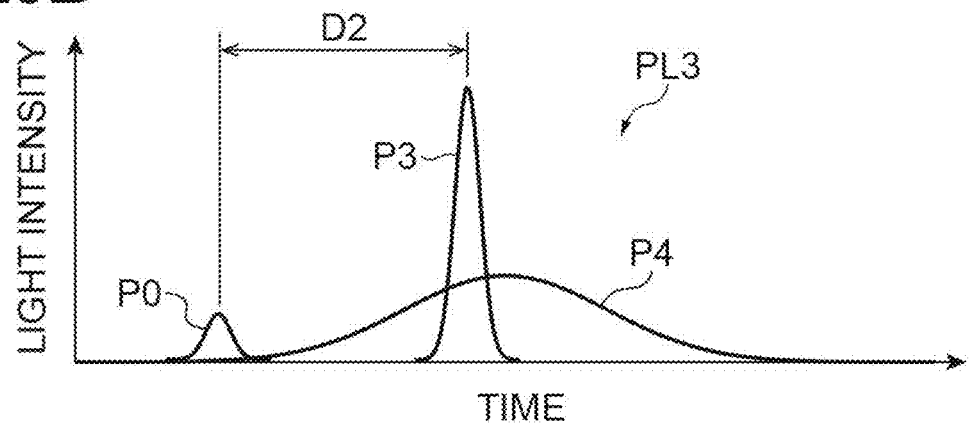
FIG. 29B illustrates a case in which the third pulsed light is generated after the pulsed light constituted of the 0th-order light.

Therefore, it is better to generate the first pulsed light PL1, the second pulsed light PL2, and the third pulsed light PL3 in a manner of being temporally shifted from the pulsed light P0 constituted of the 0th-order light. For example, FIG. 29B illustrates a case in which the third pulsed light PL3 is generated after the pulsed light P0. The time interval between the intensity peak of each of the first pulsed light PL1 and the second pulsed light PL2 and the intensity peak of the pulsed light P0 is one time to 100 times the pulse widths W1 and W2 of the first pulsed light PL1 and the second pulsed light PL2, for example. The same as that, a time interval $D_2$ between the intensity peak of the third pulsed light PL3 (typically denotes the intensity peak of the component pulse P3) and the intensity peak of the pulsed light P0 is two times to 100 times the pulse width of the third pulsed light PL3 (typically denotes the pulse width W4 of component pulse P4), for example. In one Example, the time interval $D_2$ is −1.5 ps.

Figure 30:
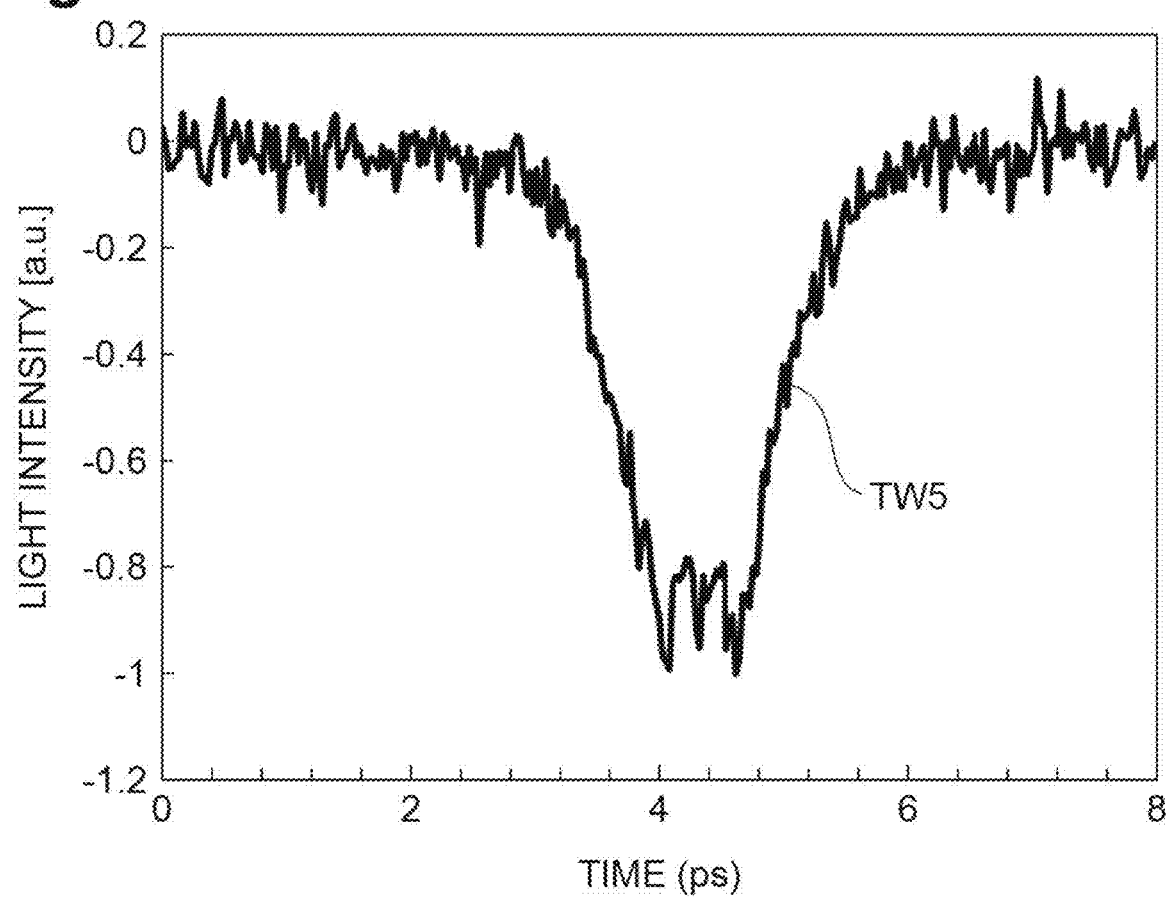
FIG. 30 is a graph illustrating an example of a temporal waveform obtained by subtracting the second temporal waveform and the first temporal waveform from the third temporal waveform and illustrates a case in which the first pulsed light, the second pulsed light, and the third pulsed light are temporally superimposed on 0th-order pulsed light.
Figure 31:
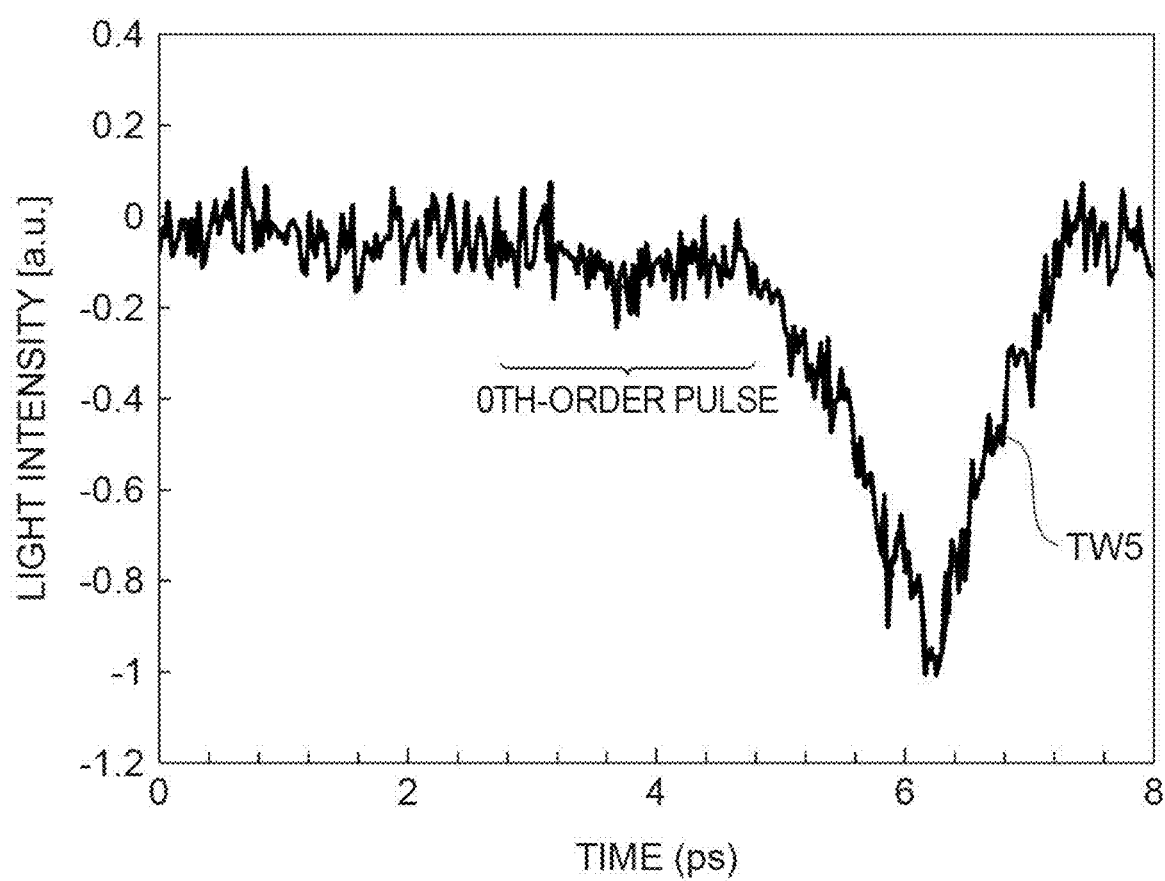
FIG. 31 is a graph illustrating an example of a temporal waveform obtained by subtracting the second temporal waveform and the first temporal waveform from the third temporal waveform and illustrates a case in which the first pulsed light, the second pulsed light, and the third pulsed light are generated after 1.5 ps of 0th-order pulsed light.

FIG. 30 and FIG. 31 are graphs illustrating examples of the temporal waveform TW5 that is a temporal waveform obtained by subtracting the second temporal waveform TW2 and the first temporal waveform TW1 from the third temporal waveform TW3. FIG. 30 shows a case in which the first pulsed light PL1, the second pulsed light PL2, and the third pulsed light PL3 are temporally superimposed on the pulsed light P0. FIG. 31 shows a case in which the first pulsed light PL1, the second pulsed light PL2, and the third pulsed light PL3 are generated after 1.5 ps of the pulsed light P0. As shown in FIG. 30, when the first pulsed light PL1, the second pulsed light PL2, and the third pulsed light PL3 are temporally superimposed on the pulsed light P0, it is difficult to separate the component of the pulsed light P0 from the temporal waveform TW5. In contrast, as shown in FIG. 31, when the first pulsed light PL1, the second pulsed light PL2, and the third pulsed light PL3 are generated sufficiently behind the pulsed light P0, it is easy to separate the component of the pulsed light P0 from the temporal waveform TW5.

The first pulsed light PL1, the second pulsed light PL2, and the third pulsed light PL3 may be generated before the pulsed light P0 or may be generated after the pulsed light P0. However, since the time response of the measurement object B continues for a long time after the pump light is incident, the pulsed light P0 may be generated before the first pulsed light PL1, the second pulsed light PL2, and the third pulsed light PL3 (that is, the first pulsed light PL1, the second pulsed light PL2, and the third pulsed light PL3 may be generated after the pulsed light P0).

[Measurement of Wavelength Dispersion Amount]

Figure 32:
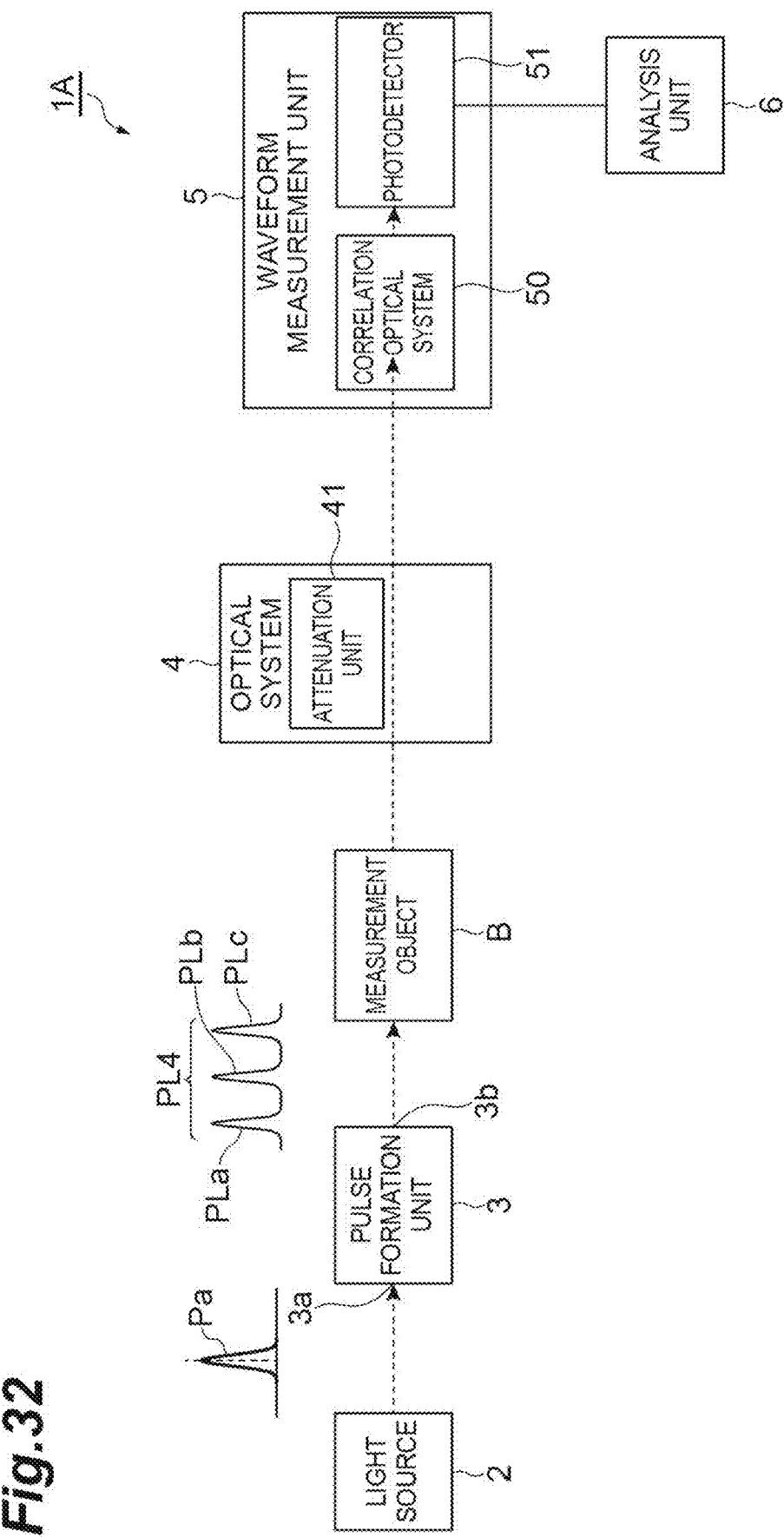
FIG. 32 is a diagram illustrating operation of an optical property measurement apparatus when it is used as a wavelength dispersion measurement apparatus.

Measurement of a wavelength dispersion amount of the measurement object B using the optical property measurement apparatus 1A of the present embodiment will be described. FIG. 32 is a diagram illustrating operation of the optical property measurement apparatus 1A when it is used as a wavelength dispersion measurement apparatus. In measurement of a wavelength dispersion amount, the optical system 4 is set in the second state, that is, a state in which the attenuation unit 41 is not arranged on the optical path of the pulsed light PL output from the measurement object B. Further, the pulse formation unit 3 forms a light pulse train PL4 as the pulsed light PL from the initial pulsed light Pa. The light pulse train PL4 includes light pulses PLa, PLb, and PLc having a time difference therebetween and having center wavelengths different from each other. The light pulse train PL4 is a group of single pulses generated by dividing a spectrum constituting the initial pulsed light Pa into a plurality of wavelength bands and using each of the wavelength bands. At boundaries between the plurality of wavelength bands, there may be superimposed parts therebetween. In the following description, the light pulse train PL4 may be referred to as "band-controlled multi-pulse".

Figure 33C:
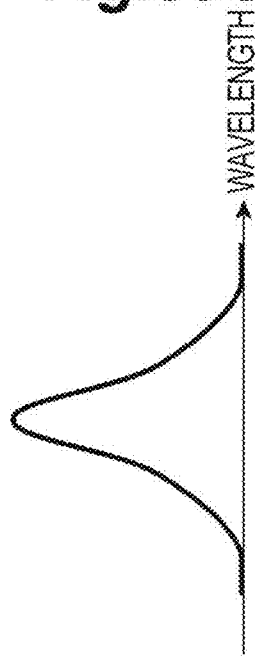
FIGS. 33A to 33C are diagrams illustrating an example of band-controlled multi-pulse.
Figure 33A:
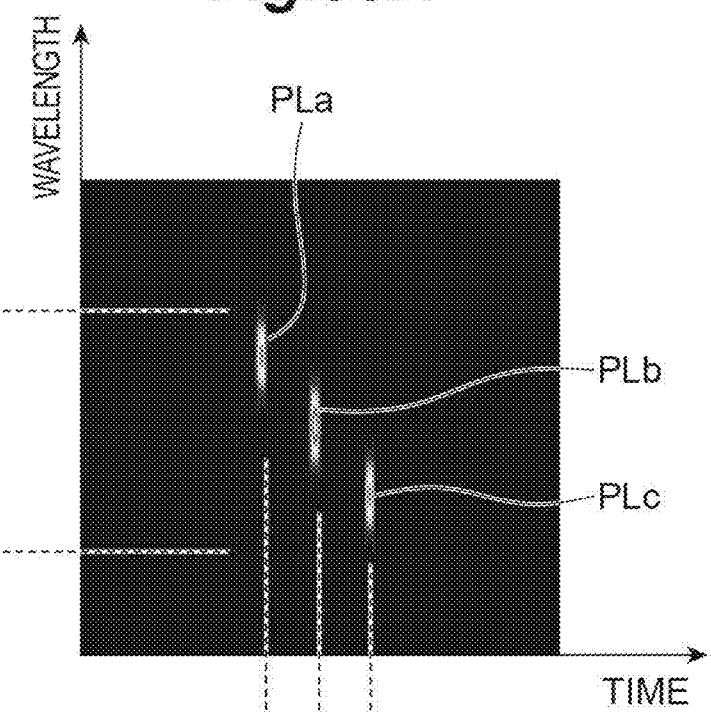
Figure 33B:
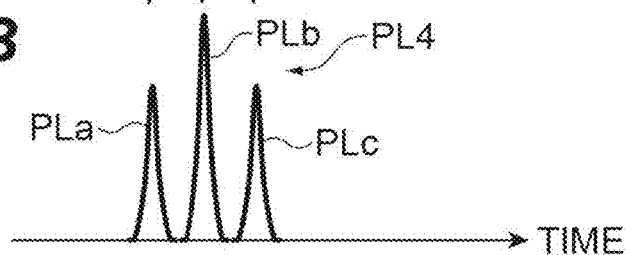

FIGS. 33A to 33C are diagrams illustrating an example of the band-controlled multi-pulse. In this example, the light pulse train PL4 including three light pulses PLa, PLb, and PLc is illustrated. FIG. 33A is a spectrogram showing the time on the horizontal axis, the wavelength on the vertical axis, and the light intensity is represented by contrast of color. FIG. 33B shows a temporal waveform of the light pulse train PL4. The temporal waveform of each of the light pulses PLa, PLb, and PLc has a shape of a Gaussian function, for example. As shown in FIGS. 33A and 33B, the peaks of the light pulses PLa, PLb, and PLc are temporally separated from each other, and the propagation timings of the light pulses PLa, PLb, and PLc are shifted from each other. In other words, the light pulses PLa, PLb, and PLc have a time difference therebetween. The center wavelengths of the light pulses PLa, PLb, and PLc are different from each other. For example, the time interval (peak interval) between the light pulses PLa, PLb, and PLc is within a range of 10 fs to 10,000 fs, and is 2,000 fs in one example. Further, the FWHM of the light pulses PLa, PLb, and PLc is, for example, within a range of 10 fs to 5,000 fs, and is 300 fs in one example.

FIG. 33C shows a spectrum obtained by combining the light pulses PLa, PLb, and PLc. As shown in FIG. 33C, the spectrum obtained by combining the light pulses PLa, PLb, and PLc has a single peak. However, with reference to FIG. 33A, the center wavelengths of the light pulses PLa, PLb, and PLc are shifted from each other. The single peak shown in FIG. 33C substantially corresponds to the spectrum of the initial pulsed light Pa. An interval between the peak wavelengths of adjacent light pulses PLa and PLb (or PLb and PLc) is determined by the spectral bandwidth of the initial pulsed light Pa, and it is within a range of substantially two times the full width at half maximum. In an example, when the spectral bandwidth of the initial pulsed light Pa is 10 nm, the interval between the peak wavelengths is 5 nm. As a specific example, when the center wavelength of the initial pulsed light Pa is 1,030 nm, the peak wavelengths of the light pulses PLa, PLb, and PLc can be 1,025 nm, 1,030 nm, and 1,035 nm, respectively.

FIGS. 34A to 34C are diagrams illustrating an example of multi-pulse which have not been band-controlled as a comparative example. In this example, a light pulse train PL5 including three light pulses PLd, PLe, and PLf is illustrated. FIG. 34A is a spectrogram, same as FIG. 33A, showing the time on the horizontal axis, the wavelength on the vertical axis, and the light intensity is represented by contrast of color. FIG. 34B shows a temporal waveform of the light pulse train PL5. FIG. 34C shows a spectrum obtained by combining the light pulses PLd, PLe, and PLf. As shown in FIGS. 34A to 34C, the peaks of the light pulses PLd, PLe, and PLf are temporally separated from each other, and the center wavelengths of the light pulses PLd, PLe, and PLf coincide with each other. When the wavelength dispersion amount of the measurement object B is measured, the pulse formation unit 3 of the present embodiment does not generate such a light pulse train PL5, but generates the light pulse train PL4 having different center wavelengths as shown in FIGS. 33A to 33C.

Figure 35A:
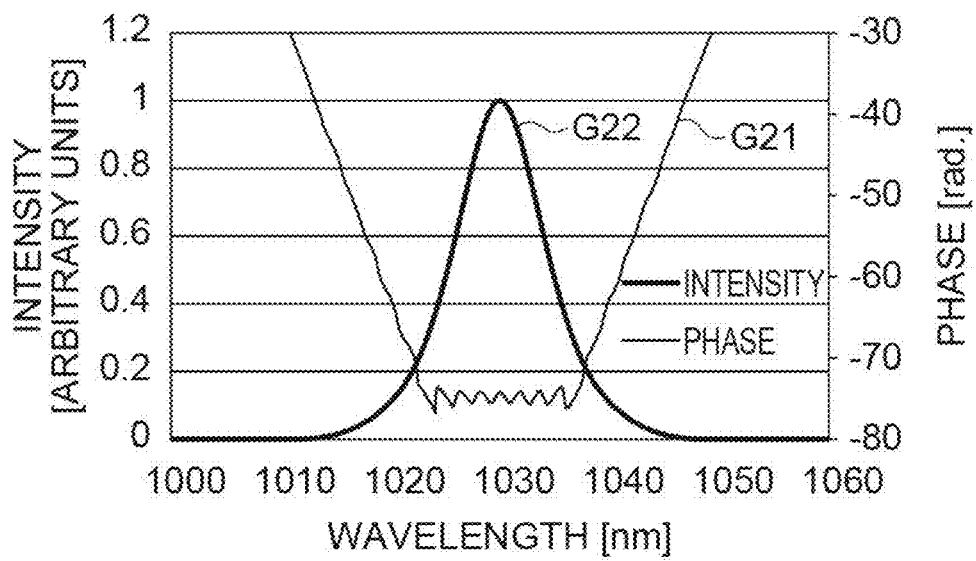
FIG. 35A illustrates a specific example of a spectral waveform applied to initial pulsed light by the spatial light modulator in order to generate a light pulse train.
Figure 35B:
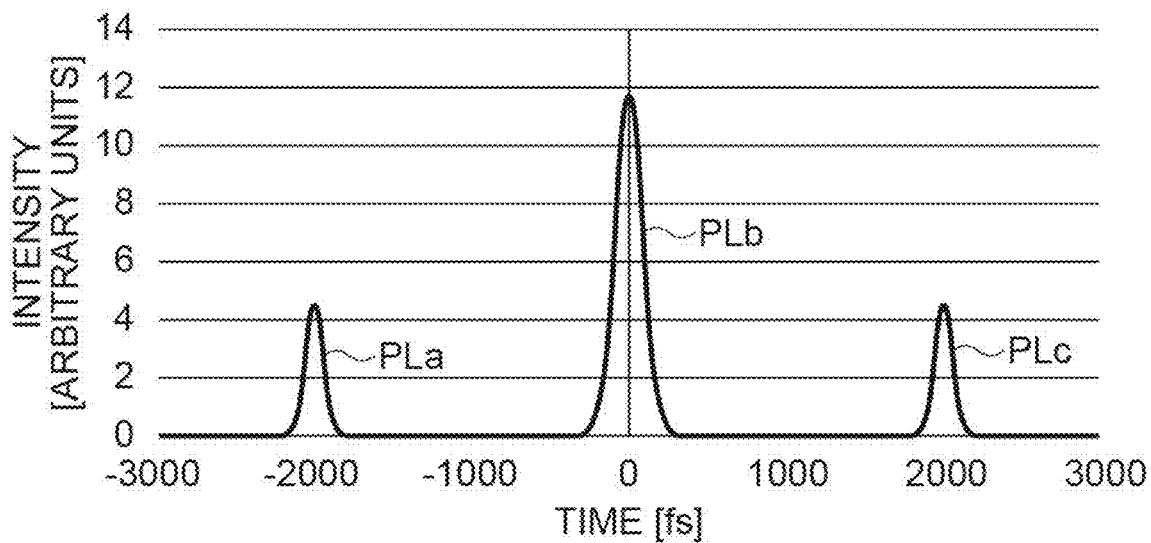
FIG. 35B is a graph illustrating a temporal intensity waveform of the light pulse train generated based on the spectral waveform illustrated in FIG. 35A.

FIG. 35A illustrates a specific example of a spectral waveform (a spectrum phase G21 and a spectrum intensity G22) applied to the initial pulsed light Pa by the SLM 14 in order to generate the light pulse train PL4. FIG. 35A shows the wavelength (nm) on the horizontal axis, and the spectrum intensity (arbitrary units) and the spectrum phase (rad) on the vertical axis. FIG. 35B is a graph illustrating a temporal intensity waveform of the light pulse train PL4 generated based on the spectral waveform illustrated in FIG. 35A. FIG. 35B shows the time (fs) on the horizontal axis, and the light intensity (arbitrary units) on the vertical axis. The center wavelengths of the light pulses PLa, PLb, and PLc are 1,025 nm, 1,030 nm, and 1,035 nm, respectively.

The measurement object B is arranged on the optical axis of the light pulse train PL4 output from the pulse formation unit 3. The light pulse train PL4 output from the pulse formation unit 3 is incident on the measurement object B.

The light pulse train PL4 transmitted through the measurement object B is output from the measurement object B.

The measurement object B is a light guide member such as an optical fiber or an optical waveguide, for example. Examples of an optical fiber include a single mode fiber, a multi-mode fiber, a rare earth-doped fiber, a photonic crystal fiber, a dispersion shifted fiber, and a double cladding fiber. Examples of an optical waveguide include a micro-waveguide made of a semiconductor such as SiN or InP. Alternatively, the measurement object B may be, for example, a semiconductor or a dielectric optical crystal. In that case, the measurement object B may be diamond, $SiO_2$, $LiNbO_3$, $LiTaO_3$, PLZT, Si, Ge, fullerene, graphite, graphene, carbon nanotube, GaN, GaAs, a magnetic material, an organic material, a polymer material, or the like.

The light pulse train PL4 having passed through the optical system 4 is input to the correlation optical system 50. The correlation optical system 50 transforms the light pulse train PL4 into correlation light including a cross-correlation or an auto-correlation. The light pulse train PL4 transformed into correlation light is output from the correlation optical system 50.

Figure 36A:
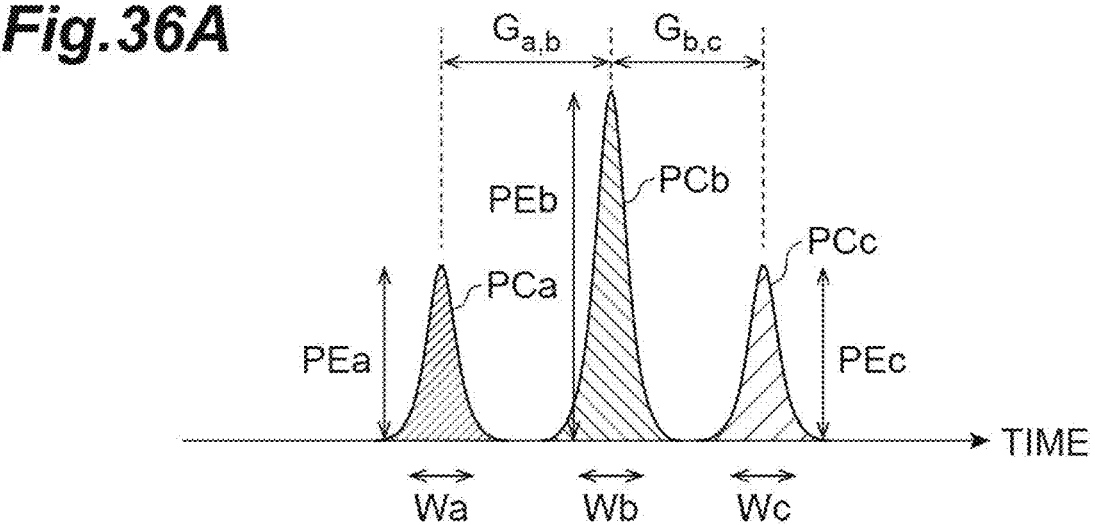
FIGS. 36A and 36B are conceptual explanatory diagrams of a feature value of correlation light of a light pulse train.
Figure 36B:
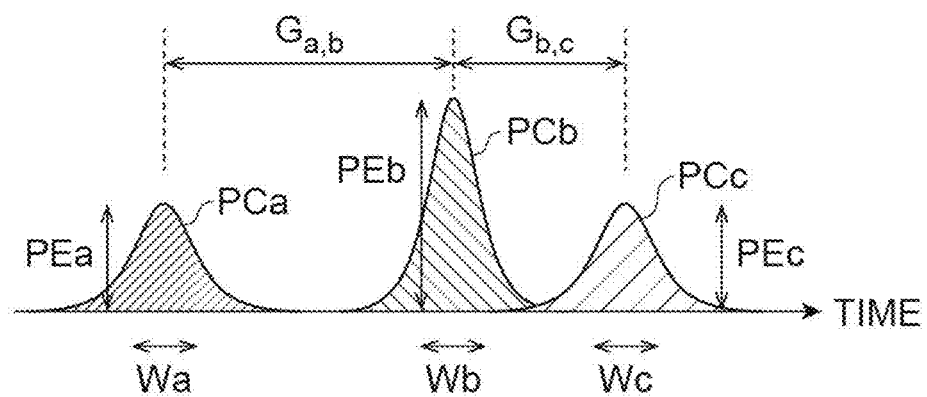

FIGS. 36A and 36B are diagrams for conceptually describing feature value of correlation light of the light pulse train PL4. FIG. 36A illustrates an example of a temporal waveform of correlation light when the light pulse train PL4 does not pass through the measurement object B. FIG. 36B illustrates an example of a temporal waveform of correlation light when the light pulse train PL4 passes through the measurement object B. These examples illustrate cases in which the light pulse train PL4 incident on the measurement object B includes three light pulses PLa, PLb, and PLc shown in FIG. 33B. In these cases, the correlation light includes three light pulses PCa, PCb, and PCc corresponding to the light pulses PLa, PLb, and PLc, respectively. Here, it is assumed that the peak intensities of the light pulses PCa, PCb, and PCc are PEa, PEb, and PEc, the full widths at half maximum (FWHM) of the light pulses PCa, PCb, and PCc are Wa, Wb, and Wc, the peak time interval (pulse interval) between the light pulses PCa and PCb is $G_{a,b}$, and the peak time interval between the light pulses PCb and PCc is $G_{b,c}$.

As shown in FIG. 36A, when the light pulse train PL4 does not pass through the measurement object B, the temporal waveform of the correlation light is substantially the same as the temporal waveform of the light pulse train PL4 immediately after being output from the pulse formation unit 3. In this example, the peak intensity PEb is larger than the peak intensities PEa and the PEc, and the peak intensities PEa and the PEb are substantially equivalent to each other. The full width at half maximum Wa, Wb, and Wc are substantially equivalent to each other. The peak time interval $G_{a,b}$ and $G_{b,c}$ are substantially equivalent to each other. In contrast, as shown in FIG. 36B, when the light pulse train PL4 passes through the measurement object B, the temporal waveform of the correlation light significantly changes from the temporal waveform of the light pulse train PL4 due to wavelength dispersion of the measurement object B. In this example, the peak intensities PEa, PEb, and PEc of the light pulses PCa, PCb, and PCc have significantly decreased compared to those in FIG. 36A, and the full widths at half maximum Wa, Wb, and Wc of the light pulses PCa, PCb, and PCc have remarkably increased compared to those in FIG. 36A. Moreover, the peak time interval $G_{a,b}$ has outstandingly lengthened compared to those in FIG. 36A.

In this manner, if the light pulse train PL4 passes through the measurement object B, the feature value (the peak intensity PEa, PEb, and PEc, the full widths at half maximum Wa, Wb, and Wc, and the peak time intervals $G_{a,b}$ and $G_{b,c}$) of the temporal waveform of the correlation light significantly changes compared to the case in which the light pulse train PL4 does not pass through the measurement object B. Further, the degree of change thereof depends on the wavelength dispersion amount of the measurement object B. Therefore, the wavelength dispersion amount of the measurement object B can be ascertained accurately and easily by observing change in feature value of the temporal waveform of the correlation light. However, the wavelength dispersion amount of the measurement object B may be corrected using a known wavelength dispersion amount of the pulsed laser light source 2.

Figure 37:
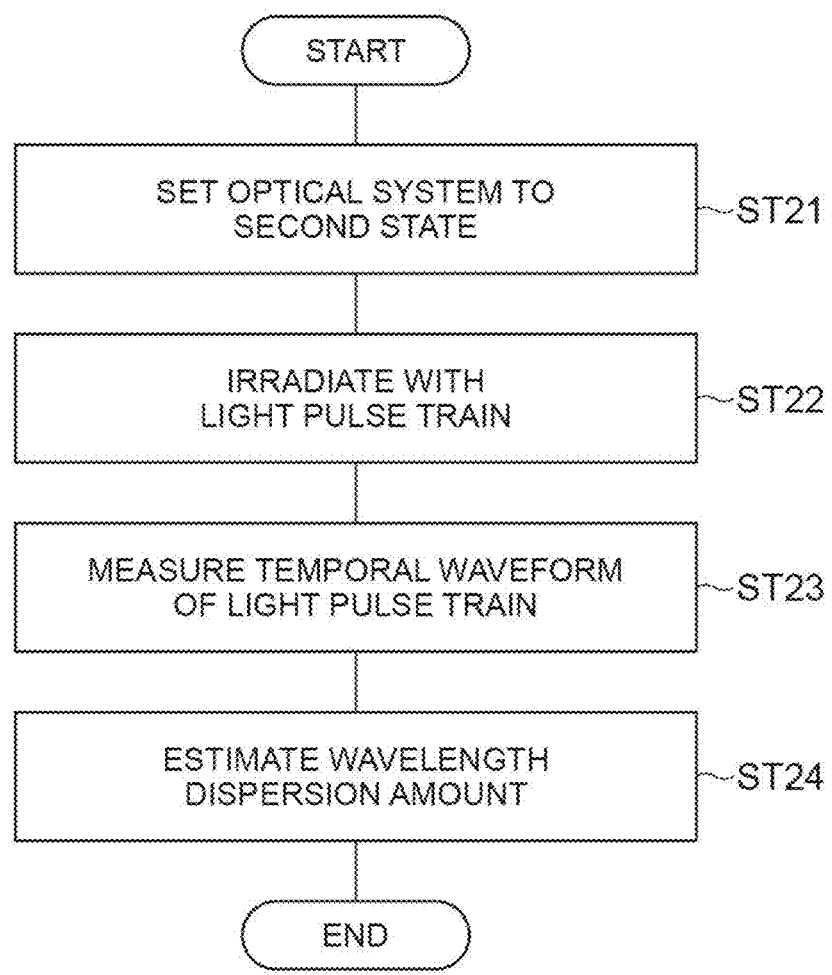
FIG. 37 is a flowchart showing a wavelength dispersion measurement method according to an embodiment.

FIG. 37 is a flowchart showing a wavelength dispersion measurement method of the present embodiment. This wavelength dispersion measurement method is a method for measuring a wavelength dispersion amount of the measurement object B and is performed using the optical property measurement apparatus 1A described above, for example.

First, in the optical system 4, the second state (a state in which the attenuation unit 41 is not arranged on the optical path of the pulsed light PL output from the measurement object B) is selected (Step ST21). The Step ST21 corresponds to Step ST1 shown in FIG. 12. Next, the light pulse train PL4 including the plurality of light pulses PLa, PLb, and PLc having a time difference therebetween and having center wavelengths different from each other is generated as the pulsed light PL by the pulse formation unit 3, and the measurement object B is irradiated with the light pulse train PL4 (Step ST22). The Step ST2 corresponds to Step ST2 shown in FIG. 12. Next, the temporal waveform of the light pulse train PL4 having passed through the measurement object B is measured by the waveform measurement unit 5 (Step ST23). In Step ST23, the temporal waveform of the light pulse train PL4 may be measured by generating the correlation light of the light pulse train PL4 using the correlation optical system 50. Next, the wavelength dispersion amount of the measurement object B is estimated based on the feature value of the temporal waveform of the light pulse train PL4 by the analysis unit 6 (Step ST24).

Effects obtained by the optical property measurement apparatus 1A and the optical property measurement method according to the present embodiment described above will be described. In the optical property measurement apparatus 1A and the optical property measurement method according to the present embodiment, the number of pulses, the spectrum, and the temporal waveform can be set according to the type of the optical property to be measured by using the pulse formation unit 3 capable of changing the number of pulses, the spectrum, and the temporal waveform of the pulsed light PL. The presence or absence of the attenuation unit 41 on the optical path can be set using the optical system 4 capable of switching between the first state in which the attenuation unit 41 is arranged on the optical path of the pulsed light PL output from the measurement object B and the second state in which the attenuation unit 41 not arranged on the optical path. The attenuation rate of the attenuation unit 41 with respect to one wavelength component constituting the pulsed light PL is larger than the attenuation rate of the attenuation unit 41 with respect to another wavelength component constituting the pulsed light PL. Therefore, measurement of optical property requiring light reduction of one wavelength component constituting the pulsed light PL after passing through the measurement object B (for example, the time response measurement) and measurement of optical property not requiring light reduction thereof after passing through the measurement object B (for example, the wavelength dispersion measurement) can be performed using one apparatus. Thus, measurement of two or more types of the optical properties, for example, the time response measurement and the wavelength dispersion measurement can be performed using one apparatus.

As shown in FIGS. 4A and 4B, in the optical system 4, the attenuation unit 41 may be movable in a direction intersecting the optical axis of the pulsed light PL. Alternatively, as shown in FIGS. 5A, 5B, 6A and 6B, the optical system 4 may have a configuration for switching between two optical paths for the pulsed light PL, and the attenuation unit 41 may be arranged on either optical path of the two optical paths. Since the optical system 4 has either configuration of them, it is possible to easily switch between the first state in which the attenuation unit 41 is arranged on the optical path and the second state in which the attenuation unit 41 is not arranged on the optical path.

As in the present embodiment, types of the optical properties to be measured may include the time response inside the measurement object B caused by light incidence and the wavelength dispersion amount of the measurement object B, and the optical system 4 may be set in the first state when the time response is measured and in the second state when the wavelength dispersion amount is measured. When the time response is measured, it is desired that the pump light and the probe light having wavelengths different from each other be incident on the measurement object B and then only the probe light be measured by removing the pump light. In this case, the pump light corresponds to the foregoing one wavelength component, and the probe light corresponds to the foregoing another wavelength component. When the wavelength dispersion amount is measured, it is desired that the light pulse train PL4 including the plurality of light pulses PLa, PLb, and PLc having wavelengths different from each other be incident on the measurement object B and the temporal waveform of the light pulse train PL4 having passed through the measurement object B be detected while a light intensity ratio between the wavelength components is maintained. In the optical system 4, the time response measurement and the wavelength dispersion measurement can be performed by selecting the first state when the time response is measured and selecting the second state when the wavelength dispersion amount is measured.

As in the present embodiment, when the wavelength dispersion amount is measured, the pulse formation unit 3 may form the light pulse train PL4 including the plurality of pulses PLa, PLb, and PLc having a time difference therebetween and having center wavelengths different from each other as the pulsed light PL. The waveform measurement unit 5 may measure the temporal waveform of the light pulse train PL4 having passed through the measurement object B. The analysis unit 6 may estimate the wavelength dispersion amount of the measurement object B based on the feature value of the temporal waveform of the light pulse train PL4. Accordingly, the wavelength dispersion amount of the measurement object B can be measured.

As in the present embodiment, when the time response is measured, the pulse formation unit 3 may generate, as the pulsed light PL, the first pulsed light PL1 including a wavelength of the pump light, the second pulsed light PL2 including a wavelength of the probe light, and the third pulsed light PL3 including both a wavelength of the pump light and a wavelength of the probe light, on a common optical axis. The attenuation rate of the attenuation unit 41 with respect to the pump light may be larger than the attenuation rate of the attenuation unit 41 with respect to the probe light. The waveform measurement unit 5 may measure the first temporal waveform TW1 that is a temporal waveform of the first pulsed light PL1 having passed through the attenuation unit 41, the second temporal waveform TW2 that is a temporal waveform of the second pulsed light PL2 having passed through the attenuation unit 41, and the third temporal waveform TW3 that is a temporal waveform of the third pulsed light PL3 having passed through the attenuation unit 41. The analysis unit 6 may calculates the time response of the measurement object B based on the first temporal waveform TW1, the second temporal waveform TW2, and the third temporal waveform TW3.

As in the present embodiment, when the time response is measured, Steps ST2 and ST3 shown in FIG. 12 may be alternately repeated. Further, in Step ST12 corresponding to one repetition, the first pulsed light PL1 that is the pulsed light PL including a wavelength of the pump light may be incident on the measurement object B along a predetermined optical axis (Step ST2), and the first temporal waveform TW1 that is a temporal waveform of the first pulsed light PL1 having passed through the attenuation unit 41 after being output from the measurement object B may be measured (Step ST3). In Step ST13 corresponding to another repetition, the second pulsed light PL2 that is the pulsed light PL including the wavelength of the probe light may be incident on the measurement object B along a predetermined optical axis (Step ST2), and the second temporal waveform TW2 that is a temporal waveform of the second pulsed light PL2 having passed through the attenuation unit 41 after being output from the measurement object B may be measured (Step ST3). In Step ST14 corresponding to still another repetition, the third pulsed light PL3 that is the pulsed light PL including the wavelength of the probe light may be incident on the measurement object B along a predetermined optical axis (Step ST2), and the third temporal waveform TW3 that is a temporal waveform of the third pulsed light PL3 having passed through the attenuation unit 41 after being output from the measurement object B may be measured (Step ST3). Further, in Step ST15 corresponding to Step ST6 in which optical property of the measurement object B are obtained, the time response of the measurement object B may be obtained based on the first temporal waveform TW1, the second temporal waveform TW2, and the third temporal waveform TW3.

Figure 47:
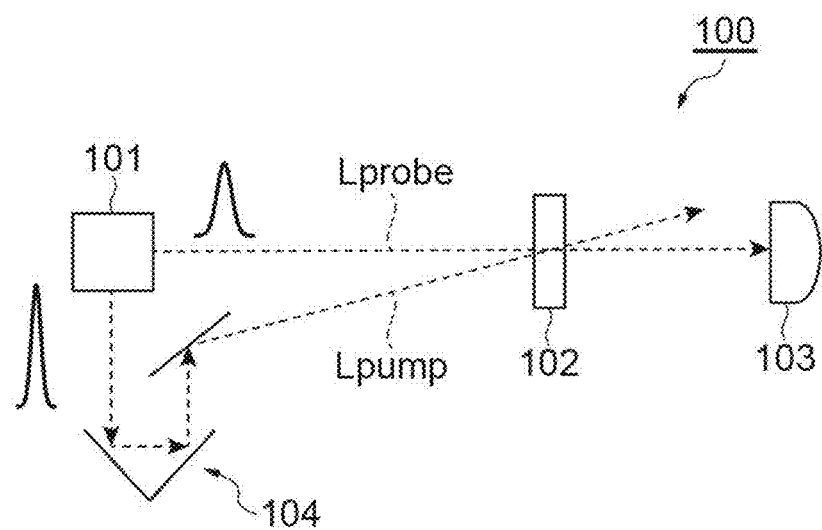
FIG. 47 is a schematic view illustrating a configuration of an apparatus as a comparative example for measuring a time response of the measurement object.

FIG. 47 is a schematic view illustrating a configuration of an apparatus 100 as a comparative example for measuring a time response of a measurement object 102. In the apparatus 100 illustrated in FIG. 47, an optical axis of pump light Lpump when passing through the measurement object 102 is inclined with respect to an optical axis of probe light Lprobe. In this case, in order for an irradiation position of the pump light Lpump is aligned with an irradiation position of the probe light Lprobe inside the measurement object 102, it is necessary to adjust the irradiation positions thereof on a micrometer order. Therefore, accuracy of spatial and temporal optical adjustment is required, and thus work becomes very complicated.

In order to resolve this problem, it is conceivable that the optical axes of the pump light and the probe light be aligned with each other without being inclined and the pump light and the probe light be incident on the measurement object arranged on the aligned optical axis. Accordingly, since it is not necessary to perform alignment work for the irradiation position of the pump light and the irradiation position of the probe light, measurement work can be simplified. However, in that case, the probe light is detected as light having the pump light superimposed thereon. Therefore, in order to measure the time response inside the measurement object caused by irradiation with the pump light by means of the probe light, it is desired to eliminate an influence of the pump light from the detection results. So, it is conceivable to remove only the pump light out of the pump light and the probe light that have passed through the measurement object. However, since the light intensity of the pump light is usually much larger than the light intensity of the probe light. Therefore, even if only the pump light is attenuated using a wavelength filter for example, a light intensity of the remaining pump light cannot be disregarded with respect to the light intensity of the probe light.

In the optical property measurement apparatus 1A and the optical property measurement method of the present embodiment, the first pulsed light PL1 including a wavelength of the pump light, the second pulsed light PL2 including a wavelength of the probe light, and the third pulsed light PL3 including a wavelength of the pump light and a wavelength of the probe light are generated on the common optical axis. Further, after the first pulsed light PL1, the second pulsed light PL2, and the third pulsed light PL3 are incident on the measurement object B on the optical axis, the attenuation unit 41 attenuates the light intensity of a wavelength of the pump light. In this case, the first temporal waveform TW1 that is a temporal waveform of the first pulsed light PL1 having passed through the attenuation unit 41 includes only the temporal waveform of the attenuated pump light. The second temporal waveform TW2 that is a temporal waveform of the second pulsed light PL2 having passed through the attenuation unit 41 includes only the temporal waveform of the probe light when the pump light is not incident. The third temporal waveform TW3 that is a temporal waveform of the third pulsed light PL3 having passed through the attenuation unit 41 includes a temporal waveform in which the temporal waveform of the probe light when the pump light is incident and the temporal waveform of the attenuated pump light are superimposed. Based on these temporal waveforms, while an influence of the pump light is eliminated by calculation, the time response inside the measurement object B caused by incidence of the pump light can be obtained from the temporal waveform of the probe light.

Furthermore, according to the optical property measurement apparatus 1A of the present embodiment, the following operations and effects can also be achieved. For instance, in a case in which the optical axis of the pump light when passing through the measurement object B is inclined with respect to the optical axis of the probe light, a region inside the measurement object B in which property change occurs is limited to a region in which the optical axis of the pump light intersects with the optical axis of the probe light, and the region is very small. Thus, an influence of property change in the corresponding region on the probe light is also small. In contrast, in the optical property measurement apparatus 1A of the present embodiment, the optical axis of the pump light is aligned with the optical axis of the probe light when the pump light and the probe light pass through the measurement object B. Therefore, a portion of the region inside the measurement object B where the property change occurs that overlaps with the region irradiated with the probe light extends along the optical axis of the probe light. A volume of the portion is larger than the portion in the case in which the optical axis of the pump light intersects with the optical axis of the probe light. Thus, since an influence of property change in the portion on the probe light is also large, the time response inside the measurement object B can be more accurately obtained.

As in the present embodiment, in the analysis unit 6 and Step ST15, the time response of the measurement object B may be obtained based on a comparison between the second temporal waveform TW2 and the difference between the third temporal waveform TW3 and the first temporal waveform TW1. The temporal waveform of the probe light when the pump light is incident can be obtained while an influence of the pump light is eliminated by calculating the difference between the third temporal waveform TW3 and the first temporal waveform TW1. Further, by comparison between the difference and the second temporal waveform TW2, the temporal waveform of the probe light when the pump light is incident can be compared with the temporal waveform of the probe light when the pump light is not incident to obtain the time response inside the measurement object B more accurately.

As in the present embodiment, the pulse formation unit 3 may have the SLM 14 generating the pulsed light PL by performing at least any modulation of phase modulation and intensity modulation of the input initial pulsed light Pa. The same as that, in Step ST2, the pulsed light PL may be generated using the SLM 14 performing at least any modulation of phase modulation and intensity modulation of the input initial pulsed light Pa. The pulse formation unit 3 may have the SLM 14 for generating the pulsed light PL by performing phase modulation and intensity modulation of the input initial pulsed light Pa at the same time. The same as that, in Step ST2, the pulsed light PL may be generated using the SLM 14 performing phase modulation and intensity modulation of the input initial pulsed light Pa at the same time. In these cases, various types of pulsed light PL can be selectively generated by simply changing the modulation pattern displayed in the SLM 14. Therefore, the pulsed light PL generated in the pulse formation unit 3 can be easily changed in accordance with the type of the optical property to be measured.

As in the present embodiment, the waveform measurement unit 5 may have the correlation optical system 50. The correlation optical system 50 is disposed at a stage subsequent to the optical system 4 and outputs correlation light including the cross-correlation or the auto-correlation of the pulsed light PL. Further, the analysis unit 6 may calculate the time response of the measurement object B based on the correlation light. In that case, even if the time width of the pulsed light PL is on a femtosecond order or a picosecond order, for example, the temporal waveform thereof can be accurately measured. Hence, the property change inside the measurement object B can be accurately measured.

As in the present embodiment, the attenuation unit 41 may have a wavelength filter having a cutoff band including a wavelength of the pump light and having a transmission band including a wavelength of the probe light. In this case, the light intensity of a wavelength of the pump light can be attenuated by a simple configuration.

As in the present embodiment, the time interval $D_1$ between the intensity peak of the component pulse P3 and the intensity peak of the component pulse P4 may be made variable in the pulse formation unit 3. In that case, the time interval $D_1$ between the component pulse P3 and the component pulse P4 can be easily set suitably in accordance with type or characteristics of the measurement object B.

As in the present embodiment, in the pulse formation unit 3, the ratio (W3/W4) of the pulse width W3 of the component pulse P3 to the pulse width W4 of the component pulse P4 may be made variable. In that case, the ratio between the pulse width of the pump light included in the third pulsed light PL3 and the pulse width of the probe light included in the third pulsed light PL3 can be easily set suitably in accordance with type or characteristics of the measurement object B.

As in the present embodiment, the pulse width W3 of the component pulse P3 may be smaller than the pulse width W4 of the component pulse P4. For example, it is conceivable to adopt a method in which the third pulsed light PL3 is detected a plurality of times while changing the time difference between the component pulse P3 and the component pulse P4 having the pulse width W4 approximately the same as the pulse width W3. According to the present embodiment, being different from such a method, measurement is completed by simply detecting the third pulsed light PL3 only once. Therefore, since the number of times of irradiation and the number of times of detection of the third pulsed light PL3 can be reduced, measurement work can be further simplified.

Figure 38:
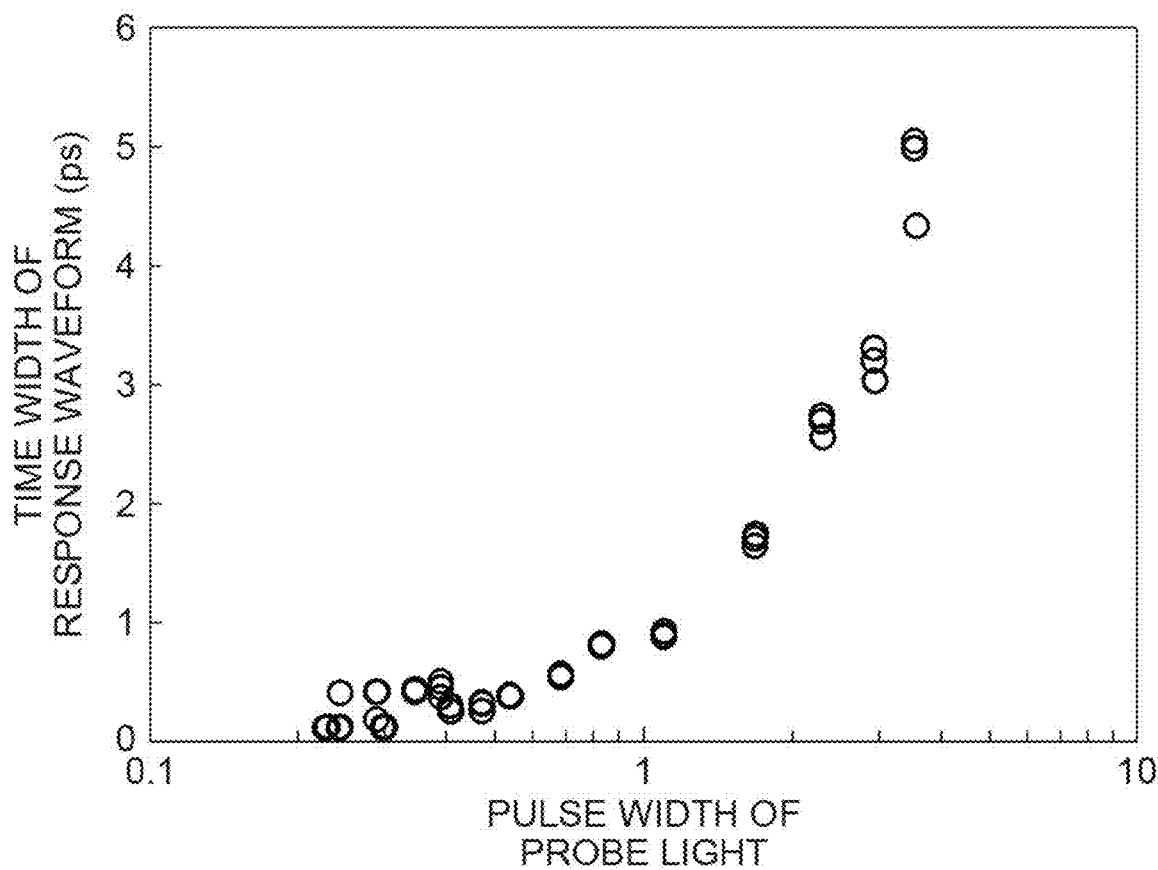
FIG. 38 is a graph illustrating a relationship between a pulse width of the probe light and a time width of a time response waveform of the measurement object.
Figure 39:
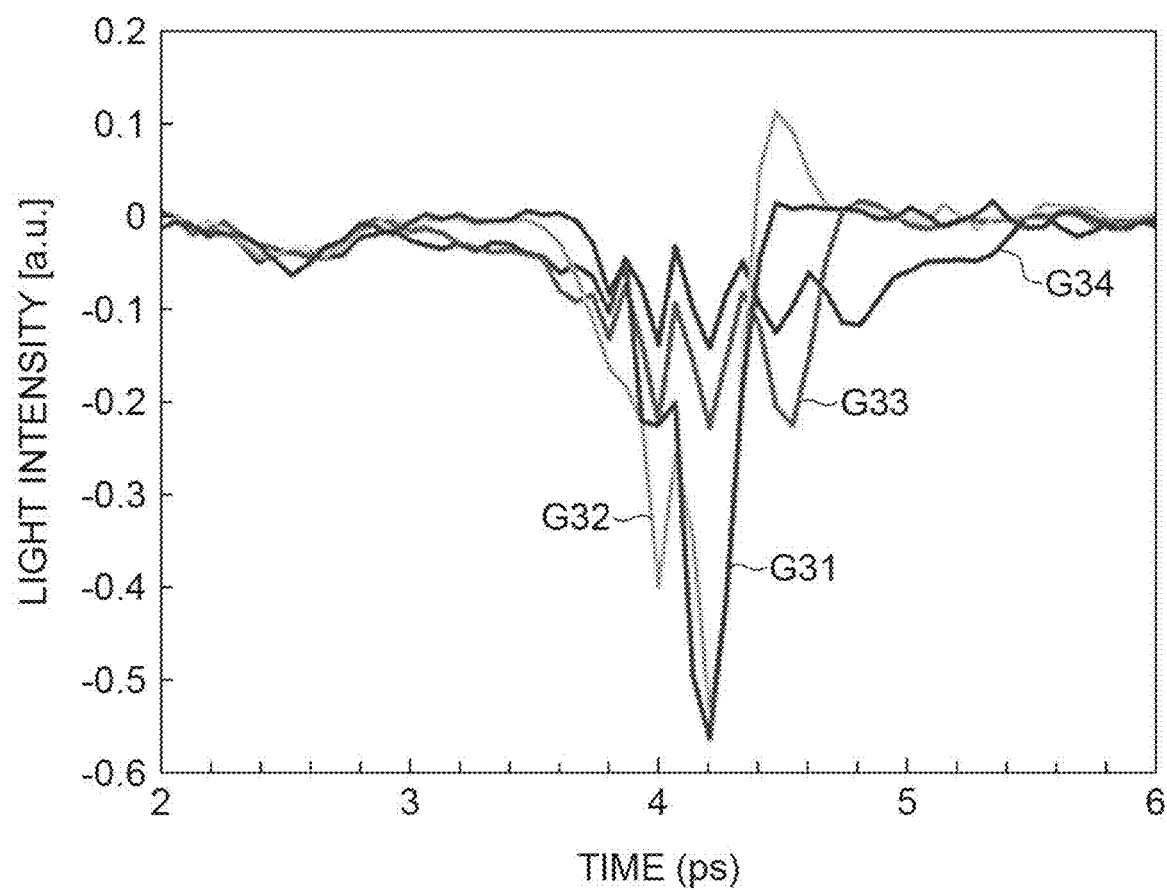
FIG. 39 is a graph illustrating a temporal waveform on which some plotting included in FIG. 38 is based.
Figure 40A:
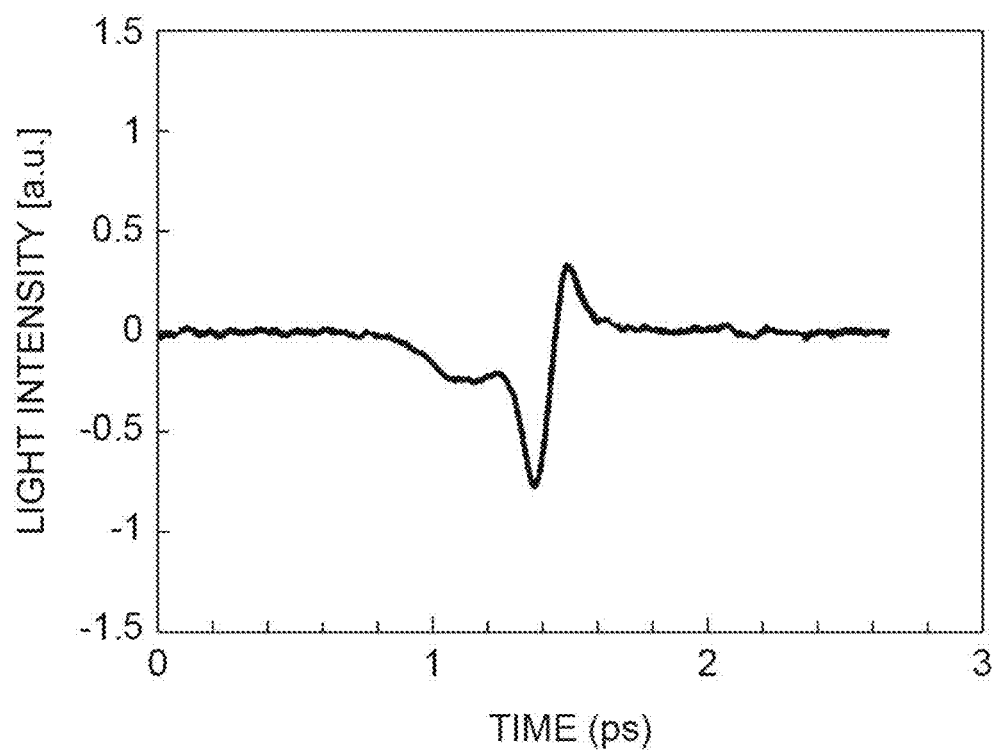
FIGS. 40A and 40B are graphs illustrating temporal waveforms obtained by subtracting temporal waveforms of the first pulsed light and the second pulsed light from a temporal waveform of the third pulsed light in a state in which a chirp amount of the probe light is respectively set to $-5{,}000$ fs$^2$ and $-2{,}500$ fs$^2$.
Figure 40B:
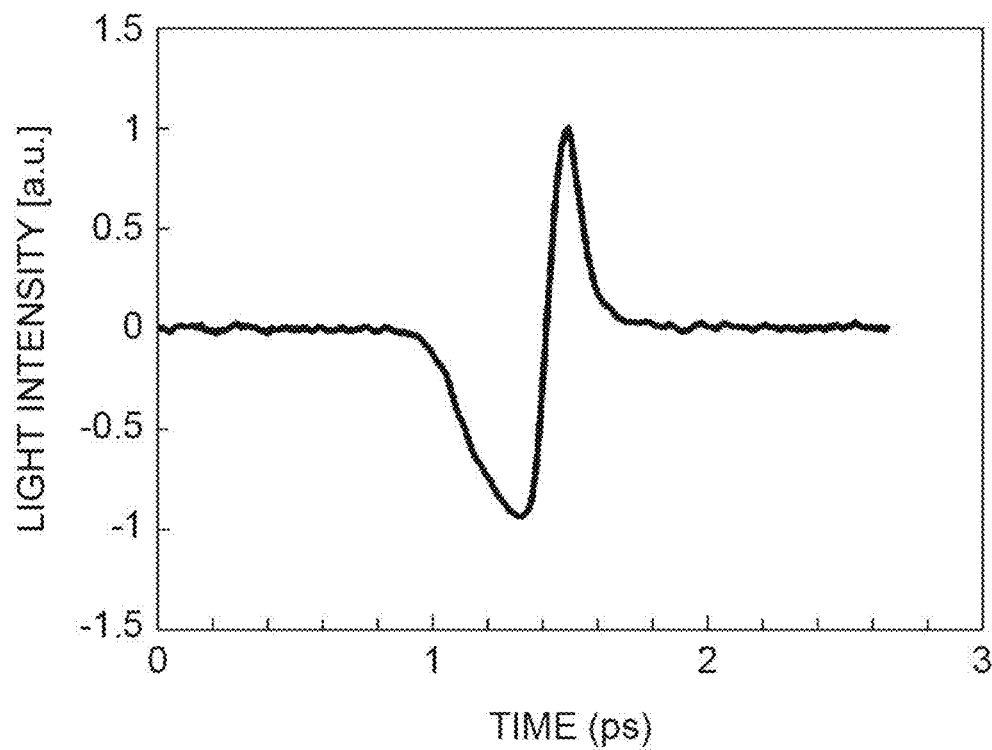
Figure 41A:
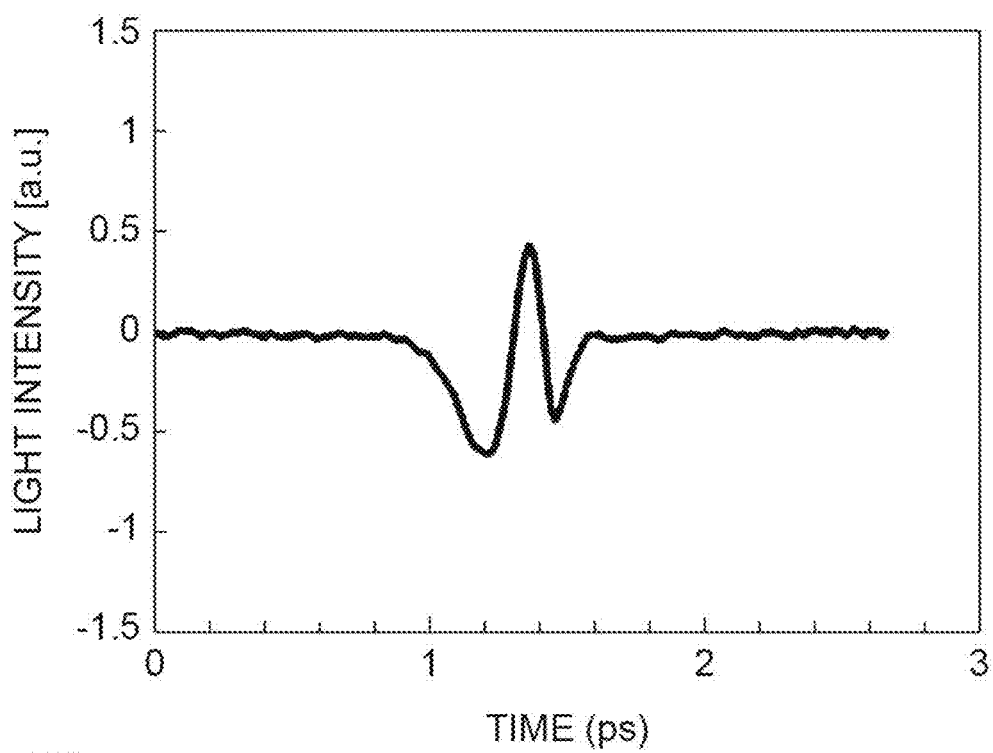
FIGS. 41A and 41B are graphs illustrating temporal waveforms obtained by subtracting temporal waveforms of the first pulsed light and the second pulsed light from a temporal waveform of the third pulsed light in a state in which a chirp amount of the probe light is respectively set to 0 fs$^2$ and $2{,}500$ fs$^2$.
Figure 41B:
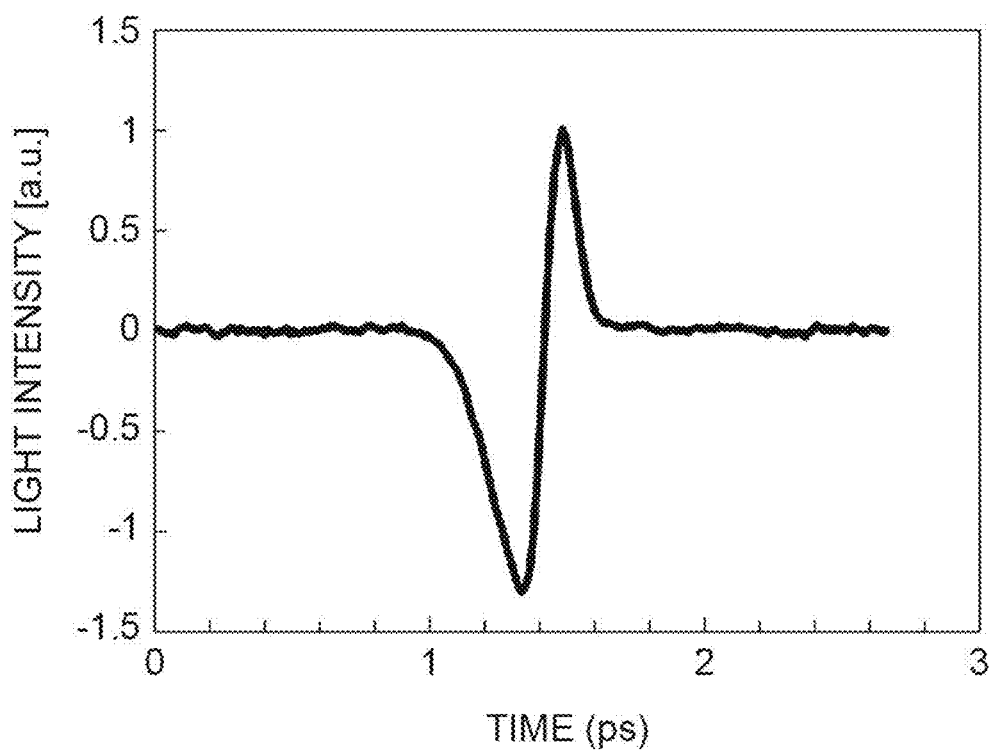
Figure 42A:
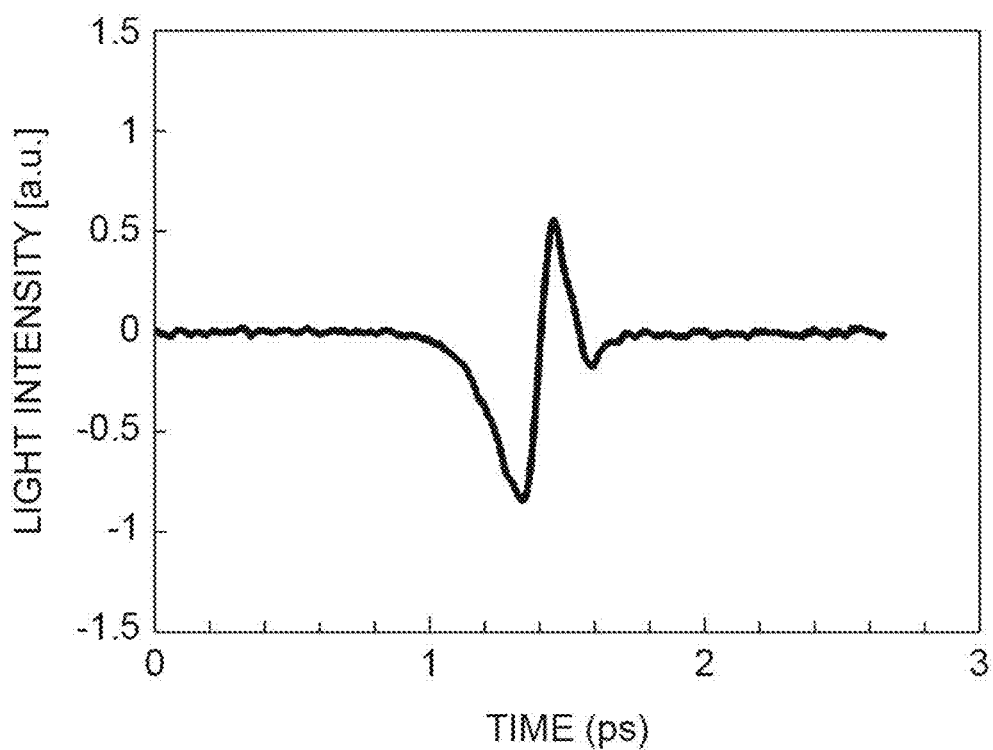
FIGS. 42A and 42B are graphs illustrating temporal waveforms obtained by subtracting temporal waveforms of the first pulsed light and the second pulsed light from a temporal waveform of the third pulsed light in a state in which a chirp amount of the probe light is respectively set to $5{,}000$ fs$^2$ and $10{,}000$ fs$^2$.
Figure 42B:
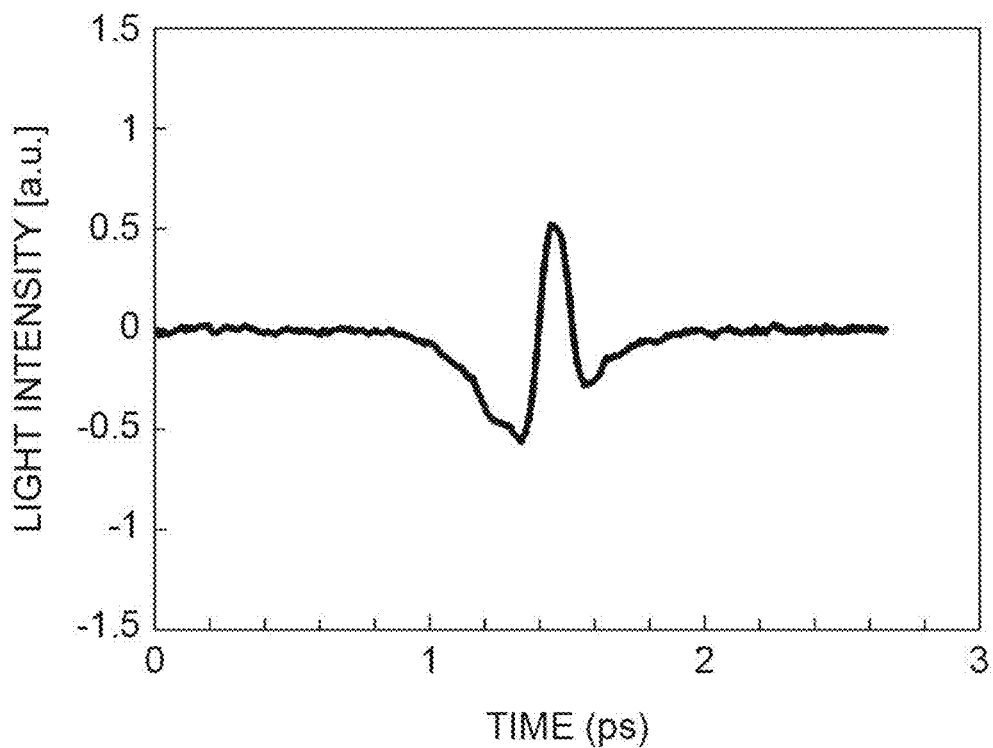

Here, an example of a method for determining the pulse width of the probe light, that is, the pulse width W2 of the second pulsed light PL2 and the pulse width W4 of component pulse P4 will be described. FIG. 38 is a graph illustrating a relationship between the pulse widths W2 and W4 and a time width Δt of the time response waveform of the measurement object B included in the temporal waveform TW5. FIG. 38 shows the pulse widths W2 and W4 (ps) on the horizontal axis, and the time width Δt (ps) on the vertical axis. FIG. 38 shows experimental results obtained by using a ZnTe crystal having a thickness of 1 mm as the measurement object B. FIG. 39 is a graph illustrating the temporal waveform TW5 on which some plotting included in FIG. 38 is based. FIG. 39 shows the time (ps) on the horizontal axis, and the light intensity (arbitrary units) on the vertical axis. In FIG. 39, the line G31 shows a result obtained by setting chirp amounts of the second pulsed light PL2 and the component pulse P4 to 15,000 fs². The line G32 shows a result obtained by setting chirp amounts of the second pulsed light PL2 and the component pulse P4 to 20,000 fs². The line G33 shows a result obtained by setting chirp amounts of the second pulsed light PL2 and the component pulse P4 to 40,000 fs². The line G34 shows a result obtained by setting chirp amounts of the second pulsed light PL2 and the component pulse P4 to 60,000 fs². The larger the chirp amount, the larger the pulse width.

With reference to FIG. 38, as the pulse widths W2 and W4 of the probe light increase, the time width Δt of the time response waveform of the measurement object B substantially increases. However, the time width Δt has substantially a constant value within a range in which the pulse widths W2 and W4 of the probe light are 400 fs to 600 fs. That is, it can be said that the temporal waveform TW5 does not change substantially within the range. The time width Δt within the range is 200 fs. From that, the time response of the measurement object B can be more accurately measured by determining the pulse widths W2 and W4 of the probe light within a range of two to three times the time response width of the measurement object B.

First Modification

The optical property measurement apparatus 1A of the above embodiment may also measure a third-order nonlinear coefficient χ (3) of the measurement object B by changing the pulse widths W2 and W4 of the probe light when the time response of the measurement object B is measured.

FIGS. 40A, 40B, 41A, 41B, 42A, and 42B are graphs illustrating the temporal waveform TW5 in cases in which the chirp amounts of the second pulsed light PL2 and the component pulse P4 are individually set to −5,000 fs², −2,500 fs², 0 fs², 2,500 fs², 5,000 fs², and 10,000 fs². The diagrams show the time (ps) on the horizontal axis and the light intensity (arbitrary units) on the vertical axis. With reference to the diagrams, it is ascertained that the phase of the time response waveform of the measurement object B changes in accordance with change in chirp amounts of the second pulsed light PL2 and the component pulse P4, that is, change in pulse widths W2 and W4 of the probe light. Such a phenomenon remarkably occurs when the pulse widths W2 and W4 of the probe light are relatively small (for example, 400 fs or shorter).

When the pump light is incident on the measurement object B, a refractive index of the measurement object B changes in the irradiation region thereof. As a result, the temporal waveform of the probe light is distorted when passing through the measurement object B. Such a phenomenon is referred to as cross-phase modulation (XPM). The magnitude of XPM depends on the third-order nonlinear coefficient χ (3) of the measurement object B. It is conceivable that a phase change of the time response waveform of the measurement object B be caused by the XPM. Therefore, the third-order nonlinear coefficient χ (3) of the measurement object B can be measured by detecting the phase change of the time response waveform of the measurement object B included in the temporal waveform TW5. The analysis unit 6 may calculate the third-order nonlinear coefficient χ (3) of the measurement object B based on the temporal waveform TW5. Information being a calculation source of the third-order nonlinear coefficient χ (3) is not limited to the temporal waveform TW5 and may be various types of information derived from the first temporal waveform TW1, the second temporal waveform TW2, and the third temporal waveform TW3.

Second Modification

Figure 43:
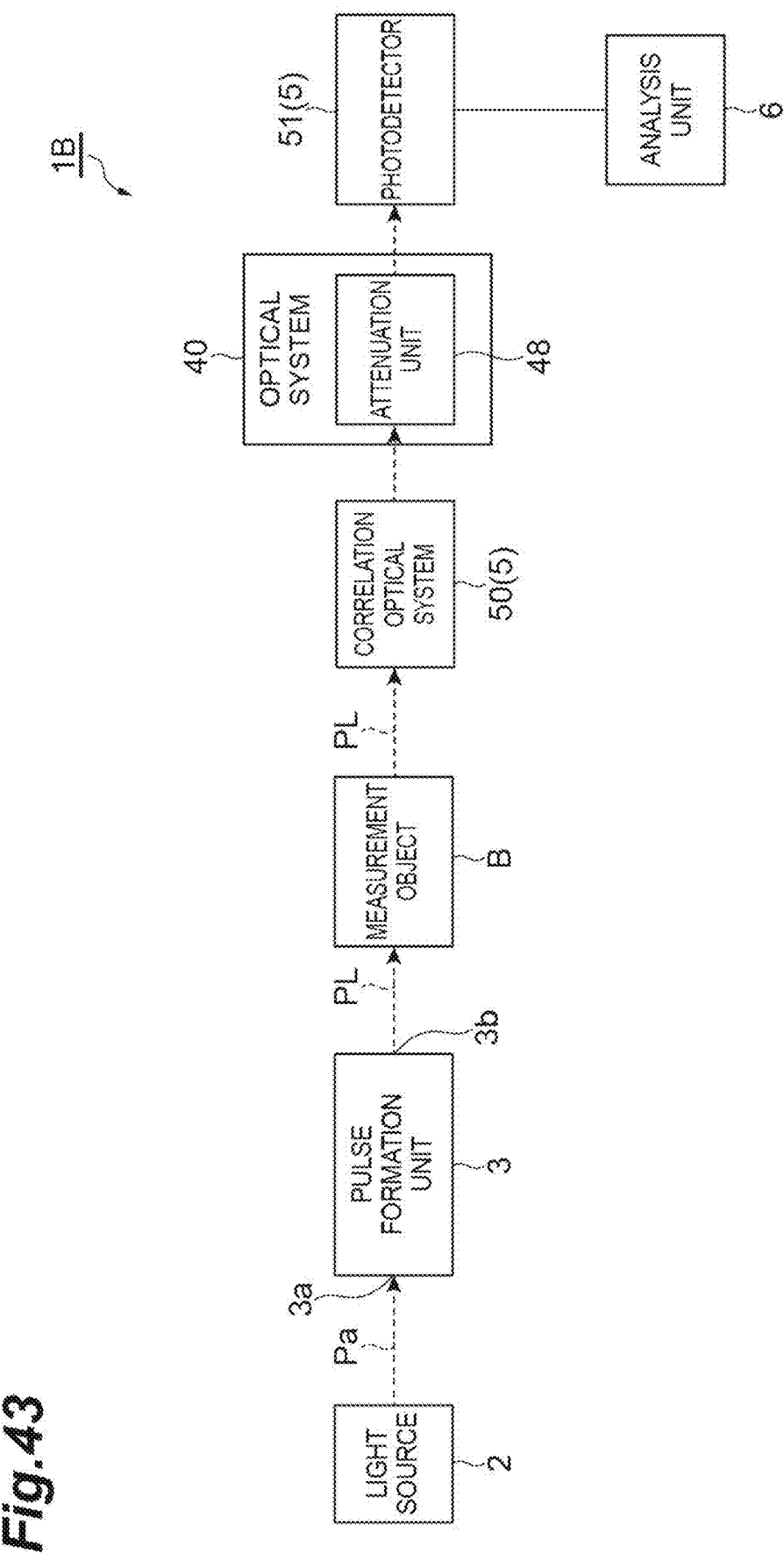
FIG. 43 is a diagram illustrating a configuration of an optical property measurement apparatus according to a second modification of the present disclosure.

FIG. 43 is a diagram illustrating a configuration of an optical property measurement apparatus 1B according to a second modification of the present disclosure. In the optical property measurement apparatus 1B, arrangement of the correlation optical system 50 differs from that in the optical property measurement apparatus 1A of the foregoing embodiment. That is, in the optical property measurement apparatus 1B, the correlation optical system 50 is arranged on an optical path between the measurement object B and an optical system 40. In that case, the correlation optical system 50 receives the pulsed light PL output from the measurement object B and generates correlation light of the pulsed light PL before attenuation.

The correlation light of the pulsed light PL reaches the optical system 40. The optical system 40 passes the correlation light of the pulsed light PL output from the correlation optical system 50. The optical system 40 has an attenuation unit 48. An attenuation rate of the attenuation unit 48 with respect to one wavelength component (for example, correlation light of the pump light) constituting the pulsed light PL is larger than an attenuation rate of the attenuation unit 48 with respect to another wavelength component (for example, correlation light of the probe light) constituting the pulsed light PL.

The optical system 40 is configured to be able to switch between the first state in which the attenuation unit 48 is arranged on the optical path of the pulsed light PL output from the correlation optical system 50 and the second state in which the attenuation unit 48 is not arranged on the optical path. The optical system 40 is set in the first state when the time response inside the measurement object B caused by light incidence is measured and is set in the second state when the wavelength dispersion amount of the measurement object B is measured. The configurations of the optical system 40 and the attenuation unit 48 except for those described above are the same as those in the foregoing embodiment.

When the time response inside the measurement object B is measured, the attenuation unit 48 transmits the wavelength component, which is caused by the probe light, included in the correlation light of each of the second pulsed light PL2 and the third pulsed light PL3, typically, the correlation light of each of the second pulsed light PL2 and the component pulse P4, without being attenuated substantially. In addition, the attenuation unit 48 attenuates the wavelength component, which is caused by the pump light, included in the correlation light of each of the first pulsed light PL1 and the third pulsed light PL3, typically, the correlation light of each of the first pulsed light PL1 and the component pulse P3.

Third Modification

Figure 44:
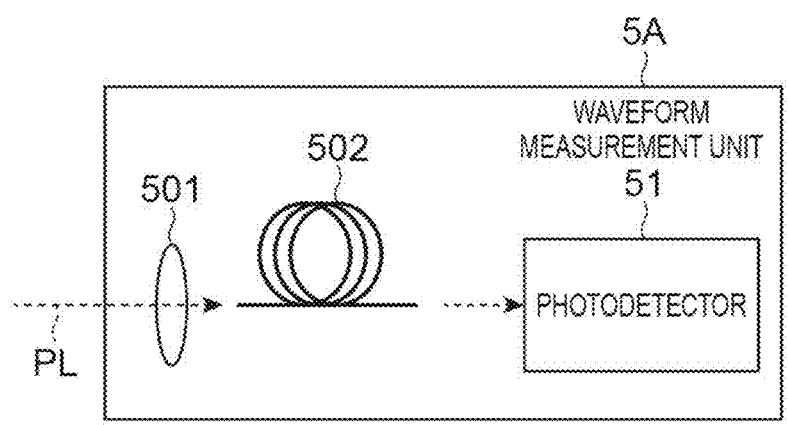
FIG. 44 is a diagram schematically illustrating a configuration of a waveform measurement unit according to a third modification of the present disclosure.

FIG. 44 is a diagram schematically illustrating a configuration of a waveform measurement unit 5A according to a third modification of the present disclosure. The optical property measurement apparatus 1A of the foregoing embodiment may include the waveform measurement unit 5A in place of the waveform measurement unit 5. The waveform measurement unit 5A has an elongated optical fiber 502 as an optical component in place of the correlation optical system 50. The elongated optical fiber 502 is an optical fiber having a sufficient length (for example, a length of several kilometers). The elongated optical fiber 502 is arranged at a stage subsequent to the optical system 4, and one end of the elongated optical fiber 502 is optically coupled to the optical system 4 via a lens 501. The other end of the elongated optical fiber 502 is optically coupled with the photodetector 51.

The pulsed light PL having passed through the optical system 4 is incident on the elongated optical fiber 502. The elongated optical fiber 502 extends the time width of the pulsed light PL propagated inside the elongated optical fiber 502. For example, the elongated optical fiber 502 extends the pulse width on a femtosecond order to a nanosecond order. A temporal waveform of the pulsed light PL having an extended time width is detected by the photodetector 51. Since the length and the refractive index of the elongated optical fiber 502 are already known, the analysis unit 6 calculates the temporal waveform of the pulsed light PL before the time width is extended, from each detected temporal waveform. The analysis unit 6 measures the time response of the measurement object B based on the temporal waveform. The optical property measurement apparatus 1B according to the second modification may have the elongated optical fiber 502 as an optical component in place of the correlation optical system 50. That is, the elongated optical fiber 502 may be arranged on the optical path between the measurement object B and the optical system 4.

As in the present modification, the waveform measurement unit 5A may have an optical component (elongated optical fiber 502) which is arranged between the measurement object B and the optical system 4 or at a stage subsequent to the optical system 4 and extends the time width of the pulsed light PL. In this case, for example, even if the time width of the pulsed light PL is on a femtosecond order or a picosecond order, the temporal waveform thereof can be accurately measured. Hence, optical property of the measurement object B can be accurately measured.

According to the present modification, since the pulsed light PL having an extended time width is detected, it is not necessary to use a complicated optical system such as a correlation optical system. When a correlation optical system is used, it is necessary to perform detection while setting a plurality of time differences between the pulsed light PL and reference pulsed light. However, according to the present modification, the temporal waveform of the pulsed light PL can be detected by performing a fewer times of detection. As a result, measurement work can be further simplified.

Fourth Modification

Figure 45:
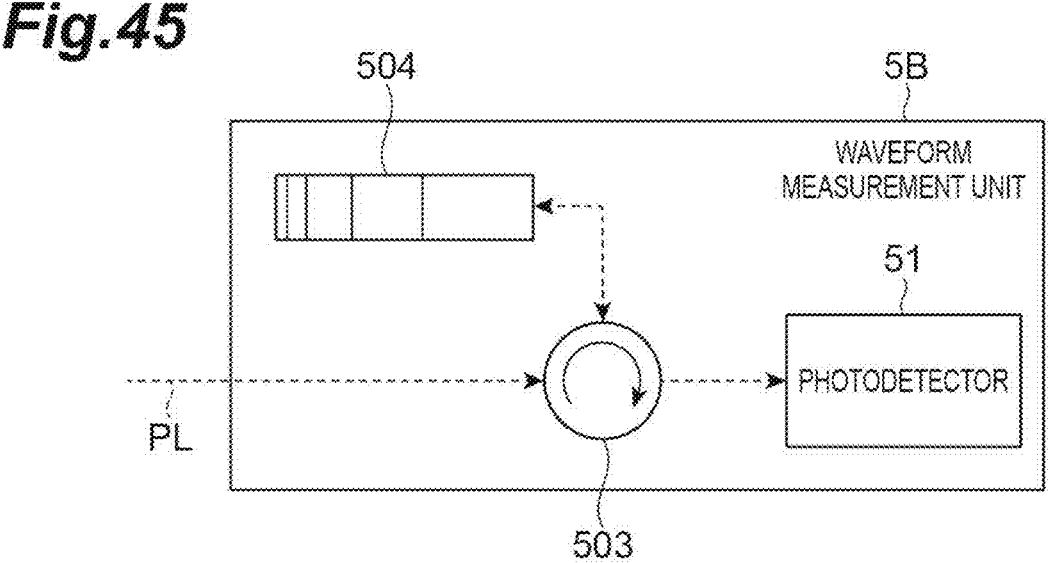
FIG. 45 is a diagram schematically illustrating a configuration of a waveform measurement unit according to a fourth modification of the present disclosure.

FIG. 45 is a diagram schematically illustrating a configuration of the waveform measurement unit 5B according to a fourth modification of the present disclosure. An optical component for extending the time width of the pulsed light PL is not limited to the elongated optical fiber 502. For example, as shown in FIG. 45, a chirped fiber Bragg grating (CFBG) 504 may be arranged in place of the elongated optical fiber 502 (or together with the elongated optical fiber 502). The CFBG 504 is an optical fiber in which a diffraction grating pattern is described. In an example, the CFBG 504 is arranged together with an optical circulator 503 between the optical system 4 and the photodetector 51. A first port of the optical circulator 503 is optically coupled with the optical system 4, and the pulsed light PL having passed through the measurement object B and the optical system 4 is input to the first port. A second port of the optical circulator 503 is optically coupled with the CFBG 504. The pulsed light PL input to the first port of the optical circulator 503 is output from the second port of the optical circulator 503 and input to the CFBG 504. The same as the elongated optical fiber 502 described above, the CFBG 504 extends the time width of the pulsed light PL, for example, in nanosecond order. The pulsed light PL having an extended time width is input to the second port of the optical circulator 503 again. A third port of the optical circulator 503 is optically coupled to the photodetector 51, and the pulsed light PL having an extended time width is output from the third port and input to the photodetector 51. The first port of the optical circulator 503 may be optically coupled with the measurement object B, and the third port may be optically coupled with the optical system 4.

According to the configuration of the present modification, the same effects as those of the third modification described above can be achieved. Furthermore, since the CFBG 504 is much smaller than the elongated optical fiber 502, the optical property measurement apparatus can be miniaturized. A propagation loss can be reduced compared to the elongated optical fiber 502.

Fifth Modification

The waveform measurement unit 5 of the foregoing embodiment may have a spectral interference optical system as an optical system in place of the correlation optical system 50. The spectral interference optical system divides the pulsed light PL into two and generates interfere fringes by causing the two divided pulsed light PL to interfere with each other. Further, the interfere fringes are measured using a spectrometer. In that case, for example, even if the time width of the pulsed light PL is on a femtosecond order or a picosecond order, the temporal waveform thereof can be accurately measured. Hence, the optical property of the measurement object B can be accurately measured.

Sixth Modification

Figure 46:
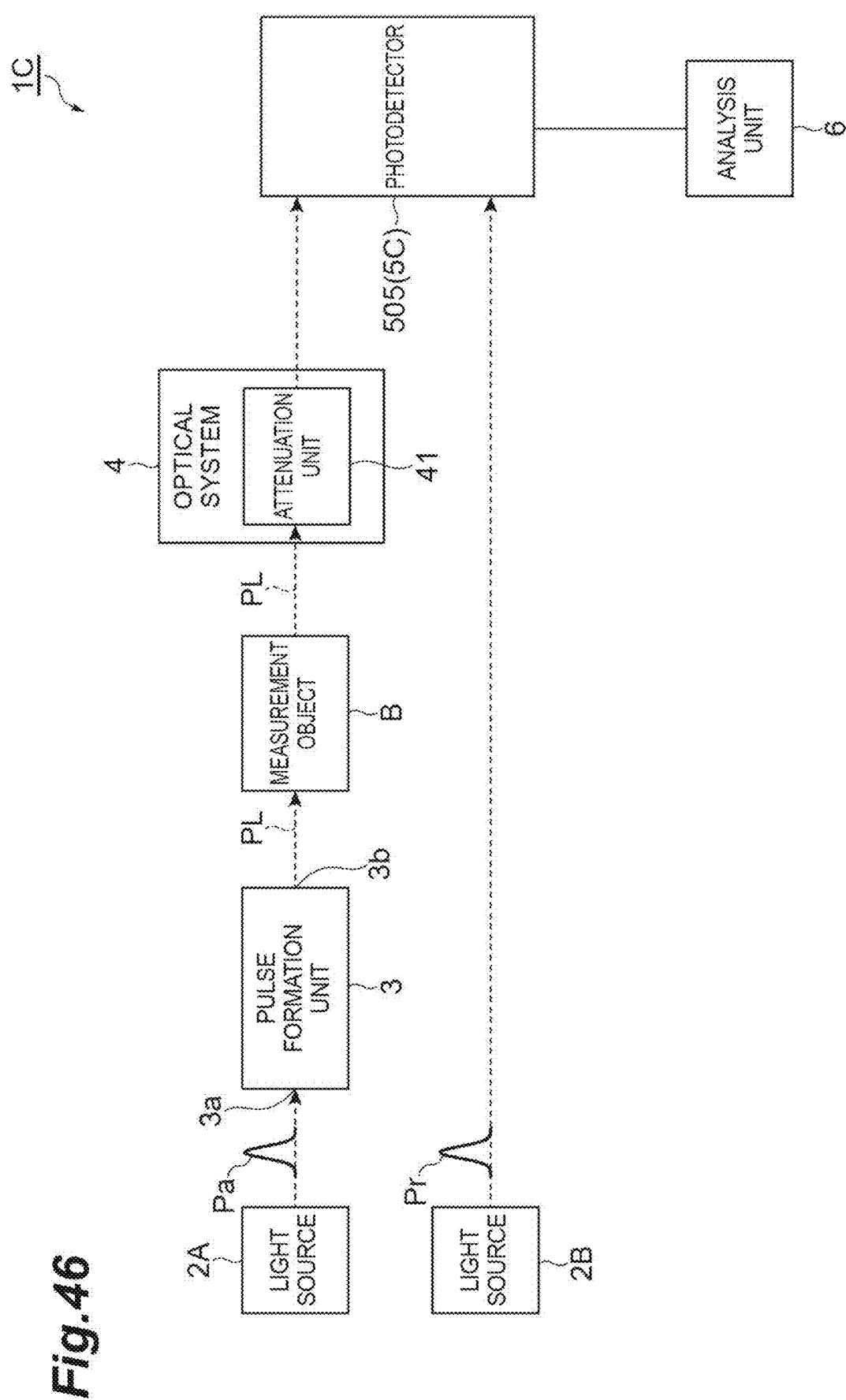
FIG. 46 is a diagram schematically illustrating a configuration of the optical property measurement apparatus according to a sixth modification of the present disclosure.

FIG. 46 is a diagram schematically illustrating a configuration of an optical property measurement apparatus 1C according to a sixth modification of the present disclosure. The optical property measurement apparatus 1C differs from the optical property measurement apparatus 1A according to the foregoing embodiment in utilizing a dual comb spectral dispersion technology in place of the correlation optical system 50. That is, the optical property measurement apparatus 1C according to the present modification includes a waveform measurement unit 5C in place of the waveform measurement unit 5 of the foregoing embodiment and includes a first pulsed laser light source 2A and a second pulsed laser light source 2B in place of the pulsed laser light source 2 of the foregoing embodiment.

Both the first pulsed laser light source 2A and the second pulsed laser light source 2B are optical frequency comb light sources in which a pulse cycle and an offset frequency are made stable and periodically outputs a femtosecond light pulse constituted of a group of modes (group of comb modes) arranged at equal frequency intervals. The phases of the first pulsed laser light source 2A and the second pulsed laser light source 2B are synchronized, and the periods thereof for outputting a femtosecond light pulse are slightly different from each other. The first pulsed laser light source 2A outputs the initial pulsed light Pa, and the second pulsed laser light source 2B outputs the reference pulsed light Pr. The initial pulsed light Pa output from the first pulsed laser light source 2A is transformed into the pulsed light PL by the pulse formation unit 3. After passing through the measurement object B and the optical system 4, the pulsed light PL is input to the waveform measurement unit 5C.

Meanwhile, the reference pulsed light Pr output from the second pulsed laser light source 2B is directly input to the waveform measurement unit 5C without going through the pulse formation unit 3, the measurement object B, and the optical system 4. At this time, the pulsed light PL interferes with the reference pulsed light Pr and is transformed into interference light. The waveform measurement unit 5C has a photodetector 505. The photodetector 505 detects the interference light of the pulsed light PL. The interference light is correlation light including the cross-correlation of the pulsed light PL. Therefore, the second pulsed laser light source 2B, the optical system guiding the pulsed light PL to the waveform measurement unit 5C, and the optical system guiding the reference pulsed light Pr to the waveform measurement unit 5C constitute a correlation optical system.

Here, both the first pulsed laser light source 2A and the second pulsed laser light source 2B periodically output a femtosecond light pulse, and the periods thereof are slightly different from each other. Therefore, a difference occurs between a timing when the pulsed light PL is input to the photodetector 505 and a timing when the reference pulsed light Pr is input to the photodetector 505, and the difference changes over time. Therefore, the photodetector 505 consecutively outputs an electrical signal representing an intensity of correlation light while changing a time delay of the reference pulsed light Pr to the pulsed light PL. As a result, an electrical signal corresponding to an optical signal obtained by sampling a temporal waveform of the pulsed light PL at a different timing can be consecutively acquired. The waveform measurement unit 5C measures the temporal waveform of the pulsed light PL by processing the electrical signals which have been consecutively acquired in this manner.

In the correlation optical system 50B illustrated in FIG. 9, in order to perform sampling of the temporal waveform of the pulsed light PL, it is necessary to change the optical path length (that is, time delay) of the reference pulsed light Pr by moving the mirror 58 mounted on the movable stage 59. Since there is limitation on a movement length and a movement speed of the mirror 58, there is also limitation on a dynamic range of time response measurement and a time required for time response measurement.

In contrast, in the optical property measurement apparatus 1C according to the present modification, since no movable reflector is used, compared to the optical property measurement apparatus 1A including the correlation optical system 50B illustrated in FIG. 9, the dynamic range of time response measurement can be extended, and the time required for time response measurement can be shortened.

The optical property measurement apparatus and the optical property measurement method according to the present disclosure are not limited to the embodiment described above, and various other modifications can be made. For example, the embodiment and each of the modifications described above may be combined in accordance with necessary purpose and effect.

What is claimed is:

1. An optical property measurement apparatus for measuring optical properties of a measurement object, the optical property measurement apparatus comprising:
a pulse shaper generating pulsed light and capable of changing a temporal waveform of the pulsed light in accordance with a type of optical property to be measured;
a waveform measurement unit including a correlation optical system and a photodetector and measuring a temporal waveform of the pulsed light output from the measurement object after being incident on the measurement object;
an optical system having an optical filter with an attenuation rate with respect to one wavelength component constituting the pulsed light larger than an attenuation rate with respect to another wavelength component constituting the pulsed light, the optical system being capable of switching between a first state and a second state, wherein in the first state, the optical filter is arranged on an optical path of the pulsed light output from the measurement object, and in the second state, the optical filter is not arranged on the optical path; and
an analyzer obtaining the optical property of the measurement object based on the temporal waveform,
wherein types of the optical properties include a time response inside the measurement object caused by light incidence and a wavelength dispersion amount of the measurement object, and
wherein the optical system is in the first state when the time response is measured and is in the second state when the wavelength dispersion amount is measured.

2. The optical property measurement apparatus according to claim 1,
wherein in the optical system, the optical filter is movable in a direction intersecting an optical axis of the pulsed light.

3. The optical property measurement apparatus according to claim 1,
wherein the optical system has a configuration for switching between two optical paths for the pulsed light, and wherein the optical filter is arranged on either optical path of the two optical paths.

4. The optical property measurement apparatus according to claim 1,
wherein when the time response is measured, the pulse shaper generates, as the pulsed light, first pulsed light including a wavelength of the pump light, second pulsed light including a wavelength of the probe light, and third pulsed light including a wavelength of the pump light and a wavelength of the probe light, on a common optical axis,
wherein an attenuation rate of the optical filter with respect to the pump light is larger than an attenuation rate of the optical filter with respect to the probe light,
wherein the waveform measurement unit measures a first temporal waveform that is a temporal waveform of the first pulsed light having passed through the optical filter, a second temporal waveform that is a temporal waveform of the second pulsed light having passed through the optical filter, and a third temporal waveform that is a temporal waveform of the third pulsed light having passed through the optical filter, and
wherein the analyzer obtains the time response of the measurement object based on the first temporal waveform, the second temporal waveform, and the third temporal waveform.

5. The optical property measurement apparatus according to claim 4,
wherein the analyzer obtains the time response of the measurement object based on a comparison between the second temporal waveform and a difference between the third temporal waveform and the first temporal waveform.

6. The optical property measurement apparatus according to claim 4,
wherein in the pulse shaper, a time interval between an intensity peak of a component of a wavelength of the pump light included in the third pulsed light and an intensity peak of a component of a wavelength of the probe light included in the third pulsed light is variable.

7. The optical property measurement apparatus according to claim 4,
wherein in the pulse shaper, a ratio of a pulse width of a component of a wavelength of the pump light included in the third pulsed light to a pulse width of a component of a wavelength of the probe light included in the third pulsed light is variable.

8. The optical property measurement apparatus according to claim 4,
wherein a pulse width of a component of a wavelength of the pump light included in the third pulsed light is smaller than a pulse width of a component of a wavelength of the probe light included in the third pulsed light.

9. The optical property measurement apparatus according to claim 1,
wherein when the wavelength dispersion amount is measured, the pulse shaper forms, as the pulsed light, a light pulse train including a plurality of pulses having a time difference therebetween and having center wavelengths different from each other,
wherein the waveform measurement unit measures a temporal waveform of the light pulse train having passed through the measurement object, and
wherein the analyzer estimates the wavelength dispersion amount of the measurement object based on a feature value of the temporal waveform of the light pulse train.

10. The optical property measurement apparatus according to claim 1,
wherein the pulse shaper has a spatial light modulator generating the pulsed light by performing at least any modulation of phase modulation and intensity modulation of input light.

11. The optical property measurement apparatus according to claim 1,
wherein the correlation optical system is disposed between the measurement object and the optical system or is disposed at a stage subsequent to the optical system, and converts the pulsed light into correlation light including a cross-correlation or an auto-correlation, and
wherein the analyzer obtains the optical property of the measurement object based on the pulsed light converted into the correlation light.

12. The optical property measurement apparatus according to claim 1,
wherein the waveform measurement unit has an optical component disposed between the measurement object and the optical system or disposed at a stage subsequent to the optical system, and extending a time width of the pulsed light.

13. The optical property measurement apparatus according to claim 1,
wherein the optical filter has a wavelength filter having a cutoff band including a wavelength of the one wavelength component and having a transmission band including a wavelength of the another wavelength component.

14. An optical property measurement method for measuring optical properties of a measurement object by irradiating the measurement object with pulsed light, the optical property measurement method comprising:
selecting any state in an optical system capable of switching between a first state and a second state, wherein in the first state, an optical filter is arranged on the optical path of the pulsed light output from the measurement object, and in the second state, the optical filter is not arranged on the optical path, and an attenuation rate of the optical filter with respect to one wavelength component constituting the pulsed light is larger than an attenuation rate of the optical filter with respect to another wavelength component constituting the pulsed light;
irradiating the measurement object with the pulsed light having a temporal waveform according to a type of optical property to be measured using a pulse shaper capable of changing a temporal waveform of the pulsed light;
measuring a temporal waveform of the pulsed light having passed through the optical system; and
obtaining the optical property of the measurement object based on the temporal waveform measured by the measuring,
wherein types of the optical properties include a time response inside the measurement object caused by light incidence and a wavelength dispersion amount of the measurement object, and
wherein in the selecting, the first state is selected when the time response is measured, and the second state is selected when the wavelength dispersion amount is measured.

15. The optical property measurement method according to claim 14,
- wherein when the time response is measured, the irradiating and the measuring are alternately repeated,
- wherein in one irradiating, first pulsed light that is the pulsed light including a wavelength of the pump light is incident on the measurement object along a predetermined optical axis, and in the measuring succeeding the one irradiating, a first temporal waveform that is a temporal waveform of the first pulsed light having passed through the optical filter after being output from the measurement object is measured,
- wherein in another irradiating, second pulsed light that is the pulsed light including a wavelength of the probe light is incident on the measurement object along the predetermined optical axis, and in the measuring succeeding the another irradiating, a second temporal waveform that is a temporal waveform of the second pulsed light having passed through the optical filter after being output from the measurement object is measured,
- wherein in still another irradiating, third pulsed light that is the pulsed light including a wavelength of the pump light and a wavelength of the probe light is incident on the measurement object along the predetermined optical axis, and in the measuring succeeding the still another irradiating, a third temporal waveform that is a temporal waveform of the third pulsed light having passed through the optical filter after being output from the measurement object is measured, and
- wherein in the obtaining, the time response of the measurement object is obtained based on the first temporal waveform, the second temporal waveform, and the third temporal waveform.

16. The optical property measurement method according to claim 15,
- wherein in the obtaining, the time response of the measurement object is obtained based on a comparison between the second temporal waveform and a difference between the third temporal waveform and the first temporal waveform.

17. The optical property measurement method according to claim 15,
- wherein a pulse width of the component of the wavelength of the pump light included in the third pulsed light is set to be smaller than a pulse width of the component of the wavelength of the probe light included in the third pulsed light.

18. The optical property measurement method according to claim 15,
- wherein the third temporal waveform is measured after the first temporal waveform and the second temporal waveform are measured.

19. The optical property measurement method according to claim 14,
- wherein when the wavelength dispersion amount is measured,
  - in the irradiating, a light pulse train including a plurality of pulses having a time difference therebetween and having center wavelengths different from each other is incident on the measurement object as the pulsed light,
  - in the measuring, a temporal waveform of the light pulse train having passed through the measurement object is measured, and
  - in the obtaining, the wavelength dispersion amount of the measurement object is estimated based on a feature value of the temporal waveform of the light pulse train.

\* \* \* \* \*